(12) United States Patent
Shuai et al.

(10) Patent No.: US 11,413,603 B2
(45) Date of Patent: Aug. 16, 2022

(54) OXYGEN AND NITROGEN FUNCTIONALIZED CARBONACEOUS SUPPORTS WITH IMPROVED NANOPARTICLE DISPERSION, AND METHODS OF MAKING AND USES OF THE SAME

(71) Applicant: The George Washington University, Washington, DC (US)

(72) Inventors: Danmeng Shuai, Herndon, VA (US); Tao Ye, Washington, DC (US)

(73) Assignee: The George Washington University, Washington, DC (US)

( * ) Notice: Subject to any disclaimer, the term of this patent is extended or adjusted under 35 U.S.C. 154(b) by 56 days.

(21) Appl. No.: 16/903,992

(22) Filed: Jun. 17, 2020

(65) Prior Publication Data
US 2020/0391184 A1 Dec. 17, 2020

Related U.S. Application Data

(60) Provisional application No. 62/862,421, filed on Jun. 17, 2019.

(51) Int. Cl.
| | |
|---|---|
| *B01J 21/18* | (2006.01) |
| *B01J 23/44* | (2006.01) |
| *B01J 37/00* | (2006.01) |
| *B01J 35/02* | (2006.01) |
| *B01J 6/00* | (2006.01) |

(52) U.S. Cl.
CPC ............... *B01J 21/18* (2013.01); *B01J 6/001* (2013.01); *B01J 23/44* (2013.01); *B01J 35/023* (2013.01); *B01J 37/0045* (2013.01)

(58) Field of Classification Search
CPC ... B01J 6/001; B01J 21/18; B01J 23/44; B01J 27/24; B01J 35/0013; B01J 35/0053; B01J 35/006; B01J 35/023; B01J 37/0045; B01J 37/343
See application file for complete search history.

(56) References Cited

PUBLICATIONS

Li, Z. (2017). Supporting Information to Tandem Nitrogen Functionalization of Porous Carbon: Toward Immobilizing Highly Active Palladium Nanoclusters for Dehydrogenation of Formic Acid, ACS Catalysis, 7, 2720-2720 [Supporting Information pp. S1-S22].*
Chang, T. (2013) Science China, 56(7), 911-916.*
Xu, X. et al. (2013) Electrochima Acta, 112, 587-595.*
Tischer, S. et al. (2019) Physical Chemistry Chemical Physics, 21, 16785-16797.*

(Continued)

*Primary Examiner* — Brian A McCaig
(74) *Attorney, Agent, or Firm* — Blank Rome LLP

(57) ABSTRACT

Metal nanoparticle-bearing carbonaceous supports, or solid-supported metal-catalysts, can be formed by incipient wetness, wet impregnation and ethylene glycol reduction methods. The solid-supported metal-catalysts can be used a heterogeneous catalysts in various catalytic reactions such as hydrodeoxygenation reactions, catalyze hydrodehalogenation reactions, N—N hydrogenolysis reactions and oxidation reactions. The solid-supported metal-catalysts are easy to handle, are easily separable from reaction media, are stable in various types of reaction media, and are recyclable.

19 Claims, 29 Drawing Sheets

(56) References Cited

PUBLICATIONS

Kenji Wada, et al. (2011) Effect of supports on Pd—Cu bimetallic catalysts for nitrate and nitrite reduction in water, Catalysis Today, Aug. 20, pp. 81-87, vol. 185, Elsevier, Netherlands.

Yusuke Yoshinaga, et al. (2001) Hydrogenation of nitrate in water to nitrogen over Pd—Cu supported on active carbon. Journal of Catalysis, Dec. 28, pp. 37-45, vol. 207, Elsevier, Netherlands.

Olivia Salome G.P. Soares, et al. (2010) Pd—Cu and Pt—Cu catalysts supported on carbon nanotubes for nitrate reduction in water, Ind. Eng. Chem. Res., Jul. 12, pp. 7183-7192, vol. 49, United States.

Danmeng Shuai, et al. (2012) Enhanced activity and selectivity of carbon nanofiber supported Pd catalysts for nitrite reduction, Environmental Science & Technology, Jan. 31, pp. 2847-2855, vol. 46, ACS Publications, Illinois United States.

Tao Ye, et al. (2016) Enhancement of nitrite reduction kinetics on electrospun Pd-carbon nanomaterial catalysts for water purification, Applied Materials & Interfaces, Jul. 7, pp. 17739-17744, vol. 8, ACS Publications, United States.

Francisco Rodriguez-Reinoso (1998) The role of carbon materials in heterogeneous catalysis, Carbon, 1998, pp. 159-175, vol. 36, No. 3, Pergamon, United Kingdom.

Olivia Salome G.P. Soares, et al. (2008) Activated carbon supported metal catalysts for nitrate and nitrite reduction in water, Catal Lett, Sep. 9, pp. 253-260, vol. 126, Springer Science+Business Media LLC, Germany.

Olivia Salome G.P. Soares, et al. (2009) Bimetallic catalysts supported on activated carbon for the nitrate reduction in water: optimization of catalysts composition, Applied Catalyst B: Environmental, 2009, pp. 441-448, vol. 91, Elsevier, Netherlands.

Olivia Salome G.P. Soares, et al. (2010) Nitrate reduction catalyzed by Pd—Cu and Pt—Cu supported on different carbon materials, Catal Lett, Aug. 14, pp. 97-104, vol. 139, Springer Science+ Business Media LLC, Germany.

Ikkou Mikami, et al. (2003) Kinetic and adsorption studies on the hydrogenation of nitrate and nitrite in water using Pd—Cu on active carbon support, Applied Catalysis B: Environmental, Jan. 17, pp. 79-86, vol. 44, Elsevier, Netherlands.

V.Z. Radkevich, et al. (2008) The influence of surface functionalization of activated carbon on palladium dispresion and catalytic activity in hydrogen oxidation, Applied Catalysis A: General, Nov. 18, pp. 241-251, vol. 335, Elsevier, Netherlands.

Mingming Li, et al. (2016) Nitrogen-doped porous carbon materials: promising catalysts or catalyst supports for hetereogeneous hydrogenation and oxidation, Catalysis Science & Technology, Mar. 31, pp. 3670-3693, vol. 6, Royal Society of Chemistry, United Kingdom.

Zhangpeng Li, et al. (2017) Tandem nitrogen functionalization of porous carbon: toward immobilizing highly active palladium nanoclusters for dehydrogenation of formic acid, ACS Catalysis, 2017, pp. 2720-2724, vol. 7, ACS Publications, United States.

Ben Liu, et al. (2016) Ligand-free noble metal nanocluster catalysts on carbon supports via "soft" nitriding, Journal of the American Chemical Society, Mar. 25, pp. 4718-4721, vol. 138, Journal of the American Chemical Society, United States.

Y.F. Jia, et al. (2002) Adsorption of metal ions on nitrogen surface functional groups in activated carbons, Langmuir, Dec. 18, pp. 470-478, vol. 18, No. 2, American Chemical Society, United States.

Renheng Nie, et al. (2016) Highly active electron-deficient Pd clusters on n-doped active carbon for aromatic ring hydrogenation, Catalysis Science & Technology, 2016, pp. 1913-1920, vol. 6, Royal Society of Chemistry, United Kingdom.

Philippe Burg, et al. (2002) The characterization of nitrogen-enriched activated carbons by IR, XPS and LSER methods, Carbon, 2002, pp. 1521-1531, vol. 40, Elsevier, Netherlands.

David P. Durkin, et al. (2016) Lignocellulose fiber- and welded fiber-supports for palladium-based catalytic hodrogenatoin: a natural fiber welding application for water treatment, 2016, ACS Sustainable Chem. Eng., pp. 5511-5522, vol. 4., ACS Publications, United States.

David P. Durkin, et al. (2018) Sustainable and scalable natural fiber welded palladium-indium catalysts for nitrate reduction, Applied Catalysis B: Environmental, 2018, pp. 290-301, vol. 221, Elsevier, Netherlands.

Tao Ye, et al. (2017) Graphitic carbon nitride supported ultrafine Pd and Pd—Cu catalysts: enhanced reactivity, selectivity, and longevity for nitrite and nitrate hydrogenation, ACS Appl. Mater. Interfaces, 2017, pp. 2741-2746, vol. 9, ACS Publication, United States.

Jitendra Kumar Chinthaginjala, et al. (2010) Thin layer of carbon-nano-fibers (CNFs) as catalyst support for fast mass transfer in hydrogenation of nitrite, Applied Catalysis A: General, May 20, pp. 24-32, vol. 383, Elsevier, Netherlands.

Liang Chen, et al. (2007) Mechanistic study on hydrogen spillover onto graphitic carbon materials, J. Phys. Chem., Dec. 1, pp. 18995-19000, vol. 111, American Chemical Society, United States.

Yingke Zhou, et al. (2010) Enhancement of Pt and Pt-alloy fuel cell catalyst activity and durability via nitrogen-modified carbon supports, Energy Environ. Sci., 2010, pp. 1437-1446, vol. 3, The Royal Society of Chemistry, United Kingdom.

Jiangbo Xi, et al. (2016) Pd nanoparticles decorated N-doped graphene quantum dots@n-doped carbon hollow nanospheres with high electrochemical sensing performance in cancer detection, ACS Appl. Mater. Interfaces, 2016, pp. 22563-22573, vol. 8, ACS Publications, United States.

Jiangbo Xi, et al. (2018) Confined-interface-directed synthesis of palladium single-atom catalysts on graphene/amorphous carbon, Applied Catalyst B: Environmental, 2018, pp. 291-297, vol. 225, Elsevier, Netherlands.

Lifeng Wang, et al. (2009) Hydrogen storage properties of B- and N-doped microporous carbon, AlChE Journal, May 26, pp. 1823-1833, vol. 55, No. 7, American Institute of Chemical Engineers, United States.

Ying Wang, et al. (2014) Palladium nanoparticles encapsulated in core-shell silica: a structured hydrogenation catalyst with enhanced activity for reduction of oxyanion water pollutants, ACS Catalysis, Sep. 2, pp. 3551-3559, vol. 4, ACS Publications, United States.

Brian P. Chaplin, et al. (2012) Critical review of Pd-based catalytic treatment of priority contaminants in water, Environmental Science & Technology, 2012, pp. 3655-3670, vol. 46, ACS Publications, United States.

Peirong Chen, et al. (2014) Interaction of cobalt nanoparticles with oxygen- and nitrogen-functionalized carbon nanotubes and impact on nitrobenzene hydrogenation catalysis, ACS Catalysis, Mar. 31, pp. 1478-1486, vol. 4, ACS Publications, United States.

Yukihiro Motoyama, et al. (2011) Platinum nanoparticles supported on nitrogen-doped carbon nanofibers as efficient poisoning catalysts for the hydrogenation of nitroarenes, ChemCatChem, 2011, pp. 1578-1581, vol. 3, Wiley-VCH Verlag GmbH & Co., Germany.

Youngjin Lee, et al. (2012) (Z)-selective partial hydrogenation of internal alkynes by using palladium nanoparticles supported on nitrogen-doped carbon nanofiber, ChemCatChem, 2012, pp. 778-781, vol. 4, Wiley-VCH Verlag GmbH & Co., Germany.

Peirong Chen, et al. (2013) The influence of the residual growth catalyst in functionalized carbon nanotubes on supported Pt nanoparticles applied in selective olefin hydrogenation, Journal of Catalysis, Aug. 9, pp. 84-93, vol. 307, Elsevier, Netherlands.

Keith D. Hurley, et al. (2007) Efficient heterogeneous catalytic reduction of perchlorate in water, Environ. Sci. Technol., 2007, pp. 2044-2049, vol. 41, American Chemical Society, United States.

Jong Kwon Choe, et al. (2013) Comparative assessment of the environmental sustainability of existing and emerging perchlorate treatment technologies for drinking water, Environmental Science & Technology, Mar. 13, pp. 4644-4652, vol. 47, ACS Publications, United States.

Peter Harriot (1962) Mass transfer to particles, A.l.Ch.E. Journal, March, pp. 93-101, vol. 8, No. 1, A.l.Ch.E. Journal, United States.

Danmeng Shuai, et al. (2013) Structure sensitivity study of waterborne contaminant hydrogenation using shape-and size-controlled

(56) References Cited

PUBLICATIONS

Pd nanoparticles, ACS Catalysis, 2013, pp. 453-463, vol. 3, ACS Publications, United States.

* cited by examiner

OXYGEN AND NITROGEN FUNCTIONALIZED CARBONACEOUS SUPPORTS WITH IMPROVED NANOPARTICLE DISPERSION, AND METHODS OF MAKING AND USES OF THE SAME

CROSS-REFERENCE TO RELATED APPLICATION

This application claims the benefit of U.S. Provisional Application No. 62/862,421, filed Jun. 17, 2019, the contents of which are incorporated by reference herein in its entirety.

STATEMENT REGARDING FEDERALLY SPONSORED RESEARCH OR DEVELOPMENT

This invention was made with Government support under Grant/Contract No. CBET-1437989, Project No. 176632, awarded by the National Science Foundation (NSF). The U.S. government may have certain rights in this invention.

FIELD OF THE INVENTION

The present invention relates to methods for the preparation of nitrogen- and/or oxygen-functionalized carbonaceous supports having metal nanoparticles disposed thereon. The present invention further relates to nitrogen- and/or oxygen-functionalized carbonaceous supports having metal nanoparticles disposed thereon and their use as heterogeneous catalysts.

BACKGROUND OF THE DISCLOSURE

Catalysts are used in a large number of applications including large-scale production of inorganic and organic chemicals, crude oil refining, environmental protection and remediation, and energy conversion. Among various catalysts, heterogeneous catalysts that are not soluble in reaction mixtures are advantageous due to benefits such as easy separation from reaction mixtures, recyclability and better handling properties, thus showing promising industrial value. As such, heterogeneous catalysts have been explored for years in the pursuit of materials to enable more environmentally friendly industrial processes.

Many industrial catalysts consist of metals or metal compounds supported on a heterogeneous support. The basic role of the heterogeneous support is to maintain the catalytically active phase (i.e., the metal of metal compound) in a highly dispersed state. However, in many instances the role of the support is not merely that of a carrier; it may also directly or indirectly contribute catalytic activity. In some instances, the interaction between the catalytically active phase and the support phase can synergistically affect the catalytic activity, where each of the support and the metal/metal compound have different catalytic capabilities.

Metal oxides such as, for example, $Al_2O_3$, $SiO_2$, and $TiO_2$, have been used as catalyst supports. However, the use of metal oxide supports is problematic due to dissolution of the supports under acidic or basic conditions. Carbonaceous materials, such as activated carbon (AC), carbon nanotubes (CNTs), and carbon nanofibers (CNFs), have shown to be excellent catalyst supports due to their chemical stability, high surface area and porosity, and adequate mechanical properties. However, the high cost and difficulties of large-scale production limit the application of CNTs and CNFs.

Despite the wealth of research devoted to heterogeneous catalysts to date, the search for more efficient and tunable heterogeneous catalysts, as well as more facile methods of making the same, persists in the field.

DETAILED DESCRIPTION

Figure 1:
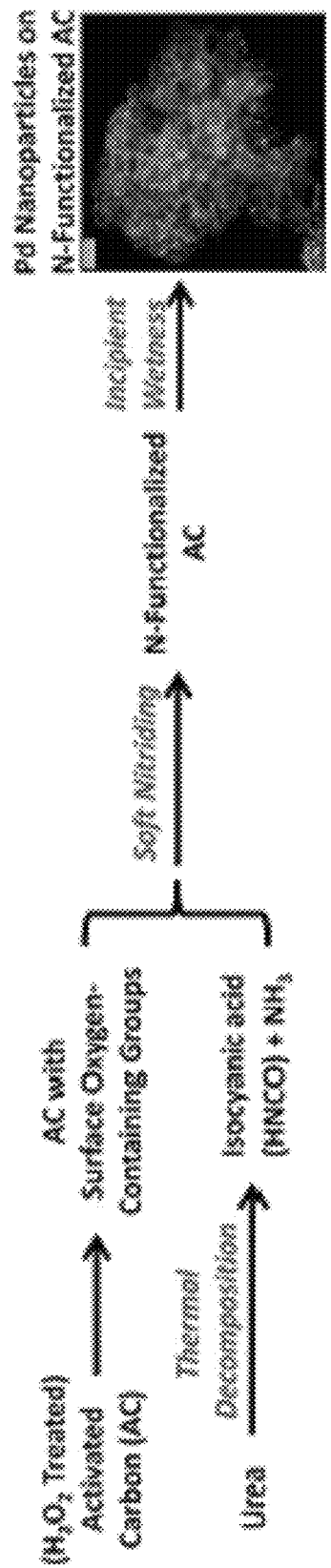
FIG. 1 is a schematic illustration of process steps for low-temperature urea treatment, also known as "soft nitriding", of activated carbon (AC) toward the synthesis of N-functionalized AC and subsequent AC-supported metal-catalysts.

The following description of the embodiments is merely exemplary in nature and is in no way intended to limit the subject matter of the present disclosure, their application, or uses.

As used throughout, ranges are used as shorthand for describing each and every value that is within the range. Any value within the range can be selected as the terminus of the range. Unless otherwise specified, all percentages and amounts expressed herein and elsewhere in the specification should be understood to refer to percentages by weight.

For the purposes of this specification and appended claims, unless otherwise indicated, all numbers expressing quantities, percentages or proportions, and other numerical values used in the specification and claims, are to be understood as being modified in all instances by the term "about." The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent, alternatively ±5 percent, alternatively ±1 percent, alternatively ±0.5 percent, and alternatively ±0.1 percent of the given numeric value provided such a deviation does not alter the end function or result of the value. Accordingly, unless indicated to the contrary, the numerical parameters set forth in this specification and attached claims are approximations that can vary depending upon the desired properties sought to be obtained by the present invention.

It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. For example, as used in this specification and the following claims, the terms "comprise" (as well as forms, derivatives, or variations thereof, such as "comprising" and "comprises"), "include" (as well as forms, derivatives, or variations thereof, such as "including" and "includes") and "has" (as well as forms, derivatives, or variations thereof, such as "having" and "have") are inclusive (i.e., open-ended) and do not exclude additional elements or steps. Accordingly, these terms are intended to not only cover the recited element(s) or step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

Various aspects of the disclosure are directed to heterogeneous catalyst systems comprising nitrogen- and/or oxygen-functionalized carbonaceous supports having metal nanoparticles disposed on surfaces of the supports, also referred herein as "solid-supported metal-catalysts." These solid-supported metal-catalysts find utility in various catalytic reactions, are easy to handle, are easily separable from reaction media, are stable in various types of reaction media, and are recyclable (i.e., can be used for multiple catalytic cycles). In some instances, solid-supported metal-catalysts made in accordance with various aspects of the disclosure can be used to catalyze oxyanion (nitrite, bromate, chlorite, chlorate, perchlorate, etc.) hydrogenation (or hydrodeoxygenation) reactions. In some instances, solid-supported metal-catalysts made in accordance with various aspects of the disclosure can be used to catalyze hydrodehalogenation reactions. In some instances, solid-supported metal-catalysts made in accordance with various aspects of the disclosure can be used to catalyze N—N hydrogenolysis reactions. In some instances, solid-supported metal-catalysts made in accordance with various aspects of the disclosure can be used to catalyze oxidation reactions.

Various aspects of the disclosure are also directed to methods of making heterogeneous catalyst systems comprising nitrogen- and/or oxygen-functionalized carbonaceous supports having metal nanoparticles disposed on surfaces of the supports. Methods of making these solid-supported metal-catalysts according to the disclosure comprise two fundamental processes. First, a carbonaceous support is subjected to one or more chemical treatments to provide the support with nitrogen-containing surface functional groups (such as, for example, primary and secondary amines, and amides) and/or oxygen-containing surface functional groups (for example carboxyls and hydroxyls). Then, the nitrogen- and/or oxygen-functionalized carbonaceous support is mixed with a metal salt, which is subjected to a reducing agent to convert the metal ions of the metal salt to metal nanoparticles. During reduction of the metal ions, the forming metal nanoparticles bind, via physisorption and/or chemisorption, to the nitrogen- and/or oxygen-containing functional groups located on surfaces of the carbonaceous support.

In the examples below, activated carbon (AC) is used as the carbonaceous support for nitrogen- and/or oxygen-functionalization and subsequent loading with metal nanoparticles. In some instances, other carbonaceous supports to be nitrogen- and/or oxygen-functionalized can include, but are not limited to, graphite, graphite intercalation compounds, graphene, carbon black, charcoal, bone char, activated carbon fibers, single- or multi-walled carbon nanotubes, carbon-covered alumina, glassy carbon, pyrolytic carbon, polymer-derived carbon, fullerenes, amorphous carbon, carbon nano- or microspheres, and cellulosic carbon.

In some instances, the carbonaceous support, before and/or after subjection to oxygen- and/or nitrogen-functionalization can be described as being porous. In some instances, the porous support can be microporous (that is, having pores with diameters of up to 2 nm). In some instances, the porous support can be mesoporous (that is, having pores with diameters of 2 nm to 50 nm). In some instances, the porous support can be macroporous (that is, having pores with diameters of 2 greater 50 nm). In some instances, the porous support can have a combination of micropores and mesopores. In some instances, the porous support can have a combination of micropores and macropores. In some instances, the porous support can have a combination of mesopores and macropores. In some instances, the porous support can have a combination of micropores, mesopores and macropores.

In some instances, the oxygen- and/or nitrogen-functionalization of the carbonaceous support is located on external surfaces of the support. In some instances, the oxygen- and/or nitrogen-functionalization of the support is located within pores of the support, whether micropores, mesopores, or macropores. In some instances, the oxygen- and/or nitrogen-functionalization of the support is located on external surfaces and within pores of the support.

In the examples below, Pd nanoparticles are prepared via reduction of corresponding Pd-containing salts to form said nanoparticles, which undergo physisorption and/or chemisorption with nitrogen- and/or oxygen-containing functional groups located on surfaces of the carbonaceous support. In some instances, other monometallic nanoparticles such as Au, Ag, Pt, Cu, Co, Sn, Ru, Rh, Ni, Ir, Fe, and Zn nanoparticles can be formed instead. In some instances, bimetallic nanoparticles such as Ag—Au, Ir—Cu, Ni—Cu, Pd—Au, Pd—Cu, Pd—Ir, Pd—In, Pd—Fe, Pd—Ni, Pd—Re, Pd—Sn, Pd—Zn, Pt—Au, Pt—Cu, Pt—Mn Pt—Ru, Pt—Sn, Rh—Cu, Rh—Sn, Ru—Cu, Fe—Co, Fe—Ni, Fe—Ru, Fe—Rh, Fe—Ir, and Fe—Pt can be formed by reducing a salt of a first metal and a salt of a second metal at the same time. In some instances, a combination of two or more types of monometallic nanoparticles can be formed via metal salt reduction and disposed on surfaces of the carbonaceous support. In some instances, a combination of two or more types of bimetallic nanoparticles can be formed via metal salt reduction and disposed on surfaces of the carbonaceous support. In some instances, a combination of two or more types of mono- or bimetallic nanoparticles can be formed via metal salt reduction and disposed on surfaces of the carbonaceous support. Suitable metal salts include, but are not limited to, metal halides (in some instances, chlorides are preferred), metal acetates, metal citrates, metal nitrates, metal acetylacetonates, metal dibenzylideneacetones, and so on.

Oxygen-Functionalized Carbonaceous Supports.

Oxygen-functionalized carbonaceous supports in accordance with various aspects of the disclosure can be formed by mixing a predetermined amount of carbonaceous support in an aqueous solution of $H_2O_2$ for a period of time and temperature sufficient to react the $H_2O_2$ with the support, providing reactive oxygen species (that is, oxygen-containing functional groups such as carboxyl and hydroxyl groups) capable of physisorption and/or chemisorption of metal nanoparticles.

The aqueous $H_2O_2$ solution can contain between about 20 wt % and about 60 wt % $H_2O_2$. In some instances, the aqueous $H_2O_2$ solution contains between about 25 wt % and about 55 wt % $H_2O_2$, alternatively between about 28 wt % and about 50 wt % $H_2O_2$, alternatively between about 30 wt % and about 45 wt % $H_2O_2$, and alternatively between about 30 wt % and about 40 wt % $H_2O_2$. In some instances, the aqueous $H_2O_2$ solution contains about 35 wt % $H_2O_2$.

The carbonaceous support can be mixed in the aqueous $H_2O_2$ solution such that the mixture contains a carbonaceous support to $H_2O_2$, weight to weight (w:w), ratio ranging from about 0.01:1 to about 1:1, alternatively from about 0.02:1 to about 0.9:1, alternatively from about 0.03:1 to about 0.8:1, alternatively from about 0.04:1 to about 0.7:1, alternatively from about 0.05:1 to about 0.6:1, alternatively from about 0.06:1 to about 0.5:1, alternatively from about 0.07:1 to about 0.4:1, alternatively from about 0.08:1 to about 0.3:1, and alternatively from about 0.09:1 to about 0.2:1. In the examples below, a carbonaceous support to $H_2O_2$ w:w ratio of about 0.1:1 is used (5 g AC:~50 g $H_2O_2$). In some instances, the temperature at which mixing is conducted can be room temperature. In other instances, the temperature at which mixing is conducted can be any temperature greater than room temperature but lower than the boiling point of the aqueous $H_2O_2$ solution. In some instances, mixing can be conducted under reflux conditions. One of skill in the art will appreciate that the boiling point of aqueous $H_2O_2$ solutions will vary based, at least in part, upon the wt % of $H_2O_2$ in the solution.

In some instances, the carbonaceous support can be mixed in the aqueous $H_2O_2$ solution under an ambient atmosphere. In some instances, the carbonaceous support can be mixed in the aqueous $H_2O_2$ solution under an inert atmosphere such as, for example, $N_2(g)$ or $Ar(g)$.

In some instances, the carbonaceous support can be mixed in the aqueous $H_2O_2$ solution under ambient pressure. In some instances, the carbonaceous support can be mixed in the aqueous $H_2O_2$ solution under a reduced pressure. In some instances, the carbonaceous support can be mixed in the aqueous $H_2O_2$ solution under pressures ranging from, 1.1 to 50 atm.

In some instances, activated carbon (AC) is used as the carbonaceous support that is oxygen-functionalized. In some instances, other carbonaceous supports that may be oxygen-functionalized include, but are not limited to, graphite, graphite intercalation compounds, graphene, carbon black, charcoal, bone char, activated carbon fibers, single- or multi-walled carbon nanotubes, carbon-covered alumina, glassy carbon, pyrolytic carbon, polymer-derived carbon, fullerenes, amorphous carbon, and cellulosic carbon.

The amount of time required for oxygen functionalization of carbonaceous supports may vary based on numerous factors including, but not limited to, the concentration of the aqueous $H_2O_2$ solution, the w:w ratio of carbonaceous support to $H_2O_2$, the mixing temperature, the mixing pressure, the surface area, pore volume and pore size of the carbonaceous support and so on. In general, the amount of time required can range from about 1 hour to 24 hours. In the examples below, mixing is performed for five hours at 50° C. Furthermore, although specific steps are described above, in some instances, methods according to the disclosure for preparing oxygen-functionalized carbonaceous supports may have more or less steps than the described steps.

Nitrogen-Functionalized Carbonaceous Supports.

Nitrogen-functionalized carbonaceous supports in accordance with various aspects of the disclosure can be formed by a two-step reaction process comprising mixing a predetermined amount of carbonaceous support with urea and then annealing the carbonaceous support/urea mixture at an elevated temperature, or range of temperatures, for a period of time sufficient to provide the carbonaceous support with reactive nitrogen species (that is, nitrogen-containing functional groups) capable of physisorption and/or chemisorption of metal nanoparticles. The two step mixing and anneal process results in "soft nitriding," where the urea thermally decomposes to ammonia ($NH_3$) and isocyanic acid (H—N=C=O), which react with carbon centers and/or surface oxygen-containing groups of the carbonaceous support to provide said reactive nitrogen species (see FIG. 1).

In some instances, activated carbon (AC) is used as the carbonaceous support that is nitrogen-functionalized. In some instances, other carbonaceous supports that may be nitrogen-functionalized include, but are not limited to, graphite, graphite intercalation compounds, graphene, carbon black, charcoal, bone char, activated carbon fibers, single- or multi-walled carbon nanotubes, carbon-covered alumina, glassy carbon, pyrolytic carbon, polymer-derived carbon, fullerenes, amorphous carbon, and cellulosic carbon. In accordance with various aspects of the present disclosure, the carbonaceous support may be oxygen-functionalized, as described herein, prior to nitrogen functionalization.

The carbonaceous support can be mixed with the urea such that the mixture contains a urea to carbonaceous support, weight to weight (w:w), ratio ranging from about 10:1 to about 1:10, alternatively from about 9:1 to about 2:10, alternatively from about 8:1 to about 4:10, alternatively from about 7:1 to about 6:10, alternatively from about 6:1 to about 7.5:10, alternatively from about 5:1 to about 9:10, alternatively from about 4:1 to about 1:1, alternatively from about 3.5:1 to about 1:1, alternatively about 3:1 to about 1:1, and alternatively from about 3:1 to about 1.5:1. In the examples below, a urea to carbonaceous support w:w ratio of about 1.5:1 or about 3:1 is used.

In some instances, the temperature at which mixing is conducted can be room temperature. In other instances, the temperature at which mixing is conducted can be any temperature greater than room temperature but lower than the melting point of the urea.

In some instances, the carbonaceous support and urea can be mixed under an ambient atmosphere. In some instances, the carbonaceous support and can be mixed under an inert atmosphere such as, for example, $N_2(g)$ or $Ar(g)$. Mixing is generally conducted under ambient pressure, but can also be conducted under reduced or elevated pressures in certain circumstances.

After mixing has been completed, the resulting urea/carbonaceous support mixture is subjected to annealing at a temperature or range of temperatures and period(s) of time sufficient to cause thermal decomposition of the urea and subsequent reaction of the thermal decomposition products (ammonia and isocyanic acid) with carbon centers and/or surface oxygen-containing groups of the carbonaceous support, thus forming a nitrogen-functionalized carbonaceous support (see FIG. 1).

In accordance with various aspects of the disclosure, a two-stage annealing process can be utilized. The first stage of the annealing process has a temperature lower than the temperature of the second stage. The annealing stage is generally performed under and inert atmosphere such as $N_2(g)$ or $Ar(g)$. In some instances, the first stage of the annealing process can be conducted at a temperature ranging from about the melting point of urea (133-135° C.) to about 200° C., alternatively from about 140° C. to about 175° C., alternatively from about 140° C. to about 165° C., and alternatively from about 145° C. to about 160° C. The first stage of the annealing process can be conducted for a period of time ranging from about 30 minutes to 4 hours, alternatively from about 45 minutes to about 3.5 hours, alternatively from about 1 hour to about 3 hours, and alternatively from about 1.5 hours to about 2.5 hours. In the examples below, the first stage of annealing is conducted at about 150° C. for about 2 hours.

In some instances, the second stage of the annealing process can be conducted at a temperature ranging from about 200° C. to about 400° C., alternatively from about 225° C. to about 375° C., alternatively from about 250° C. to about 350° C., and alternatively from about 275° C. to about 325° C. The second stage of the annealing process can be conducted for a period of time ranging from about 30 minutes to 4 hours, alternatively from about 45 minutes to about 3.5 hours, alternatively from about 1 hour to about 3 hours, and alternatively from about 1.5 hours to about 2.5 hours. In the examples below, the second stage of the annealing process is conducted at about 300° C. for about 2 hours.

In general, the amount of time required for nitrogen functionalization of carbonaceous supports may vary based on numerous factors including, but not limited to, the w:w ratio of urea to carbonaceous support, the degree of mixing prior to annealing, the annealing parameters the surface area, pore volume and pore size of the carbonaceous support and so on. Furthermore, although specific steps are described above, in some instances, methods according to the disclosure for preparing nitrogen-functionalized carbonaceous supports may have more or less steps than the described steps.

Dual Nitrogen-Functionalized Carbonaceous Supports.

Dual Nitrogen-functionalized carbonaceous supports in accordance with various aspects of the disclosure can be formed by 1) a first two-step reaction process comprising mixing a predetermined amount of carbonaceous support with urea and then annealing the carbonaceous support/urea mixture at an elevated temperature, or range of temperatures, for a period of time sufficient to provide the carbonaceous support with reactive nitrogen species (that is, nitrogen-containing functional groups) capable of physisorption and/or chemisorption of metal nanoparticles; and 2) a second two-step reaction process comprising mixing a predetermined amount of nitrogen-functionalized carbonaceous support (formed in the first two-step reaction process) with urea and then annealing the nitrogen-functionalized carbonaceous support/urea mixture at an elevated temperature, or range of temperatures, for a period of time sufficient to provide the nitrogen-functionalized carbonaceous support with additional reactive nitrogen species capable of physisorption and/or chemisorption of metal nanoparticles. Each of the two-step mixing and anneal reaction processes result in "soft nitriding," where the urea thermally decomposes to ammonia ($NH_3$) and isocyanic acid (H—N=C=O), which react with carbon centers and/or surface oxygen-containing groups of the carbonaceous support (see FIG. 1).

In some instances, activated carbon (AC) is used as the carbonaceous support that is nitrogen-functionalized. In some instances, other carbonaceous supports that may be nitrogen-functionalized include, but are not limited to, graphite, graphite intercalation compounds, graphene, carbon black, charcoal, bone char, activated carbon fibers, single- or multi-walled carbon nanotubes, carbon-covered alumina, glassy carbon, pyrolytic carbon, polymer-derived carbon, fullerenes, amorphous carbon, and cellulosic carbon. In accordance with various aspects of the present disclosure, the carbonaceous support may be oxygen-functionalized, as described herein, prior to nitrogen functionalization.

In the first two-step process, the carbonaceous support can be mixed with the urea such that the mixture contains a urea to carbonaceous support, weight to weight (w:w), ratio ranging from about 10:1 to about 1:10, alternatively from about 9:1 to about 2:10, alternatively from about 8:1 to about 4:10, alternatively from about 7:1 to about 6:10, alternatively from about 6:1 to about 7.5:10, alternatively from about 5:1 to about 9:10, alternatively from about 4:1 to about 1:1, alternatively from about 3.5:1 to about 1:1, alternatively about 3:1 to about 1:1, and alternatively from about 3:1 to about 1.5:1. In the examples below, a urea to carbonaceous support w:w ratio of about 1.5:1 or about 3:1 is used.

In some instances, the temperature at which mixing is conducted can be room temperature. In other instances, the temperature at which mixing is conducted can be any temperature greater than room temperature but lower than the melting point of the urea.

In some instances, the carbonaceous support and urea can be mixed under an ambient atmosphere. In some instances, the carbonaceous support and can be mixed an inert atmosphere such as, for example, $N_2(g)$ or $Ar(g)$. Mixing is generally conducted under ambient pressure, but can also be conducted under reduced or elevated pressures in certain circumstances.

After mixing has been completed, the resulting urea/carbonaceous support mixture is subjected to annealing at a temperature or range of temperatures and period(s) of time sufficient to cause thermal decomposition of the urea and subsequent reaction of the thermal decomposition products (ammonia and isocyanic acid) with carbon centers and/or surface oxygen-containing groups of the carbonaceous support, thus forming a nitrogen-functionalized carbonaceous support (see FIG. 1).

In accordance with various aspects of the disclosure a two-stage annealing process can be utilized in the first two-step reaction process. The first stage of the annealing process has a temperature lower than the temperature of the second stage. The annealing stage is generally performed under and inert atmosphere such as $N_2(g)$ or $Ar(g)$. In some instances, the first stage of the annealing process can be conducted at a temperature ranging from about the melting point of urea (133-135° C.) to about 200° C., alternatively from about 140° C. to about 175° C., alternatively from about 140° C. to about 165° C., and alternatively from about 145° C. to about 160° C. The first stage of the annealing process can be conducted for a period of time ranging from about 30 minutes to 4 hours, alternatively from about 45 minutes to about 3.5 hours, alternatively from about 1 hour to about 3 hours, and alternatively from about 1.5 hours to about 2.5 hours. In the examples below, the first stage of annealing is conducted at about 150° C. for about 2 hours.

In some instances, the second stage of the annealing process in the first two-step reaction process can be conducted at a temperature ranging from about 200° C. to about 400° C., alternatively from about 225° C. to about 375° C., alternatively from about 250° C. to about 350° C., and alternatively from about 275° C. to about 325° C. The second stage of the annealing process can be conducted for a period of time ranging from about 30 minutes to 4 hours, alternatively from about 45 minutes to about 3.5 hours, alternatively from about 1 hour to about 3 hours, and alternatively from about 1.5 hours to about 2.5 hours. In the examples below, the second stage of the annealing process is conducted at about 300° C. for about 2 hours.

In general, the amount of time required for nitrogen functionalization of carbonaceous supports may vary based on numerous factors including, but not limited to, the w:w ratio of urea to carbonaceous support, the degree of mixing prior to annealing, the annealing parameters, the surface area, pore volume and pore size of the carbonaceous support and so on. Furthermore, although specific steps are described above, in some instances, methods according to the disclosure for preparing nitrogen-functionalized carbonaceous supports may have more or less steps than the described steps.

After completion from the first two-step reaction process, a nitrogen-functionalized carbonaceous support is formed.

The nitrogen-functionalized carbonaceous support is then subject to the second two-step reaction process.

In the second two-step process, the nitrogen-functionalized carbonaceous support can be mixed with the urea such that the mixture contains a urea to nitrogen-functionalized carbonaceous support, weight to weight (w:w), ratio ranging from about 10:1 to about 1:10, alternatively from about 9:1 to about 2:10, alternatively from about 8:1 to about 4:10, alternatively from about 7:1 to about 6:10, alternatively from about 6:1 to about 7:10, alternatively from about 5:1 to about 7.5:10, alternatively from about 4:1 to about 8:10, alternatively from about 3.5:1 to about 9:10, alternatively about 3:1 to about 1:1, and alternatively from about 2.5:1 to about 1.5:1. In the examples below, a urea to nitrogen-functionalized carbonaceous support w:w ratio of about 2:1 is used in the second two-step process.

In some instances, the temperature at which mixing is conducted can be room temperature. In other instances, the temperature at which mixing is conducted can be any temperature greater than room temperature but lower than the melting point of the urea.

In some instances, the carbonaceous support and urea can be mixed under an ambient atmosphere. In some instances, the nitrogen-functionalized carbonaceous support and can be mixed an inert atmosphere such as, for example, $N_2(g)$ or $Ar(g)$. Mixing is generally conducted under ambient pressure, but can also be conducted under reduced or elevated pressures in certain circumstances.

After mixing has been completed, the resulting urea/nitrogen-functionalized carbonaceous support mixture is subjected to annealing, the second step of the second two-step process, at a temperature or range of temperatures and period(s) of time sufficient to cause thermal decomposition of the urea and subsequent reaction of the thermal decomposition products (ammonia and isocyanic acid) with carbon centers and/or surface oxygen-containing groups of the nitrogen-functionalized carbonaceous support, thus forming a dual nitrogen-functionalized carbonaceous support (see FIG. 1).

In accordance with various aspects of the disclosure a two-stage annealing process can be utilized in the second two-step reaction process. The first stage of the annealing process in the second two-step reaction process comprises a gradual rise in temperature until reaching the temperature of the second stage. The annealing stage is generally performed under and inert atmosphere such as $N_2(g)$ or $Ar(g)$. In some instances, the first stage of the annealing process can start at about room temperature and end at a temperature ranging from about 150° C. to about 300° C., alternatively an end temperature ranging from about 150° C. to about 275° C., alternatively an end temperature ranging from about 155° C. to about 250° C., alternatively an end temperature ranging from about 160° C. to about 225° C., alternatively an end temperature ranging from about 160° C. to about 200° C., alternatively an end temperature ranging from about 165° C. to about 185° C., and alternatively an end temperature ranging from about 170° C. to about 180° C. The ramp rate of the first stage of the annealing process can range from about 1° C./min to about 25° C./min, alternatively from about 1.5° C./min to about 20° C./min, alternatively from about 2° C./min to about 15° C./min, alternatively from about 2.5° C./min to about 10° C./min, alternatively from about 3° C./min to about 8° C./min, alternatively from about 3.5° C./min to about 7.5° C./min, and alternatively from about 4° C./min to about 6° C./min. In the examples below, the first stage of annealing is conducted at a ramp rate of 5° C./min until a temperature of about 175° C. has been reached.

In some instances, the second stage of the annealing process in the second two-step reaction process is conducted at the end temperature of the first stage of annealing. The second stage of the annealing process can be conducted for a period of time ranging from about 30 minutes to 12 hours, alternatively from about 45 minutes to about 10 hours, alternatively from about 1 hour to about 8 hours, and alternatively from about 2 hours to about 6 hours, and alternatively from about 3 hours to about 5 hours. In the examples below, the second stage of the annealing process of the second two-step reaction process is conducted at about 175° C. for about 4 hours.

In general, the amount of time required for dual nitrogen functionalization of carbonaceous supports may vary based on numerous factors including, but not limited to, the w:w ratio of urea to carbonaceous support, the degree of mixing prior to annealing, the annealing parameters, the surface area, pore volume and pore size of the carbonaceous support/nitrogen-functionalized carbonaceous support and so on. Furthermore, although specific steps are described above, in some instances, methods according to the disclosure for preparing dual nitrogen-functionalized carbonaceous supports may have more or less steps than the described steps.

Metal Nanoparticle-Bearing Carbonaceous Supports Prepared by Incipient Wetness.

Metal nanoparticle-bearing carbonaceous supports (that is, solid-supported metal-catalysts) according to various aspects of the disclosure can be produced according to the following incipient wetness method.

First, a metal salt solution is prepared. The metal salt solution is prepared such that the solution has a metal concentration, in mg of metal per mL of solvent, ranging from about 5 mg/mL to about 60 mg/mL, alternatively from about 10 mg/mL to about 55 mg/mL, alternatively from about 15 mg/mL to about 50 mg/mL, alternatively from about 20 mg/mL to about 45 mg/mL, alternatively from about 25 mg/mL to about 40 mg/mL, and alternatively from about 30 mg/mL to about 35 mg/mL. The choice of solvent is not particularly limiting. The solvent can be any solvent that is removable under reduced pressure at room temperature and in which the metal salt can undergo dissociation. In some instances, the solvent is water. In some instances, the solvent is a polar protic solvent such as, for example, water, alcohols, carboxylic acids, and primary or secondary amines. In some instances, the solvent is a polar protic solvent such as, for example, chlorinated solvents, tetrahydrofuran (THF), and acetonitrile.

The metal salt solution is then combined with an amount of nitrogen- and/or oxygen-functionalized carbonaceous support. The metal salt solution is combined with the nitrogen- and/or oxygen-functionalized carbonaceous support to provide a metal ion to nitrogen-functionalized carbonaceous support, weight to weight (w:w), ratio ranging from, ranging from 0.1:100 to about 20:100. In some instances, metal ion to carbonaceous support w:w ratio ranges from about 0.5 to about 17.5:100, alternatively from about 1:100 to about 15:100, alternatively from about 1.5:100 to about 12.5:100, alternatively from about 2:100 to about 10:100, alternatively from about 2.5:100 to about 9:100, alternatively from about 3:100 to about 8:100, alternatively from about 3.5:100 to about 7:100, alternatively from about 4:100 to about 6:100, and alternatively from about 4.5:100 to about 5.5:100. In some instances, the metal salt solution is then combined with an amount of nitrogen- and/or oxygen-functionalized carbonaceous support while mixing. In some instances, the metal salt solution is then combined with an amount of nitrogen- and/or oxygen-functionalized carbonaceous support in a dropwise fashion. The metal salt solution and nitrogen- and/or oxygen-functionalized carbonaceous material are mixed until homogeneous or substantially homogeneous. In some instance, the mixing of the metal salt solution and nitrogen- and/or oxygen-functionalized carbonaceous support results in the formation of a slurry. In the examples below, 33.4 mg of $Pd(NO_3)_2 \cdot 2H_2O$ was dissolved in 0.4 mL of ultrapure water to form a 33.3 mg/mL (13.3 mg Pd in 0.4 mL water) Pd solution, and 0.15 mL of this solution was added dropwise onto 100 mg of a nitrogen- and/or oxygen-functionalized carbonaceous material and mixed. As such, in the examples below, the Pd to carbonaceous support w:w ratio was about 5:100.

The resulting slurry is then vacuum dried at room temperature. The dried sample is then calcined using a two-stage process. The first stage of the calcination process comprises a gradual rise in temperature until reaching the temperature of the second stage. The first stage is generally performed under and inert atmosphere such as $N_2(g)$ or $Ar(g)$. In some instances, the first stage of the calcination process can start at about room temperature and end at a temperature ranging from about 200° C. to about 400° C., alternatively an end temperature ranging from about 225° C. to about 375° C., alternatively an end temperature ranging from about 250° C. to about 350° C., alternatively an end temperature ranging from about 275° C. to about 325° C., and alternatively an end temperature ranging from about 290° C. to about 310° C. The ramp rate of the first stage of the annealing process can range from about 1° C./min to about 25° C./min, alternatively from about 1.5° C./min to about 20° C./min, alternatively from about 2° C./min to about 15° C./min, alternatively from about 2.5° C./min to about 10° C./min, alternatively from about 3° C./min to about 8° C./min, alternatively from about 3.5° C./min to about 7.5° C./min, and alternatively from about 4° C./min to about 6° C./min. In the examples below, the first stage of calcination is conducted at a ramp rate of 5° C./min until a temperature of about 300° C. has been reached.

The second stage of the calcination process is conducted at the end temperature of the first stage in an $H_2(g)$ atmosphere. The $H_2(g)$ atmosphere is provided for the reduction of the metal ions and production of corresponding metallic nanoparticles. The second stage of the calcination process can be conducted for a period of time ranging from about 15 minutes to 8 hours, alternatively from about 30 minutes to about 6 hours, alternatively from about 45 minutes to about 4 hours, and alternatively from about 1 hour to about 3 hours, and alternatively from about 1.5 hours to about 2.5 hours. In the examples below, the second stage of the calcination process is conducted at about 300° C. for about 2 hours.

The resulting solid metal-catalyst can be subjected to one more purification processes after calcination and $H_2(g)$ reduction or stored for later use as-is.

Although specific steps are described above, in some instances, methods according to the disclosure for metal-catalyst production via incipient wetness may have more or less steps than the described steps.

Metal Nanoparticle-Bearing Carbonaceous Supports Prepared by Wet Impregnation.

Metal nanoparticle-bearing carbonaceous supports (that is, solid-supported metal-catalysts) according to various aspects of the disclosure can be produced according to the following wet impregnation method. First, an amount of nitrogen- and/or oxygen-functionalized carbonaceous support is dispersed water. The concentration (in mg/mL) of nitrogen- and/or oxygen-functionalized carbonaceous support to water in the dispersion can range from about 0.1 mg/mL to about 10 mg/mL, alternatively from about 0.2 mg/mL to about 9 mg/mL, from about 0.3 mg/mL to about 8 mg/mL, alternatively from about 0.4 mg/mL to about 7 mg/mL, alternatively from about 0.5 mg/mL to about 6 mg/mL, alternatively from about 0.6 mg/mL to about 4 mg/mL, alternatively from about 0.7 mg/mL to about 2 mg/mL, alternatively from about 0.8 mg/mL to about 1.5 mg/mL, alternatively from about 0.8 mg/mL to about 1.25 mg/mL, and alternatively from about 0.9 mg/mL to about 1.1 mg/mL. Generally, the nitrogen- and/or oxygen-functionalized carbonaceous support is dispersed in water using a high frequency dispersion method such as ultrasonication using an ultrasonic bath, ultrasonic probe or ultrasonic horn. The first period of time by which dispersion occurs can range from about 30 seconds to about 30 minutes, alternatively from about 1 minute to about 25 minutes, alternatively from about 2 minutes to about 20 minutes, alternatively from about 3 minutes to about 15 minutes, alternatively from about 3 minutes to about 10 minutes, and alternatively from about 4 minutes to about 6 minutes. Generally, dispersing during the first period of time takes place under ambient temperature and pressure in a sealed container. In some instances, however, the dispersing temperature can be lowered or raised relative to room temperature to any temperature above the melting point (0° C.) and below the boiling point (100° C.) of water. Also, in some instances the dispersing temperature can be lowered or raised relative to atmospheric pressure. Generally, the dispersing during the first period of time will take place under an ambient atmosphere. In some instances, however, dispersing during the first period of time can take place under an inert atmosphere such as $N_2(g)$ or $Ar(g)$. In the examples below, 100 mg of nitrogen- and/or oxygen-functionalized carbonaceous support was dispersed in 5 mL of ultrapure water by sonication for 5 min.

The resulting suspension is then mixed with a metal salt. The metal salt can be added to the suspension while stirring. The metal salt can be added to the suspension instantly or incrementally over a period of time. The metal salt is added to the suspension in an amount such that the suspension will have a metal concentration, in mg of metal per mL of water, ranging from about 0.25 mg/mL to about 15 mg/mL, alternatively from about 0.5 mg/mL to about 12 mg/mL, alternatively from about 0.75 mg/mL to about 10 mg/mL, alternatively from about 1.25 mg/mL to about 8 mg/mL, alternatively from about 1.5 mg/mL to about 6 mg/mL, alternatively from about 1.75 mg/mL to about 4 mg/mL, and alternatively from about 2 mg/mL to about 3 mg/mL. The metal salt can be any metal salt that can undergo dissociation in water and subsequently be reduced to form metal nanoparticles. The suspension is mixed with the metal salt to provide a metal ion to nitrogen-functionalized carbonaceous support, weight to weight (w:w), ratio ranging from, ranging from 0.1:100 to about 20:100. In some instances, metal ion to carbonaceous support w:w ratio ranges from about 0.5 to about 17.5:100, alternatively from about 1:100 to about 15:100, alternatively from about 1.5:100 to about 12.5:100, alternatively from about 2:100 to about 10:100, alternatively from about 2.5:100 to about 9:100, alternatively from about 3:100 to about 8:100, alternatively from about 3.5:100 to about 7:100, alternatively from about 4:100 to about 6:100, and alternatively from about 4.5:100 to about 5.5:100.

In the wet impregnation examples below, 12.5 mg of $Pd(NO_3)_2 \cdot 2H_2O$ or 13.8 mg of $Na_2PdCl_4$ (each having about 5 mg of Pd) was dissolved in the suspension having 5 mL of water to form a 1 mg/mL (5 mg Pd/5 mL water) Pd-containing suspension which was mixed for 2 hours. As such, in the examples below, the Pd to carbonaceous support w:w ratio was about 5:100.

After mixing, a solution comprising a reducing agent is added to the suspension and the two are stirred for a period of time sufficient for the formation and deposition of Pd nanoparticles onto the nitrogen- and/or oxygen-functionalized carbonaceous support. Any suitable reducing agent may be used. Generally the reducing agent is used in excess relative to the amount of metal in the suspension to ensure complete conversion of the metal ions to metal nanoparticles. In the examples below, an $NaBH_4$ solution (35.6 mg of $NaBH_4$ in 1 mL of 2 M NaOH, molar ratio of $NaBH_4$:Pd=20) is added to the suspension and mixed for 2 h at room temperature.

The resulting solid metal-catalyst is collected, purified and dried.

Although specific steps are described above, in some instances, methods according to the disclosure for metal-catalyst production via wet impregnation may have more or less steps than the described steps.

Metal Nanoparticle-Bearing Carbonaceous Supports Prepared by Ethylene Glycol (EG) Reduction.

Metal nanoparticle-bearing carbonaceous supports (that is, solid-supported metal-catalysts) according to various aspects of the disclosure can be produced according to the following ethylene glycol (EG) reduction method.

First, an amount of nitrogen- and/or oxygen-functionalized carbonaceous support is dispersed in EG for a first period of time. The concentration (in mg/mL) of nitrogen- and/or oxygen-functionalized carbonaceous support in EG can range from about 0.1 mg/mL to about 10 mg/mL, alternatively from about 0.2 mg/mL to about 9 mg/mL, from about 0.3 mg/mL to about 8 mg/mL, alternatively from about 0.4 mg/mL to about 7 mg/mL, alternatively from about 0.5 mg/mL to about 6 mg/mL, alternatively from about 0.6 mg/mL to about 5 mg/mL, alternatively from about 0.7 mg/mL to about 4 mg/mL, alternatively from about 0.8 mg/mL to about 3 mg/mL, alternatively from about 0.9 mg/mL to about 2 mg/mL, and alternatively from about 1.0 mg/mL to about 1.5 mg/mL. Generally, the nitrogen- and/or oxygen-functionalized carbonaceous support is dispersed in EG using a high frequency dispersion method such as ultrasonication using an ultrasonic bath, ultrasonic probe or ultrasonic horn. The first period of time by which dispersion occurs can range from about 5 minutes to about 2 hours, alternatively from about 5 minutes to about 1.5 hours, alternatively from about 5 minutes to about 1 hour, alternatively from about 5 minutes to about 45 minutes, alternatively from about 5 minutes to about 30 minutes, and alternatively from about 5 minutes to about 15 minutes. Generally, dispersing during the first period of time takes place under ambient temperature and pressure in a sealed container. In some instances, however, the dispersing temperature can be lowered or raised relative to room temperature to any temperature above the melting point (about −13° C.) and below the boiling point (about 197° C.) of EG. Also, in some instances the dispersing pressure can be lowered or raised relative to atmospheric pressure. Generally, the dispersing during the first period of time will take place under an ambient atmosphere. In some instances, however, dispersing during the first period of time can take place under an inert atmosphere such as $N_2(g)$ or $Ar(g)$.

The dispersion is then further mixed for a second period of time. The second period of time (the mixing time) is generally longer than the first period of time (the dispersing time). The mixing time can range from about 1 hour to about 24 hours, alternatively from about 2 hours to about 22 hours, alternatively from about 4 hours to about 20 hours, alternatively from about 4 hours to about 20 hours, alternatively from about 6 hours to about 18 hours, alternatively from about 8 hours to about 16 hours, alternatively from about 10 hours to about 14 hours, and alternatively from about 11 hours to about 13 hours. Mixing during the second period of time is generally conducted using a mechanical mixing means such as, for example, a magnetic stir bar or an impeller. Mixing can be conducted at rates ranging from about 100 rotations per minute (rpm) to about 2500 rpm, alternatively from about 200 rpm to about 2300 rpm, alternatively from about 300 rpm to about 2150 rpm, alternatively from about 400 rpm to about 2000 rpm, alternatively from about 500 rpm to about 1800 rpm, alternatively from about 600 rpm to about 1600 rpm, alternatively from about 700 rpm to about 1400 rpm, alternatively from about 800 rpm to about 1200 rpm, and alternatively from about 900 rpm to about 1100 rpm. Generally, mixing during the second period of time takes place under ambient temperature and pressure in a sealed container. In some instances, however, the mixing temperature can be lowered or raised, relative to room temperature, to any temperature above the melting point (about −13° C.) and below the boiling point (about 197° C.) of EG. Also, in some instances the mixing pressure can be lowered or raised relative to atmospheric pressure. Generally, the mixing during the second period of time will take place under an ambient atmosphere. In some instances, however, mixing during the second period of time can take place under an inert atmosphere such as $N_2(g)$ or $Ar(g)$.

After the mixing step is completed, a suspension of the nitrogen- and/or oxygen-functionalized carbonaceous support in the EG is thus formed. In the example below, 100 mg of nitrogen- and/or oxygen-functionalized carbonaceous support was dispersed in 80 mL of EG (1.25 mg/mL) by sonication for 10 min, and further mixed at 1,000 rpm for 12 h in a 250-mL round-bottom flask, to form the suspension.

Then, a metal salt solution is prepared and added to the suspension. The metal salt solution can be added to the suspension while stirring. The metal salt solution can be added to the suspension in a dropwise fashion. The metal salt solution is prepared such that the solution has a metal concentration, in mg of metal per mL of solvent, ranging from about 0.25 mg/mL to about 15 mg/mL, alternatively from about 0.5 mg/mL to about 12 mg/mL, alternatively from about 0.75 mg/mL to about 10 mg/mL, alternatively from about 1.25 mg/mL to about 8 mg/mL, alternatively from about 1.5 mg/mL to about 6 mg/mL, alternatively from about 1.75 mg/mL to about 4 mg/mL, and alternatively from about 2 mg/mL to about 3 mg/mL. The choice of solvent is not particularly limiting. The solvent can be any solvent that is soluble with EG and in which the metal salt can undergo dissociation. In some instances, the solvent is a polar protic solvent such as, for example, water, alcohols, carboxylic acids, and primary or secondary amines. In some instances, the solvent is a polar protic solvent such as, for example, chlorinated solvents, tetrahydrofuran (THF), ethyl acetate, acetonitrile, dimethylformamide (DMF), and dimethyl sulfoxide (DMSO). The suspension is mixed with the metal salt solution to provide a metal ion to nitrogen-functionalized carbonaceous support, weight to weight (w:w), ratio ranging from, ranging from 0.1:100 to about 20:100. In some instances, metal ion to carbonaceous support w:w ratio ranges from about 0.5 to about 17.5:100, alternatively from about 1:100 to about 15:100, alternatively from about 1.5:100 to about 12.5:100, alternatively from about 2:100 to about 10:100, alternatively from about 2.5:100 to about 9:100, alternatively from about 3:100 to about 8:100, alternatively from about 3.5:100 to about 7:100, alternatively from about 4:100 to about 6:100, and alternatively from about 4.5:100 to about 5.5:100. In the EG reduction example below, 10.6 mg of Pd acetate (Pd(Ac)$_2$; containing about 5 mg of Pd) was dissolved in 2 mL of DMF to form a 2.5 mg/mL (5 mg Pd/2 mL DMF) Pd solution and the entirety of the Pd solution is added to the suspension. As such, in the examples below, the Pd to carbonaceous support w:w ratio was about 5:100.

The metal salt solution and suspension are then mixed for a third period of time. The mixing time can range from about 5 minutes to about 2 hours, alternatively from about 10 minutes to about 1.5 hours, alternatively from about 15 minutes to about 1 hour, alternatively from about 20 minutes to about 45 minutes, and alternatively from about 25 minutes to about 35 minutes. Mixing during the third period of time is generally conducted using a mechanical mixing means such as, for example, a magnetic stir bar or an impeller. Mixing can be conducted at rates ranging from about 100 rpm to about 2500 rpm, alternatively from about 200 rpm to about 2300 rpm, alternatively from about 300 rpm to about 2150 rpm, alternatively from about 400 rpm to about 2000 rpm, alternatively from about 500 rpm to about 1800 rpm, alternatively from about 600 rpm to about 1600 rpm, alternatively from about 700 rpm to about 1400 rpm, alternatively from about 800 rpm to about 1200 rpm, and alternatively from about 900 rpm to about 1100 rpm. Generally, mixing during the third period of time takes place under ambient temperature and pressure in a sealed container. In some instances, however, the mixing temperature can be lowered or raised, relative to room temperature, to any temperature above the melting point (about −13° C.) and below the boiling point (about 197° C.) of EG. Also, in some instances the mixing temperature can be lowered or raised relative to atmospheric pressure. Generally, the mixing during the second period of time will take place under an ambient atmosphere. In some instances, however, mixing during the second period of time can take place under an inert atmosphere such as N$_2$(g) or Ar(g).

After mixing for the third period of time, a strong base such as NaOH or KOH (0.1 to 1 M in EG) is added to adjust the pH of the suspension to be basic. In some instances, the pH is adjusted to about 11.

After adjusting the pH, the suspension is mixed under elevated temperature for a fourth period of time. In some instances, is mixed under elevated temperatures for fourth period of time is performed under reflux conditions. One of skill in the art will appreciate that the mixing temperature required for reflux conditions will depend of various factors including, but not limited to, the solvent used to make the metal salt solution, the boiling point of by-products formed during mixing, the mixing pressure, and so on. The mixing time can range from about 30 minutes to about 18 hours, alternatively from about 1 hour to about 16 hours, alternatively from about 2 hours to about 12 hours, alternatively from about 3 hours to about 10 hours, alternatively from about 8 hours to about 16 hours, alternatively from about 4 hours to about 8 hours, and alternatively from about 5 hours to about 7 hours. Mixing during the second period of time is generally conducted using a mechanical mixing means such as, for example, a magnetic stir bar or an impeller. Mixing using the mechanical mixing means can be conducted at mixing rates ranging from about 50 rpm to about 1200 rpm, alternatively from about 100 rpm to about 1100 rpm, alternatively from about 200 rpm to about 1000 rpm, alternatively from about 300 rpm to about 900 rpm, alternatively from about 400 rpm to about 800 rpm, and alternatively from about 500 rpm to about 700 rpm.

After refluxing, the suspension is cooled to room temperature, the resulting solid metal-catalyst is collected, purified and dried.

Although specific steps are described above, in some instances, methods according to the disclosure for metal-catalyst production via EG reduction may have more or less steps than the described steps.

EXAMPLES

Materials and Chemicals.

N,N-Dimethylformamide (DMF, ≥99.8%), sodium nitrite (NaNO$_2$, ≥99.0%), potassium bromate (KBrO$_3$, ≥99.8%), sodium chlorite (NaClO$_2$, technical grade, 80%), potassium chlorate (KClO$_3$, ≥99.0%), sodium borohydride (NaBH$_4$, ≥98.0%), palladium nitrate dihydrate (Pd(NO$_3$)$_2$.2H$_2$O, ~40% Pd basis), palladium acetate (Pd (Ac)$_2$, reagent grade, 98%), urea (98%), hydrogen peroxide (H$_2$O$_2$, contains inhibitor, 35 wt % in H$_2$O), and activated carbon (DARCO®, 100 mesh particle size, powder, AC) were purchased from Sigma-Aldrich (MO, USA). Ethylene glycol (EG, laboratory grade) was purchased from Fisher Scientific (USA). All chemicals were used as received. Aqueous solutions were made from ultrapure water (18.2 MΩ·cm at 25° C.) produced by a Millipore system (Direct-Q 3 UV, Millipore, USA).

Synthesis of Oxygen-Functionalized Activated Carbon (OAC).

Activated carbon (5 g) was mixed with H$_2$O$_2$ (125 mL, 35 wt %) at 50° C. for 5 hours in a 250 mL round bottom flask. The resulting solid was then filtered and washed with an amount of ultrapure water sufficient to remove remaining H$_2$O$_2$ and reaction by-products, and dried in a desiccator at room temperature.

Synthesis of Nitrogen-Functionalized Activated Carbon (NAC).

NAC (NAC$_x$ where x is the mass ratio of urea to AC, x=1.5 or 3) was obtained by the "soft nitriding" of AC with urea at temperatures of 150-300° C. AC (2 g) was physically ground with urea (3 g or 6 g), and annealed at 150° C. for 2 h and then at 300° C. for 2 h in N$_2$(g) atmosphere. The resulting solid was then filtered and washed with amounts of ethanol and ultrapure water sufficient to remove remaining urea and reaction by-products, and dried in a desiccator at room temperature.

Synthesis of Nitrogen- and Oxygen Functionalized Activated Carbon (NOAC).

NOAC (NOAC$_x$ where x is the mass ratio of urea to OAC, x=1.5) was obtained by the "soft nitriding" of OAC with urea at temperatures of 150-300° C. OAC (2 g) was physically ground with urea (3 g), and annealed at 150° C. for 2 h and then at 300° C. for 2 h in N$_2$(g) atmosphere. The resulting solid was then filtered and washed with an amount of ultrapure water sufficient to remove remaining urea and reaction by-products, and dried in a desiccator at room temperature.

Synthesis of Dual Nitrogen-Functionalized Activated Carbon. Dual N-functionalized AC was prepared by repeating the soft-nitriding of AC with urea twice and is denoted as $NAC_{x-y}$, where x is the mass ratio of urea to AC in the first nitridation step and y is the mass ratio of urea to $NAC_x$ in the second nitridation step, x=1.5, y=2). A mixture of 1 g of as-prepared $NAC_{1.5}$ and 2 g of urea was well-ground, heated to 175° C. at a rate of 5° C. min' in $N_2$(g) atmosphere, and held at the same temperature in $N_2$ for 4 h. The resulting solid was washed with sufficient ethanol and ultrapure water remaining urea and reaction by-products, and dried in a vacuum desiccator at room temperature.

Synthesis of Dual Nitrogen- and Oxygen-Functionalized Activated Carbon.

Dual N- and O-functionalized AC was prepared by repeating the soft-nitriding of OAC with urea twice and is denoted as $NOAC_{x-y}$, where x is the mass ratio of urea to OAC in the first nitridation step and y is the mass ratio of urea to $NOAC_x$ in the second nitridation step, x=1.5, y=2). A mixture of 1 g of as-prepared $NOAC_{1.5}$ and 2 g of urea was well-ground, heated to 175° C. at a rate of 5° C. $min^{-1}$ in $N_2$(g) atmosphere, and held at the same temperature in $N_2$ for 4 h. The resulting solid was washed with sufficient ethanol and ultrapure water remaining urea and reaction by-products, and dried in a vacuum desiccator at room temperature.

Preparation of Pd Catalysts by Incipient Wetness.

Pd-Catalysts were prepared via incipient wetness followed by subsequent calcination in $N_2$(g) and reduction in $H_2$(g). 4.76 wt % of Pd (theoretical loading, 5 wt % to the catalyst support) was deposited on the catalyst supports and the prepared catalysts were designated as Pd/AC, Pd/OAC, $Pd/NAC_{1.5}$, $Pd/NAC_3$, $Pd/NAC_{1.5-2}$, $Pd/NOAC_{1.5}$, and $Pd/NOAC_{1.5-2}$.

33.4 mg of $Pd(NO_3)_2 \cdot 2H_2O$ was dissolved in 0.4 mL of ultrapure water to form a Pd solution, and 0.15 mL of this Pd solution was independently added dropwise onto 100 mg of each of $NAC_{1.5}$, $NAC_3$, $NAC_{1.5-2}$, $NOAC_{1.5}$, and $NOAC_{1.5-2}$ and mixed.

For loading Pd onto AC and OAC, 31.3 mg of $Pd(NO_3)_2 \cdot 2H_2O$ was dissolved in 0.75 mL of ultrapure water to form a Pd solution, and 0.3 mL of this Pd solution was independently added dropwise onto 100 mg of each of AC and OAC and mixed.

The resulting slurries were completely vacuum dried at room temperature. After incipient wetness, each of the samples were heated to 300° C. with a ramp rate of 5° C./min, and held at 300° C. for 2 h in $N_2$. Next the samples were heated to and held at 300° C. for 2 h in $H_2$(g) for the production of metallic Pd nanoparticles.

Preparation of Pd Catalysts by Wet Impregnation.

100 mg of catalyst support was dispersed in 5 mL of ultrapure water by sonication for 5 min. Then, a Pd precursor (12.5 mg of $Pd(NO_3c)_2 \cdot 2H_2O$ or 13.8 mg of $Na_2PdCl_4$, namely 5 mg of Pd) was added to the resultant catalyst support suspension and mixed for 2 hours. Fresh $NaBH_4$ solution (35.6 mg of $NaBH_4$ in 1 mL of 2 M NaOH, molar ratio of $NaBH_4$:Pd=20) was then added into the above suspension and further mixed for 2 h at room temperature for the formation and deposition of Pd nanoparticles onto the support. The theoretical Pd loading was always 4.76 wt % (metal to the total catalyst mass, or 5 wt % of metal to the catalyst support). The final solid was washed with ultrapure water, collected by filtration, vacuum dried at room temperature.

Preparation of Pd Catalysts by Ethylene Glycol (EG) Reduction.

Typically, 100 mg of catalyst support was dispersed in 80 mL of EG by sonication for 10 min, and further mixed at 1,000 rpm for 12 h in a 250-mL round-bottom flask. Pd acetate $(Pd(Ac)_2)$ solution (10.6 mg of $Pd(Ac)_2$ in 2 mL of DMF, 5 mg of Pd) was then added dropwise into the resultant catalyst support suspension. After mixing at 1,000 rpm for 0.5 h, NaOH (0.5 M in EG) was added to adjust the pH of the suspension to 11, and then the suspension was refluxed at 125° C. for 6 h while mixing at 600 rpm in an oil bath. After cooling down to room temperature, the solid was collected by filtration, washed with ultrapure water, and dried in a vacuum desiccator at room temperature.

Catalyst Characterization.

The nanoparticle sizes of the catalysts and elemental distribution were characterized by a transmission electron microscope (TEM, FEI Talos™ F200X, 200 kV). At least 400 Pd nanoparticles from at least 6 different locations were imaged and analyzed for particle sizes with ImageJ. The catalysts were first dispersed in ethanol by sonication for about 10 min, then cast and dried on a Cu grid with a carbon support before imaging. X-ray photoelectron spectroscopy (XPS, PHI 5600) of the catalysts was performed under UHV conditions (pressure <10-8 Torr) using a MgKα source (1253.6 eV). Photoelectrons were measured with a hemispherical energy analyzer with 58.7 eV constant pass energy. Peak positions were referenced to C1s, 284.5 eV, and CasaXPS was used to determine chemical composition and atomic concentrations in the near surface region (within a depth of 10 nm). Brunauer-Emmitt-Teller (BET) surface area and porosity analyses were performed by liquid $N_2$ adsorption/desorption using a Micromeritics TriStar 3000. Isotherm adsorption data for $P_0/P$ was recorded from 0.060-0.989. The volume of micropores was determined by the t-plot analysis, and the volume of mesopores was determined by the BJH analysis. Samples were degassed at 150° C. for 12 h under dynamic vacuum ($10^{-s}$ Torr) prior to analysis. One of the three sample measurement ports of the TriStar was equipped with an empty sample tube with which the saturation vapor pressure $(P_0)$ of $N_2$ was measured concurrently with each measurement of the equilibrium vapor pressure (P) over the sample. Bulk carbon, hydrogen, and nitrogen were analyzed on Model CE 440 CHN Analyzer. Bulk Pd contents of the catalysts were determined by inductively coupled plasma-mass spectrometry (ICP-MS, Agilent 7500i Benchtop). CO chemisorption was measured in an AutoChem 2920 II (Micromeritics) equipped with a thermal conductivity detector (TCD) for evaluating Pd dispersion. Zeta potentials of the catalysts were characterized by dynamic light scattering and electrophoresis on a Zetasizer nano ZS instrument (Malvern Instruments, U.K.).

Batch Reactions for Oxyanion Reduction.

The batch reaction experiments of nitrite, bromate, and chlorite hydrogenation were performed in a 50 mL glass bottle at 20±1° C. with continuous $H_2$ (150 mL min') and $CO_2$ flow (70 mL $min^{-1}$) under atmospheric pressure (1 atm). The reaction solution was mixed at ca. 500 rpm to reduce mass transfer limitations (see details in SI for mass transfer rate evaluation). 5 mg of catalyst was dispersed in 50 mL of ultrapure water (i.e., catalyst loading of 0.1 g/L) by sonication for 30 min, and next pre-sparged with $H_2$ and $CO_2$ for 20 min. As for the hydrogenation tests of chlorate, 5 mg of catalyst was dispersed in 50 mL of water with a pH of 3 (adjusted by 1 N $H_2SO_4$) and the tests were conducted without $CO_2$ bubbling. Other procedures were similar. The reaction was initiated by introducing nitrite (1 M), bromate (0.25 M), chlorite (1 M), or chlorate (0.5 M) from a concentrated stock solution to generate an initial concentration of nitrite (1 mM), bromate (3 mM), chlorite (1 mM), or chlorate (1 mM) for the reaction, respectively. Samples were taken at regular time intervals, filtered, and analyzed immediately. These oxyanions (i.e., nitrite, bromate, chlorite, and chlorate) were analyzed using ion chromatography (Dionex ICS-1100; Dionex IonPac™ AS18 column; 25 µL injection volume; 0.4 mL/min of eluent flow rate; NaOH as eluent (15 mM for nitrite and bromate; 5 mM for chlorate and chlorite)).

Mass Transfer Evaluation—Aqueous/Solid Mass Transfer Limitations (Evaluation of External Mass Transfer Rate).

Slip velocity of the catalyst particles is first calculated and used to conservatively estimate the mass transfer rate between aqueous solution and the solid. The terminal slip velocity is (valid for $\rho_p > \rho$):

$$u_t = \left[\frac{4gd_p}{3C_d}\frac{\rho_p - \rho}{\rho}\right]^{\frac{1}{2}} \quad (1)$$

$$Re = \frac{d_p u_t \rho_p}{\mu} \quad (2)$$

in which g is standard gravity (9.81 m/s²), $\rho_p$ is average density of the catalysts and is assumed to be equal to that of activated carbon (2 g/cm³), $\rho$ is water density (1 g/cm³ at 20° C.), $C_d$ is drag coefficient, µ is absolute viscosity of water (1.002 g/m·s at 20° C.). The hydrodynamic size $d_p$ of the catalysts was assumed to be $1.49 \times 10^{-4}$ m (100 mesh AC, according to the manufacturer). Assuming we were in Newton's Law regime, so $C_d = 0.445$. Hence, the slip velocity was 6.62 m/s, and corresponding Re was 19.7, which is too small for Newton's regime but too large for Stoke's regime. Then, we assumed the system was in the intermediate regime:

$$C_d = \frac{24}{Re}(1 + 0.14Re^{0.7}) \quad (3)$$

and calculate the slip velocity by iteration. Then $C_d = 6.86$, $u_t = 1.69 \times 10^{-2}$ m/s, and Re=5.01.

The minimum expected $k_{aq/s, NO2-}$ value was estimated based on the slip velocity method described in Harriot (Harriot, P. Mass Transfer to Particles: Part I. Suspended in Agitated Tanks. *AIChE J.* 1962, 8, 93-101; incorporated by reference herein). The aqueous/solid mass transfer coefficient was then estimated by the following expression:

$$k_{aq/s} = \frac{D_{mol}}{d_p}Sh = \frac{D_{mol}}{d_p}(2 + 0.6Re^{0.5}Sc^{0.33}) \quad (4)$$

in which $D_{mol}$ is the molecular diffusion coefficient of the reacting solute (nitrite), Sh is the Sherwood number, and Sc is the Schmitt number (Shuai, D.; McCalman, D. C.; Choe, J. K.; Shapley, J. R.; Schneider, W. F.; Werth, C. J., Structure Sensitivity Study of Waterborne Contaminant Hydrogenation Using Shape- and Size-Controlled Pd Nanoparticles. *ACS Catal.* 2013, 3, 453-463; incorporated by reference herein). $D_{mol}$ is $1.9 \times 10^{-9}$ m² s⁻¹, and Sc was calculated by the following expressions:

$$Sc = \frac{v_{H_2O}}{D_{mol}} \quad (5)$$

in which $v_{H2O}$ is the kinematic viscosity of water ($1.003 \times 10^{-6}$ m²/s at 20° C.), and calculated Sc was 528.

$$k_{aq/s} = \frac{D_{mol}}{d_p}(2 + 0.6Re^{0.5}Sc^{0.33}) =$$

$$\frac{1.9 \times 10^{-9} \text{ m}^2\text{s}^{-1}}{1.49 \times 10^{-4} \text{ m}}(2 + 0.6 \times 5.01^{0.5} \times 528^{0.33}) = 1.61 \times 10^{-4} \text{ ms}^{-1}$$

The geometric surface area of the catalyst per volume of solution, a, is calculated according to the following expression by assuming the spherical structure of catalyst aggregates:

$$a = \frac{\text{total surface area}}{\text{total volume}} = \frac{SA_p \times M}{\rho_p \times V_p} \times \frac{1}{V_R} \quad (6)$$

where $SA_p$ is the geometric surface area of one catalyst aggregate, M is the mass of catalyst in the reduction test (0.005 g), $V_p$ is the volume of one catalyst aggregate, and $V_R$ is the volume of the reaction solution (50 mL).

$$a = \frac{4\pi \times (1.49 \times 10^{-4} \text{ m}/2)^2 \times \frac{0.005 \text{ g}}{2 \times 10^6 \text{ g/m}^3 \times \frac{4\pi}{3}(1.49 \times 10^{-4} \text{ m}/2)^3}}{} \times \frac{1}{50 \times 10^{-6} \text{ m}^3} = 2.01 \text{ m}^{-1}$$

The mass transfer rate constant was then calculated by multiplying the mass transfer coefficient by the geometric surface area of the catalyst per volume of solution:

$k_{aq/s}a = 1.61 \times 10^{-4}$ m/s×2.01 m⁻¹=3.24× $10^{-4}$ s⁻¹=1.94×10⁻² min⁻¹

This value was significantly less than the observed nitrite reduction rate constant (0.423 min⁻¹). Therefore, aqueous/solid mass transfer was highly possible to limit the reaction rates.

Mass Transfer Evaluation—Intraparticle Mass Transfer Resistance (Evaluation of Internal Mass Transfer Rate).

The following criteria were used to determine whether pore diffusion resistance can significantly impact the measured reaction rates:

No Pore Diffusion Resistance:

$$\frac{k_{obs}L^2}{D_e} < 1 \quad (7)$$

Significant Pore Diffusion Resistance:

$$\frac{k_{obs}L^2}{D_e} > 1 \quad (8)$$

L and $D_e$ were estimated according to the following equations:

$$D_e = \frac{D\theta}{\tau} \quad (9)$$

$$L = \frac{d_p}{6} \quad (10)$$

in which θ is the porosity of the catalyst particle ranging from 0.2 to 0.7, τ is the tortuosity factor ranging from 2 to 10. In our calculation, conservative estimates of 0.2 and 10 were used as values for θ and τ, respectively. Therefore, $$D_e = \frac{1.9 \times 10^{-9} \text{ m}^2\text{s}^{-1} \times 0.2}{10} = 3.8 \times 10^{-11} \text{ m}^2\text{s}^{-1}$$

$$L = \frac{1.49 \times 10^{-4} \text{ m}}{6} = 2.48 \times 10^{-5} \text{ m}$$

The largest observed nitrite reduction rate constant was 0.423 min$^{-1}$ (7.05×10$^{-3}$ s$^{-1}$). This rate constant and the L and De values calculated above were used to analyze the effects of pore diffusion.

$$\frac{k_{obs}L^2}{D_e} = \frac{7.05 \times 10^{-3}\text{s}^{-1} \times (2.48 \times 10^{-5}\text{m})^2}{3.8 \times 10^{-11} \text{ m}^2\text{s}^{-1}} = 0.11 < 1$$

Because the calculated value was less than one but not orders of magnitude smaller than one, intraparticle mass transfer resistance possibly limited measured reaction rates.

PD Dispersion. Pd dispersion (D) is calculated as follows:

$$D = \frac{\frac{PC_{CO}}{RT} \times 2 \times \frac{6}{5}}{\frac{\text{Pd wt \%}}{M_{Pd}}} = \frac{2.4 \, nM_{Pd}}{\text{Pd wt \%}} \quad (11)$$

in which P and T are standard pressure (100 kPa) and standard temperature (273.15 K), $C_{CO}$ is the adsorbed CO per gram catalyst under standard conditions for temperature and pressure (STP), R is the gas constant (8.31 J/mol·K), the factor 6/5 is a reduction factor that accounts for the fraction of surface Pd atoms in direct contact with the supports not measured by CO chemisorption, n equals to the mole numbers of adsorbed CO measured by CO chemisorption (5 mg of catalysts), the chemisorption stoichiometry of Pd/CO (molar ratio) was assumed to be 2. Pd wt % is the Pd weight percentage measured by ICP-MS, and $M_{pd}$ is the atomic weight of Pd (106.42 g/mol).

Calculation of Reaction Rate Constants and TOF$_0$.

Oxyanion reduction follows pseudo-first-order kinetics and the reaction rate constant (k, min$^{-1}$) was obtained from linear regressions of the natural log of relative concentrations versus time plots. Catalyst loading normalized oxyanion reduction rate constant was then calculated by dividing the reaction rate constant k by Pd loading in the reaction solution (g of bulk Pd/L). The initial turnover frequency (TOF$_0$, min$^{-1}$) was calculated by dividing the product of the reaction rate constant k and the initial oxyanion concentration ($C_0$, mol/L) by the concentration of surface Pd ($C_{surface\,Pd}$, mol/L, determined by CO chemisorption):

$$TOF_0 = \frac{kC_0}{C_{surface\,Pd}} \quad (12)$$

Results and Discussion.

As presented herein, nitrogen (N)-functionalization of activated carbon (AC) through an efficient, sustainable, low-cost, and potentially scalable method with "soft nitriding" by low temperature heating of AC and urea. Urea is an N-rich and readily available chemical that can be potentially reused from urine waste, and it is ideal for N-functionalization of AC. Pd dispersion was significantly improved on N-functionalized AC, in contrast to native AC, and Pd on N-functionalized AC promotes nitrite and bromate hydrogenation kinetics, represented by first-order reaction rate constants and turnover frequency (TOF). A scheme of preparing Pd nanoparticle catalysts is shown in FIG. 1.

As described above, low-temperature urea treatment of AC (for example, 150° C. for 2 h and then 300° C. for additional 2 h in N$_2$(g)) grafts N-functional groups onto the surface of activated carbon as described herein. The as prepared N-functionalized AC is notated herein as NAC$_x$, where x is the mass ratio of urea to AC (N:AC) used during the synthesis of the NAC$_x$. mainly through the reaction between NH$_3$ and HNCO generated from the thermal decomposition of urea and the surface O-containing sites (e.g., carboxylic and hydroxyl groups) of AC (FIG. 1), also known as "soft nitriding".

Also as described above, AC was treated with 35 wt % H$_2$O$_2$ under a mild condition (for example, 50° C. for 5 h), prior to nitriding to increase the number of O-containing sites and prepare OAC, and consequently to increase N-loading of OAC (by treating OAC, for example, at 150° C. for 2 h and then 300° C. for additional 2 h in N$_2$, as described above). The as prepared N- and O-functionalized AC is notated herein as NOAC$_x$, where x is the mass ratio of urea to OAC (N:OAC) used during the synthesis of the NOAC$_x$.

Table 1 summarizes the bulk and surface content analysis for activated carbon (AC) supports and AC supported-Pd catalysts produced in accordance with various aspects of the disclosure. Specifically, for Table 1, the Pd was loaded via incipient wetness and subsequent thermal treatment in N$_2$ and H$_2$. Table 1 also provides the Pd dispersion (%) values of the AC supported-Pd catalysts. As discussed above, the bulk elemental content (in wt %) was determined by CHN analysis and ICP-MS (for Pd content), the surface elemental content (in at %, ~<10 nm) was determined by XPS analysis, the Pd dispersion (%) was calculated as described above.

Table 1 summarizes the bulk and surface content analysis for activated carbon (AC) supports and AC supported-Pd catalysts produced in accordance with various aspects of the disclosure. Specifically, for Table 1, the Pd was loaded via incipient wetness and subsequent thermal treatment in N$_2$ and H$_2$. Table 1 also provides the Pd dispersion (%) values of the AC supported-Pd catalysts. As discussed above, the bulk elemental content (in wt %) was determined by CHN analysis and ICP-MS (for Pd content), the surface elemental content (in at %, ~<10 nm) was determined by XPS analysis, the Pd dispersion (%) was calculated as described above. Table 2 summarizes the bulk and surface N/C molar ratio for NAC$_{1.5}$ and NOAC$_{1.5}$, calculated from the CHN and XPS analysis. Based on the elemental content analysis by X-ray photoelectron spectroscopy (XPS) for surface AC (analyzed depth <10 nm, Table 1), OAC showed an increased oxygen content compared to AC (8.4 vs 3.5 at %), NAC$_{1.5}$ and NOAC$_{1.5}$ exhibited a substantially increased N content compared to AC (19.6 and 23.0 v 0.0 at %) and H$_2$O$_2$ treatment improved the extent of nitriding. NAC$_{1.5}$ and NOAC$_{1.5}$ showed an increased oxygen content compared to AC (8.9 and 9.8 vs 3.5 at %), likely due to the decomposition of urea grafting some 0-containing sites to AC. The bulk elemental content (Table 1), characterized by the CHN analysis, also revealed that NAC$_{1.5}$ and NOAC$_{1.5}$ had a significantly higher amount of nitrogen compared to AC (13.6±0.2 and 13.9±0.1 vs 0.3±0.1 wt %). The N/C molar ratio was significantly higher on the surface than in the bulk (comparison between XPS and CHN results, Table 2), indicating that nitriding was favored at the AC surface. However, substantial reduction of nitrogen contents were observed after Pd loading via incipient wetness and subsequent thermal treatment in $N_2$ and H (Pd/support represents the catalyst prepared under this condition without further notification), and Pd/$NAC_{1.5}$ and Pd/$NOAC_{1.5}$ only had 2.8 and 3.5 at % of N on the catalyst surface and 3.0±0.1 and 3.1±0.0 wt % of N in the bulk catalyst (Table 1). N-functional groups in $NAC_{1.5}$ and $NOAC_{1.5}$ were not thermally stable and they partially decomposed in the heating process for Pd loading.

Figure 2:
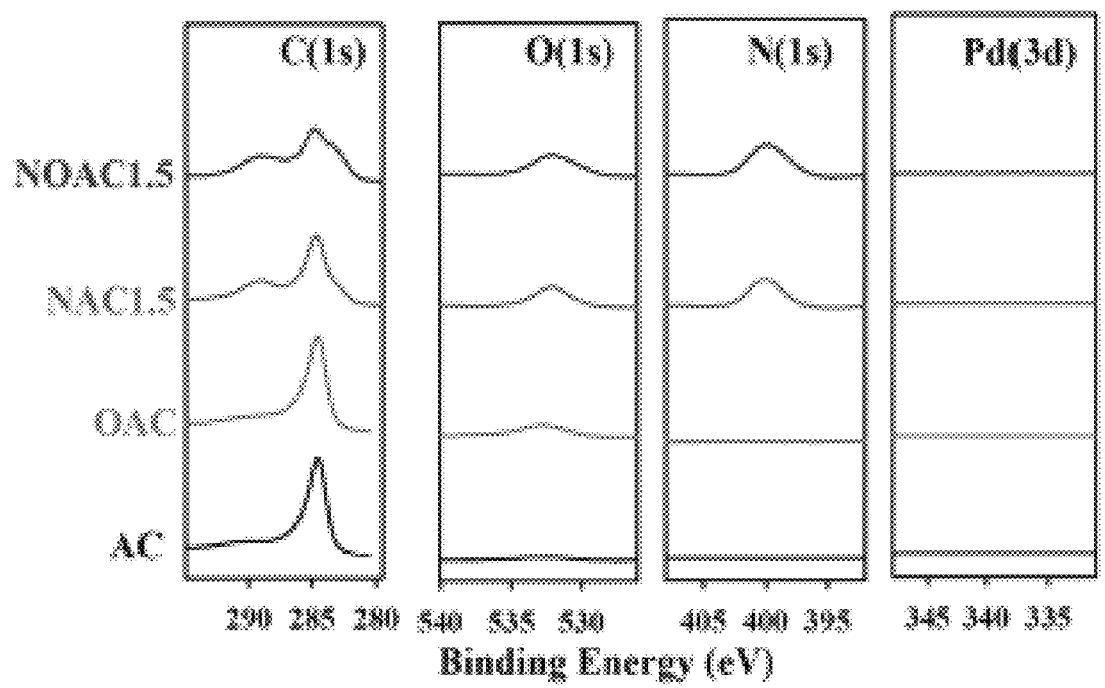
FIG. 2 is a graphical display of X-ray photoelectron spectroscopy (XPS) data obtained from AC, OAC, $NAC_{1.5}$ and $NOAC_{1.5}$ samples produced in accordance with various aspects of the disclosure.
Figure 3:
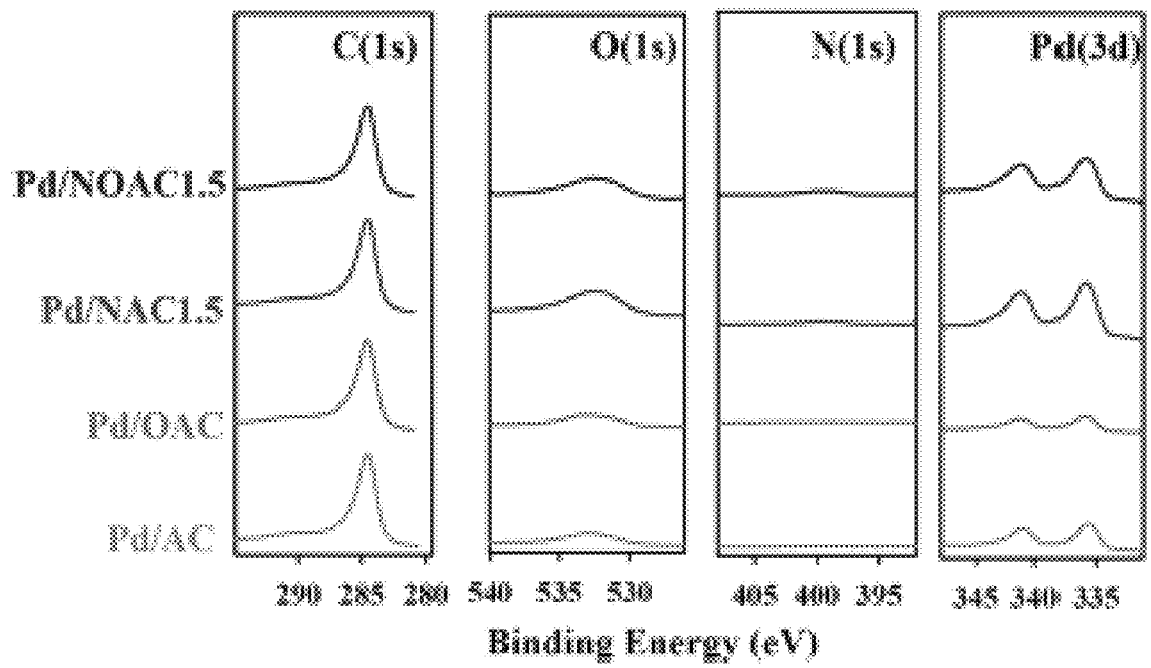
FIG. 3 is a graphical display of XPS data obtained from Pd/AC, Pd/OAC, Pd/$NAC_{1.5}$ and Pd/$NOAC_{1.5}$ samples produced in accordance with various aspects of the disclosure.
Figure 4:
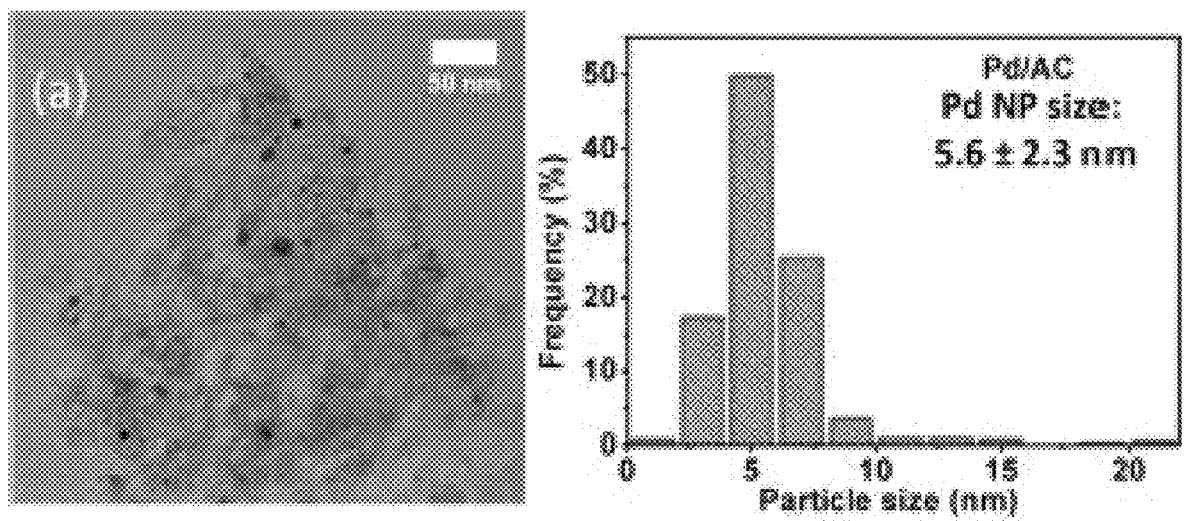
FIG. 4 shows a transmission electron microscopy (TEM) image (left) of a Pd/AC sample produced in accordance with various aspects of the disclosure and a chart (right) showing the Pd nanoparticle (NP) size distribution (frequency (%) vs. particle size (nm)) within the Pd/AC sample.
Figure 5:
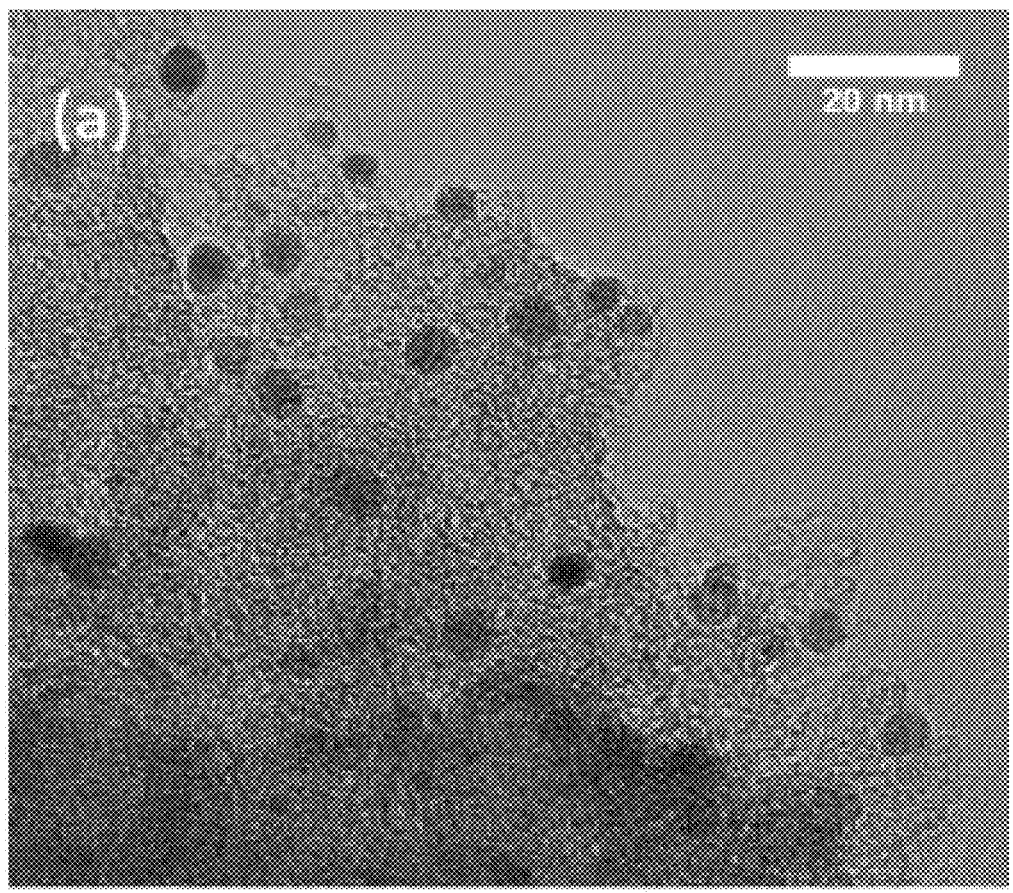
FIG. 5 is a high resolution transmission electron microscopy (HRTEM) image of a Pd/AC sample produced in accordance with various aspects of the disclosure.
Figure 6:
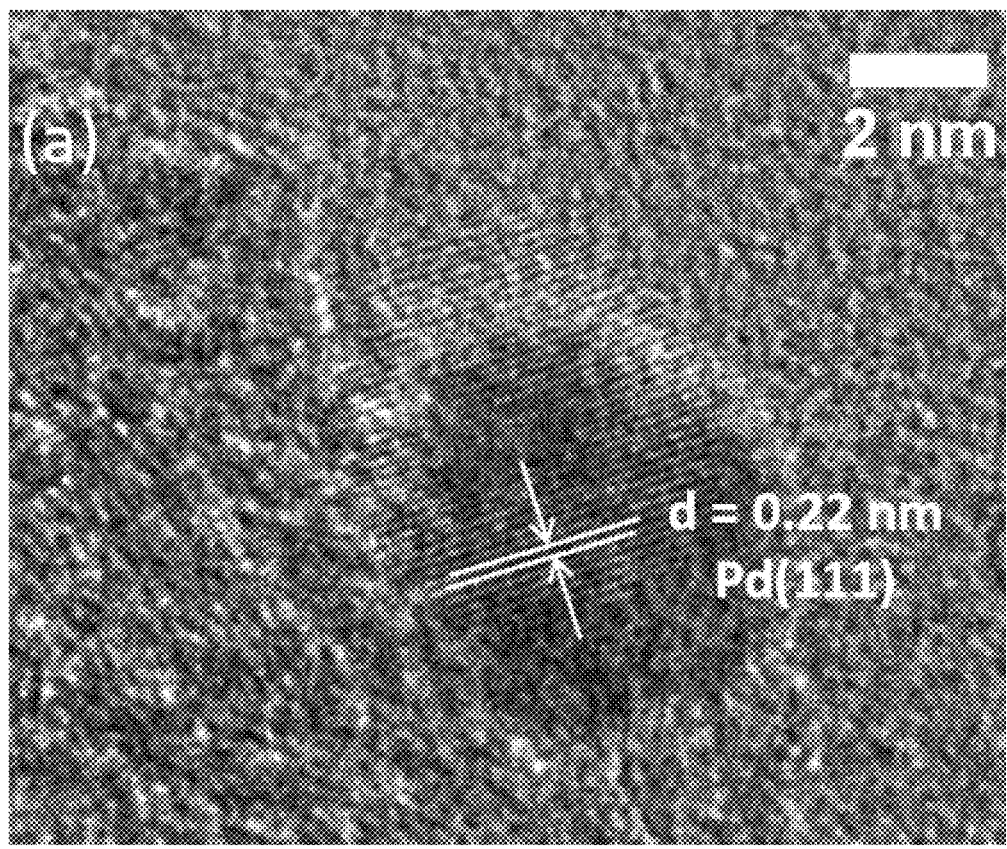
FIG. 6 is an HRTEM image showing lattice spacing of a Pd/AC sample produced in accordance with various aspects of the disclosure.
Figure 7:
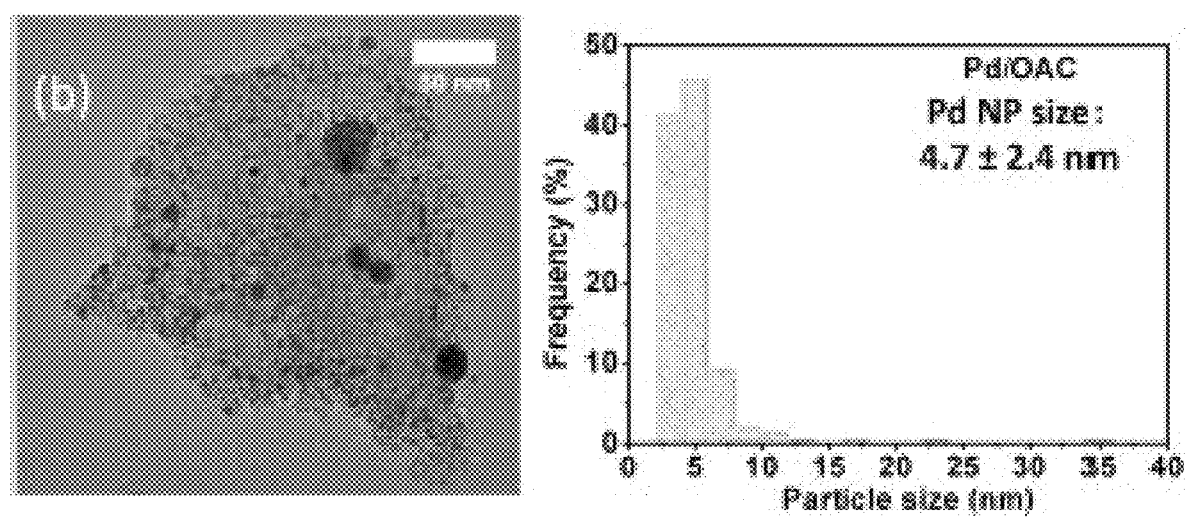
FIG. 7 shows a TEM image (left) of a Pd/OAC sample produced in accordance with various aspects of the disclosure and a chart (right) showing the Pd NP size distribution (frequency (%) vs. particle size (nm)) within the Pd/OAC sample.
Figure 8:
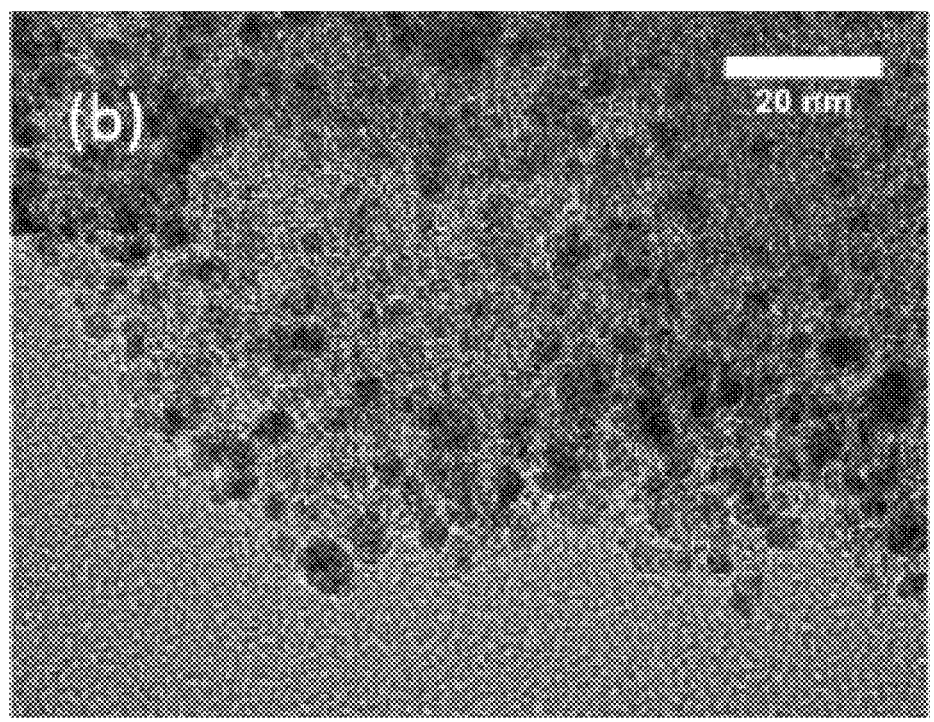
FIG. 8 is an HRTEM image of a Pd/OAC sample produced in accordance with various aspects of the disclosure.
Figure 9:
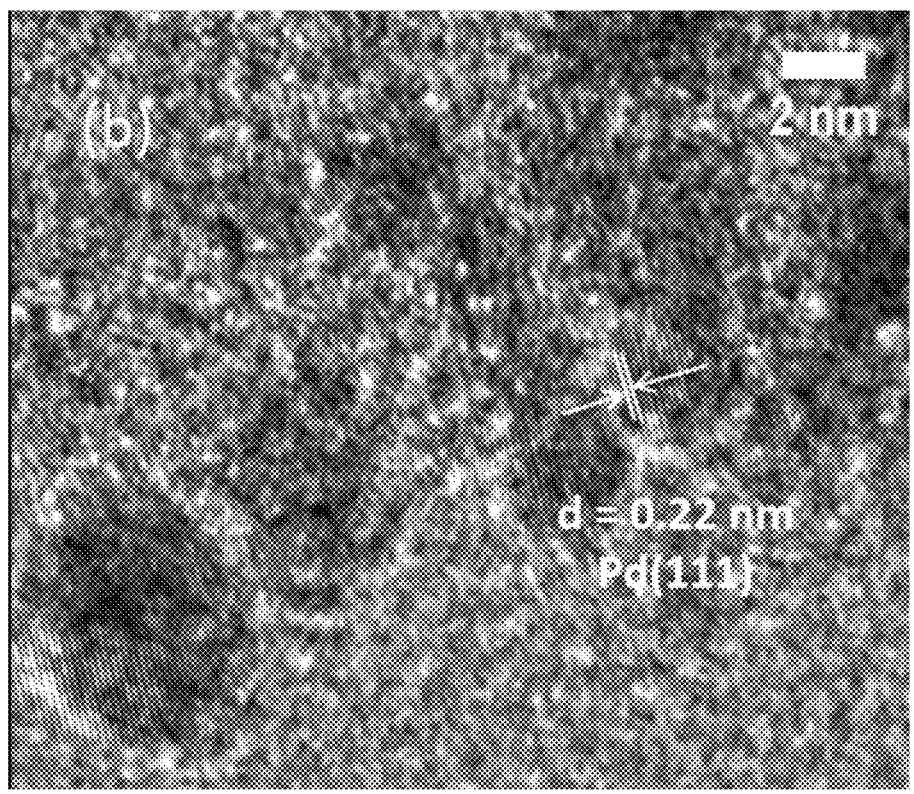
FIG. 9 is an HRTEM image showing lattice spacing of a Pd/OAC sample produced in accordance with various aspects of the disclosure.
Figure 10:
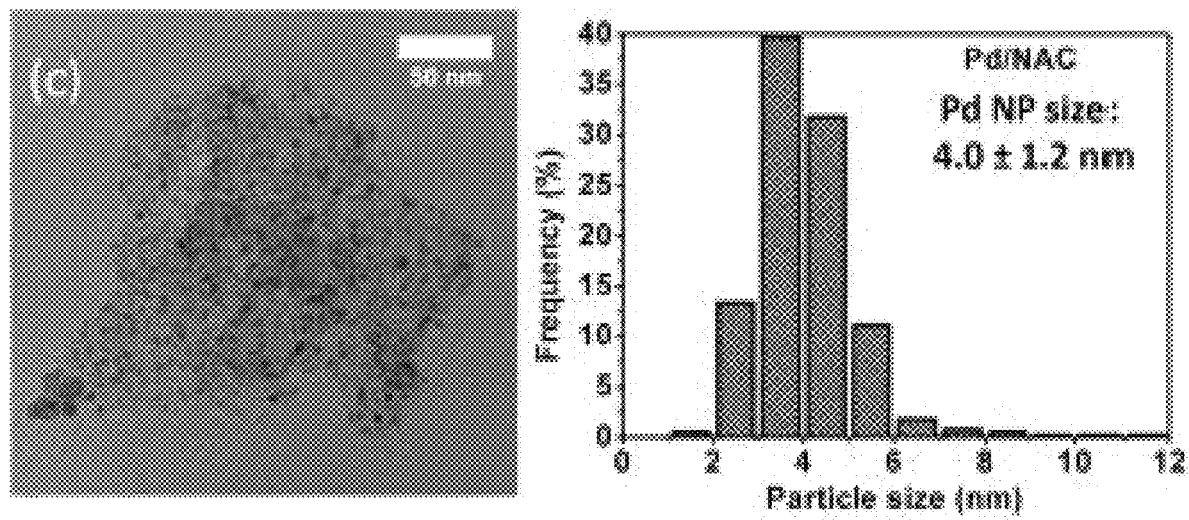
FIG. 10 shows a TEM image (left) of a Pd/NAC sample produced in accordance with various aspects of the disclosure and a chart (right) showing the Pd NP size distribution (frequency (%) vs. particle size (nm)) within the Pd/NAC sample.
Figure 11:
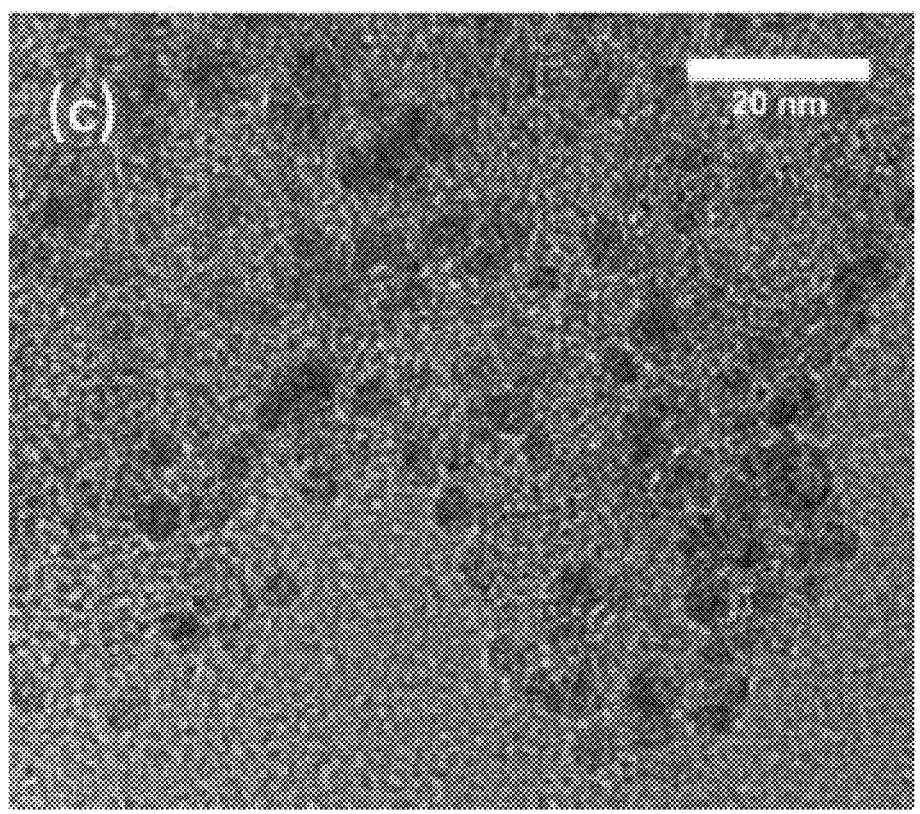
FIG. 11 is an HRTEM image of a Pd/$NAC_{1.5}$ sample produced in accordance with various aspects of the disclosure.
Figure 12:
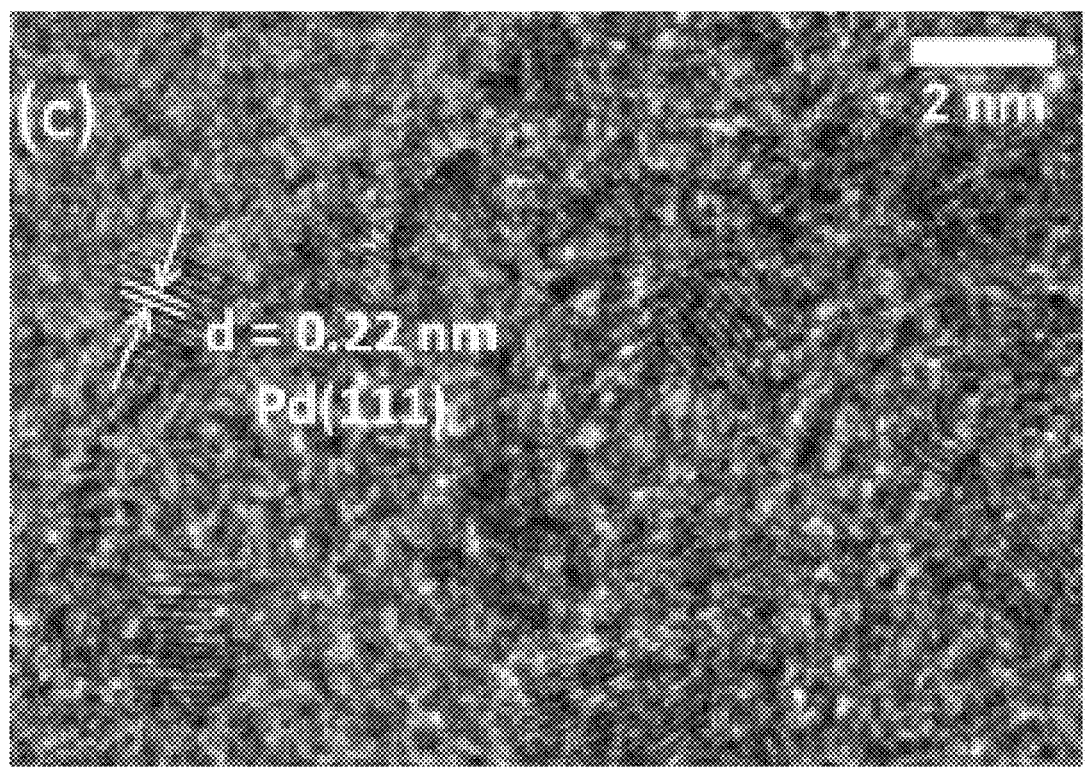
FIG. 12 is an HRTEM image showing lattice spacing of a Pd/$NAC_{1.5}$ sample produced in accordance with various aspects of the disclosure.
Figure 13:
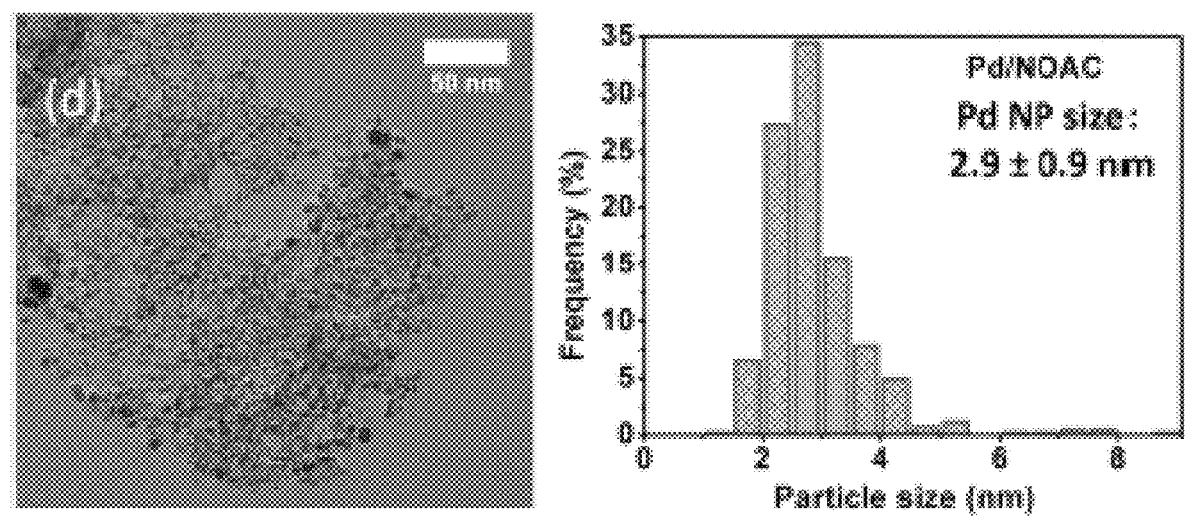
FIG. 13 shows a TEM image (left) of a Pd/NOAC sample produced in accordance with various aspects of the disclosure and a chart (right) showing the Pd NP size distribution (frequency (%) vs. particle size (nm)) within the Pd/NOAC sample.
Figure 14:
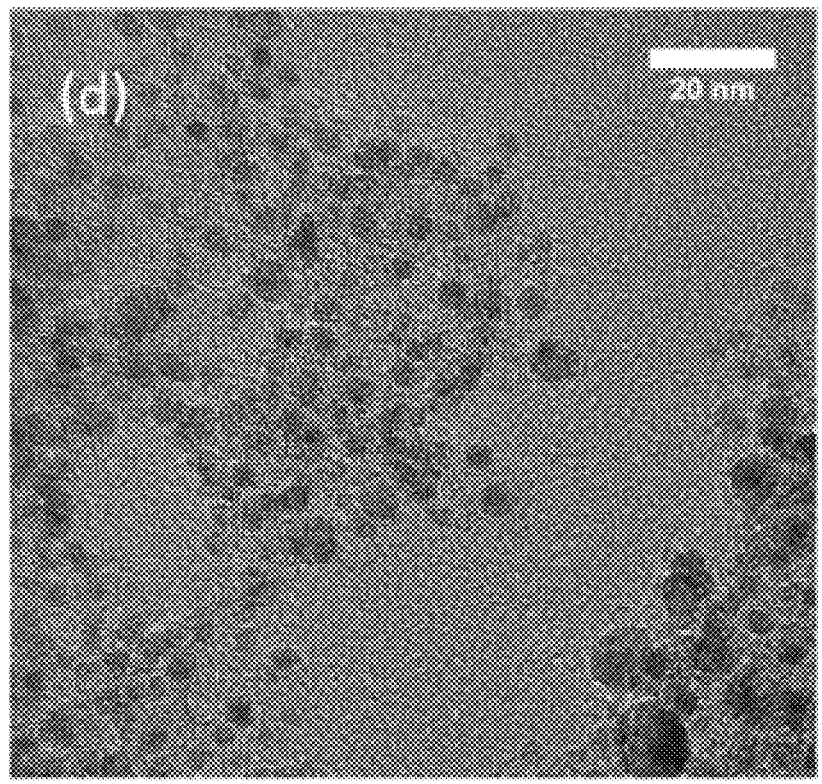
FIG. 14 is an HRTEM image of a Pd/$NOAC_{1.5}$ sample produced in accordance with various aspects of the disclosure.
Figure 15:
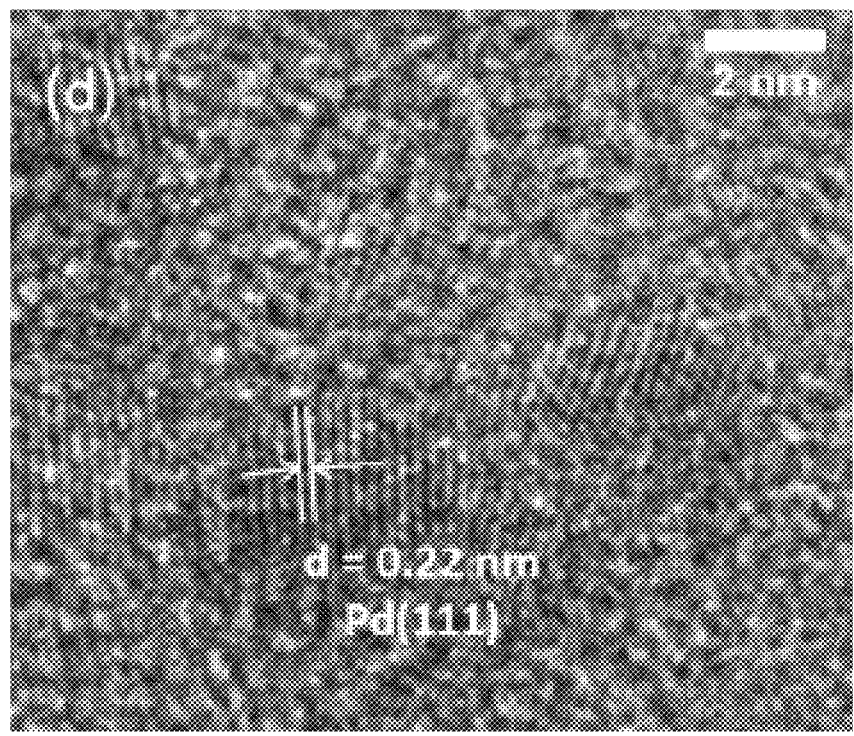
FIG. 15 is an HRTEM image showing lattice spacing of a Pd/$NOAC_{1.5}$ sample produced in accordance with various aspects of the disclosure.
Figure 16:
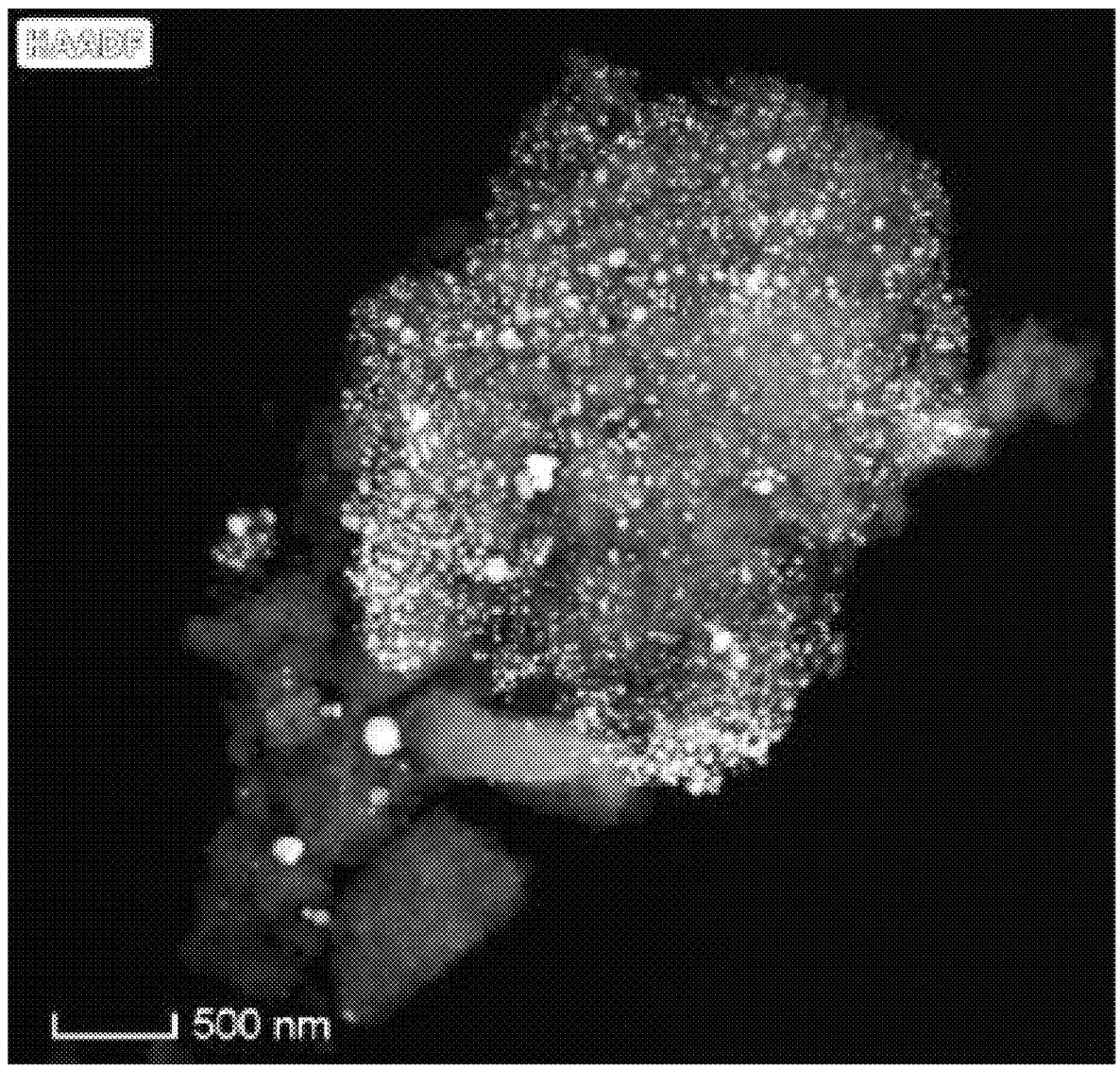
FIG. 16 is a high angle annular dark field-scanning transmission electron microscopy (HAADF-STEM) image of a Pd/AC sample produced in accordance with various aspects of the disclosure.
Figure 17:
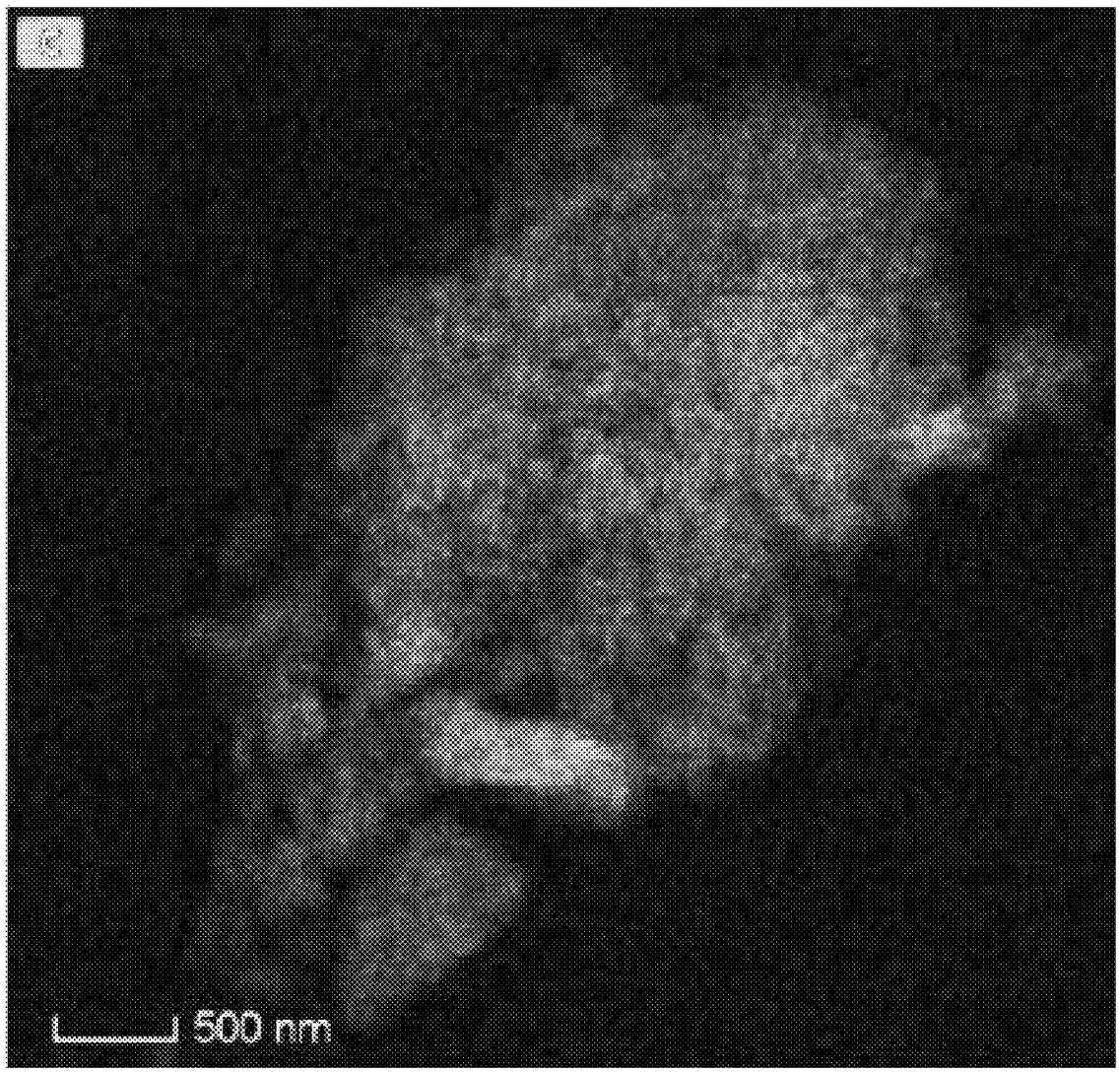
FIG. 17 is an energy dispersive x-ray spectroscopy (EDX) elemental mapping for carbon (C) of the HAADF-STEM image of FIG. 16.
Figure 18:
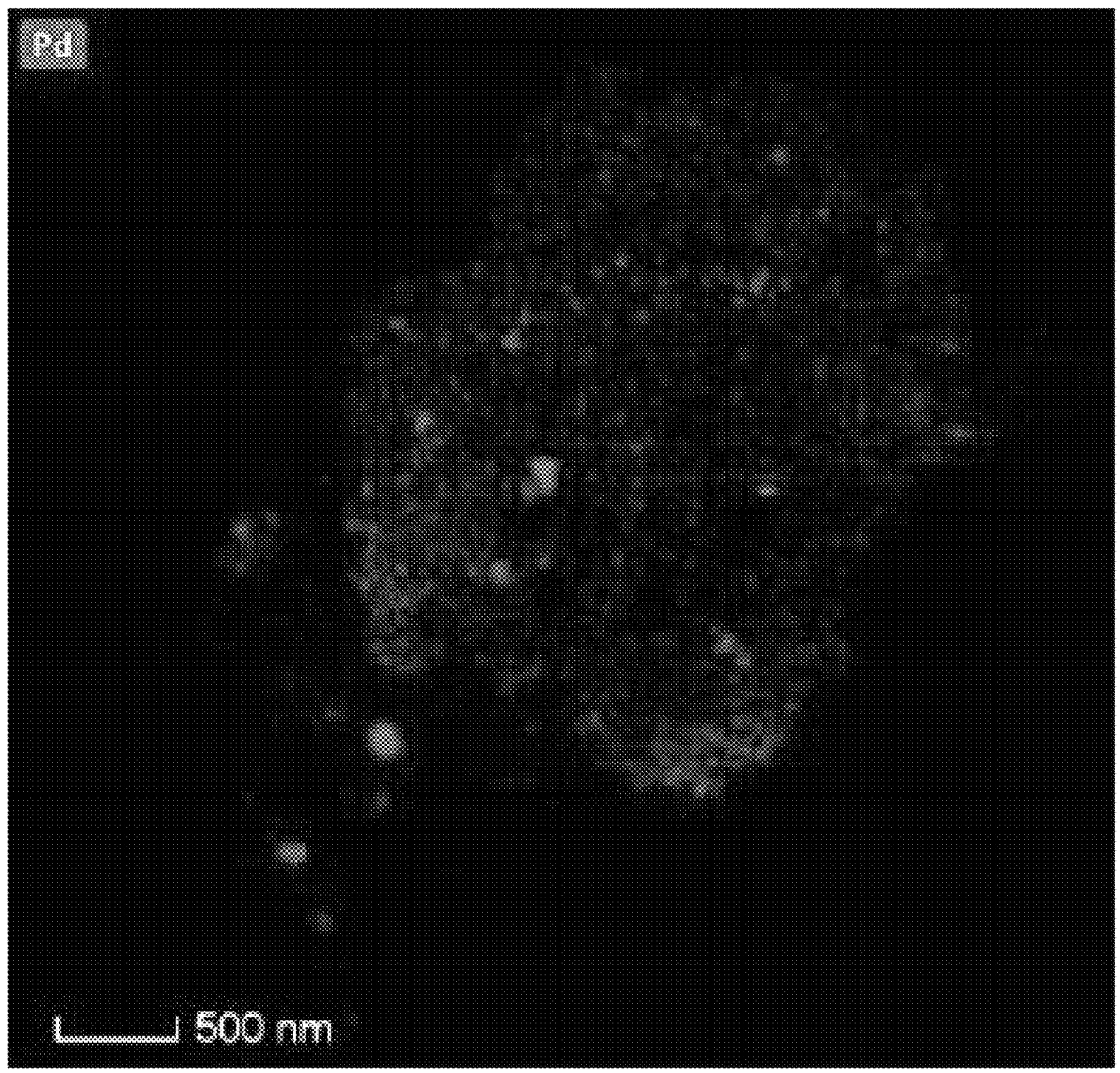
FIG. 18 is an EDX elemental mapping for palladium (Pd) of the HAADF-STEM image of FIG. 16.
Figure 19:
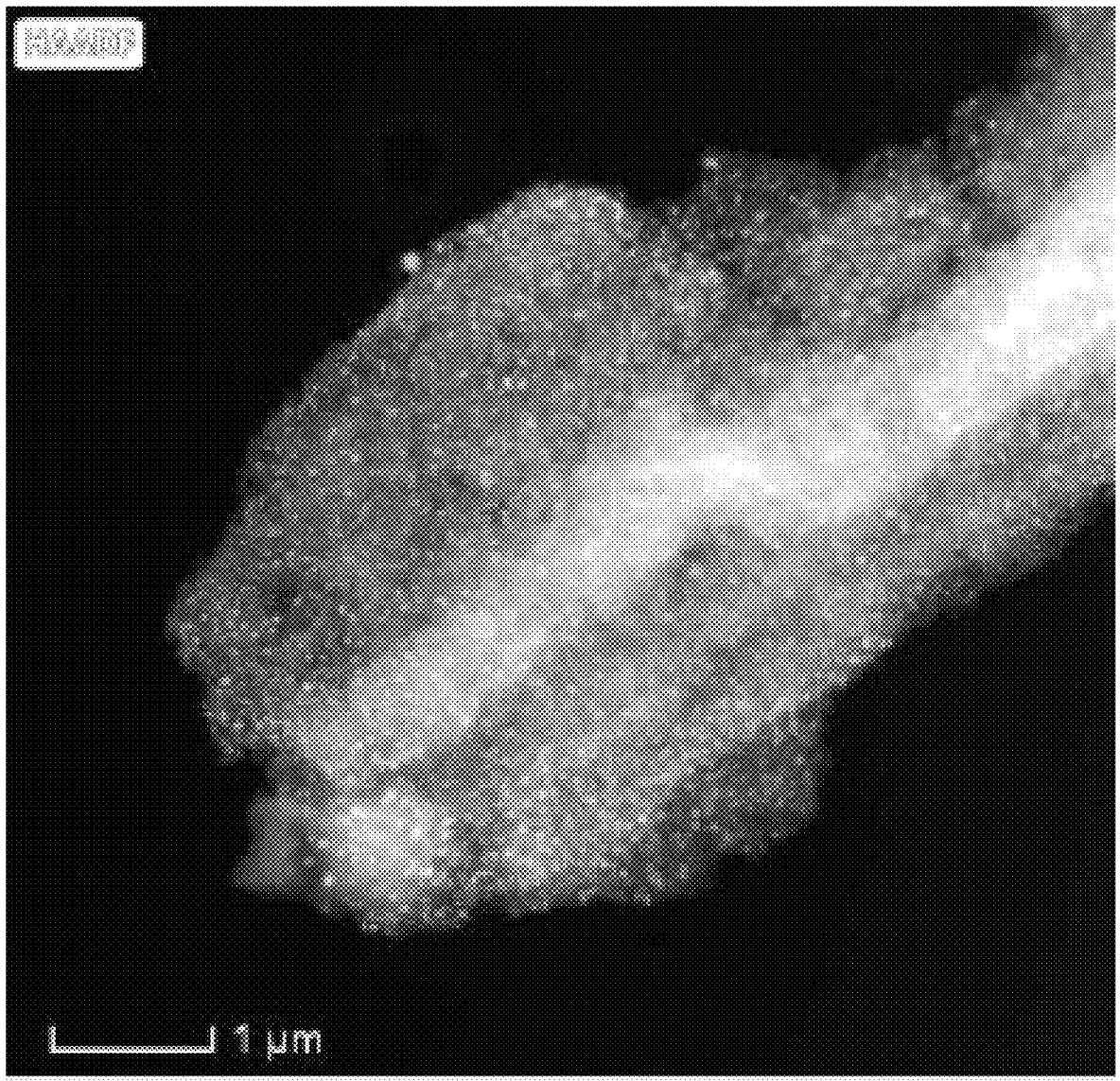
FIG. 19 is an HAADF-STEM image of a Pd/OAC sample produced in accordance with various aspects of the disclosure.
Figure 20:
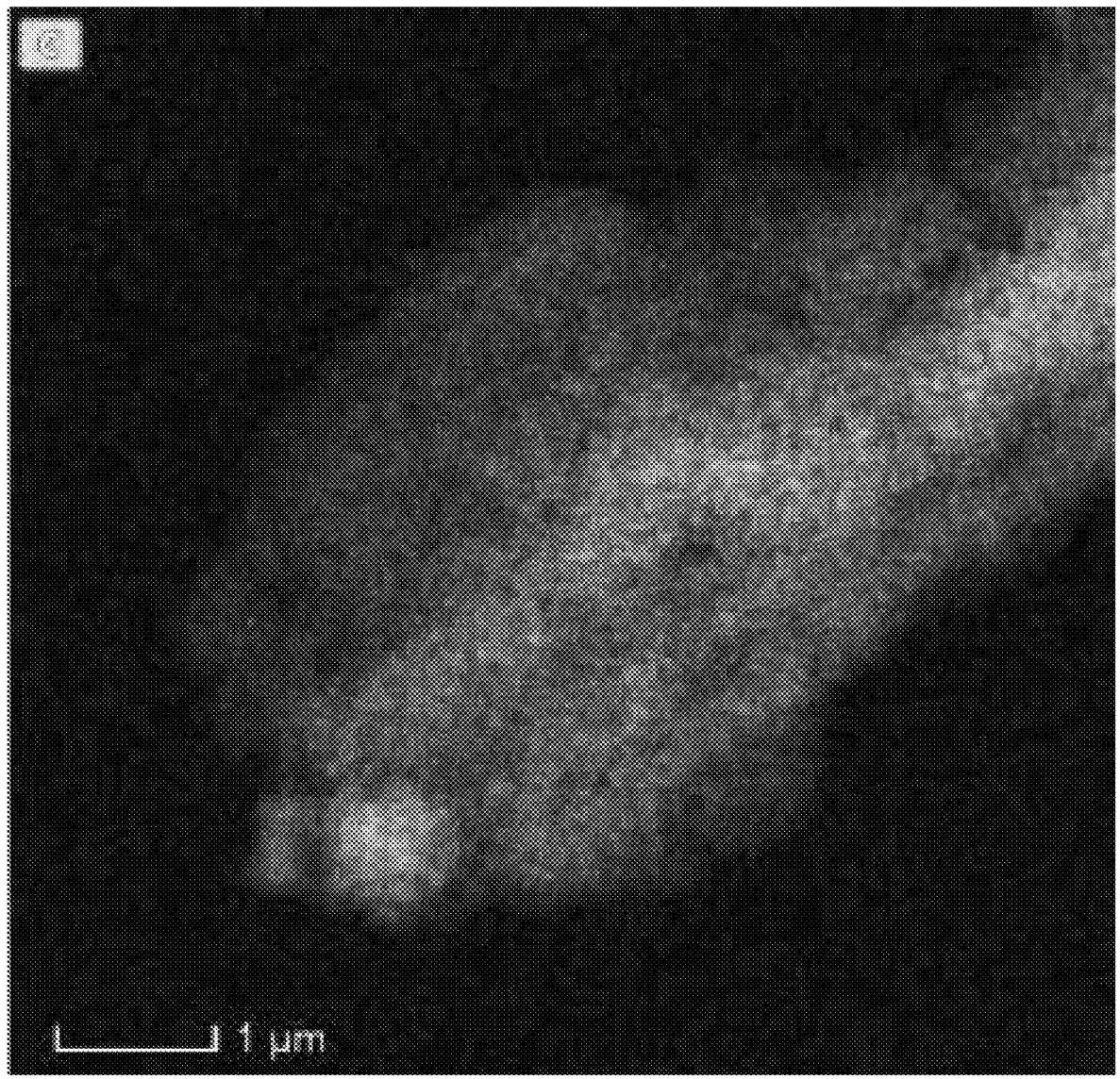
FIG. 20 is an EDX elemental mapping for carbon (C) of the HAADF-STEM image of FIG. 19.
Figure 21:
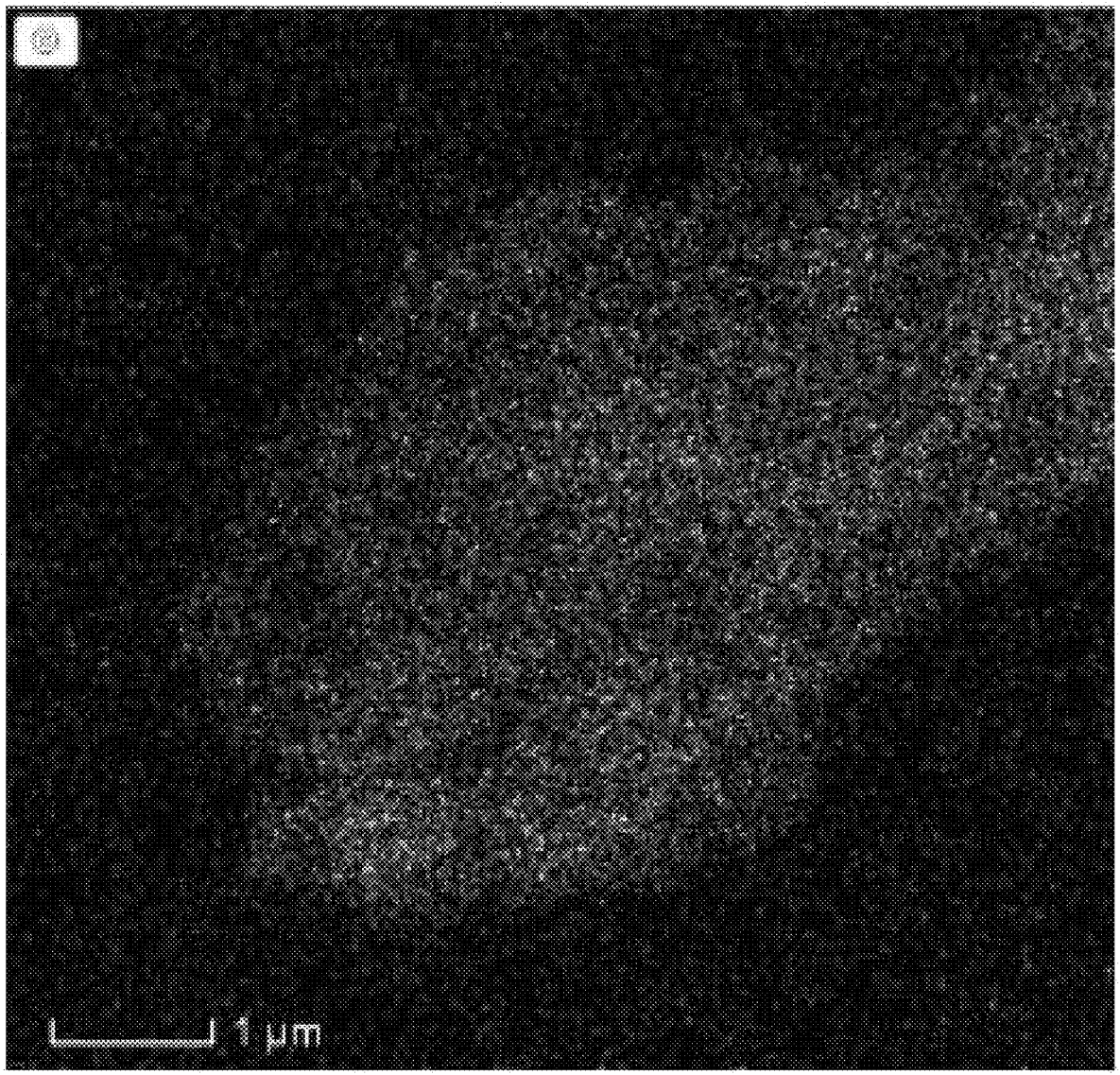
FIG. 21 is an EDX elemental mapping for oxygen (O) of the HAADF-STEM image of FIG. 19.
Figure 22:
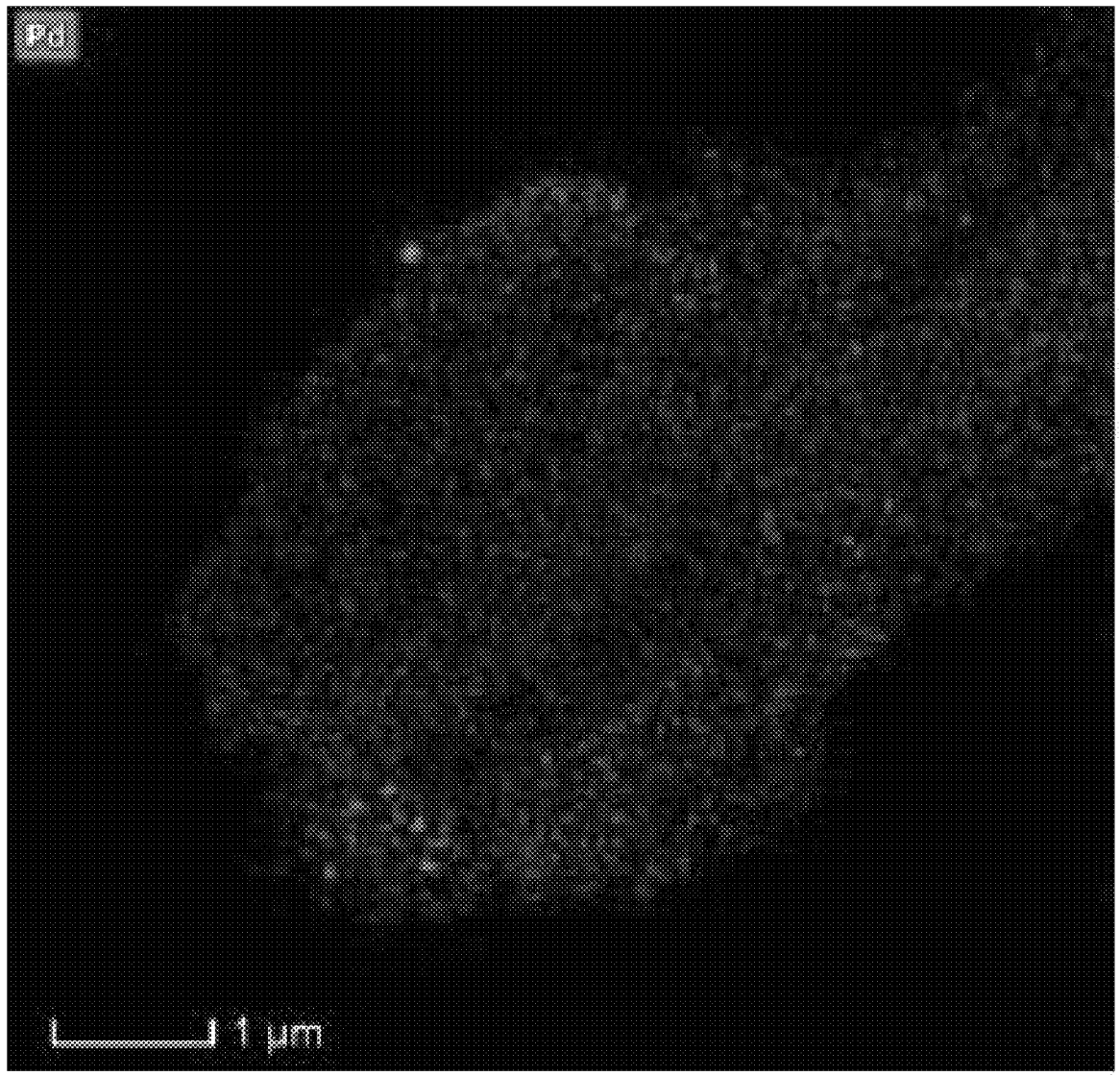
FIG. 22 is an EDX elemental mapping for palladium (Pd) of the HAADF-STEM image of FIG. 19.
Figure 23:
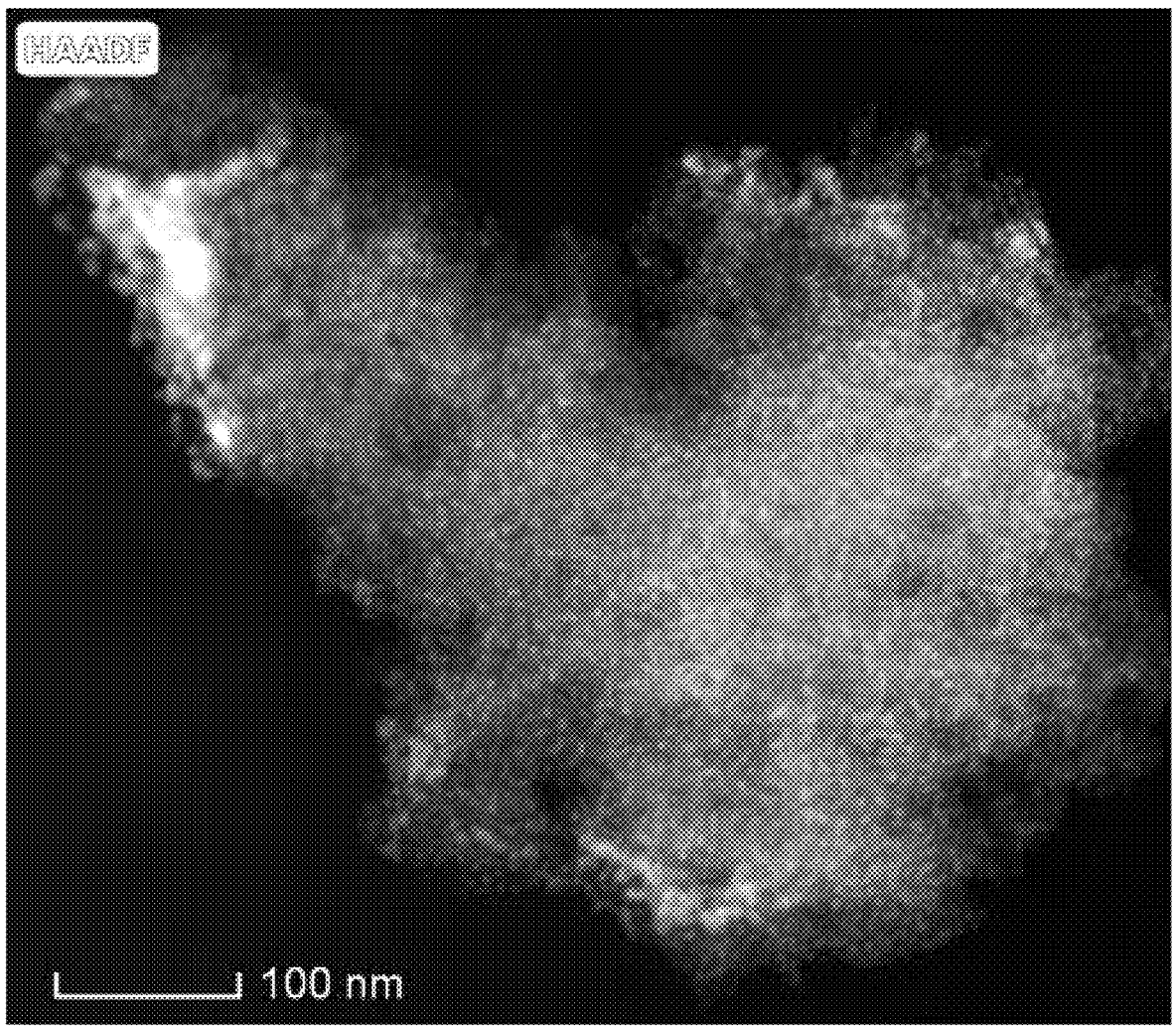
FIG. 23 is an HAADF-STEM image of a Pd/NAC sample produced in accordance with various aspects of the disclosure.
Figure 24:
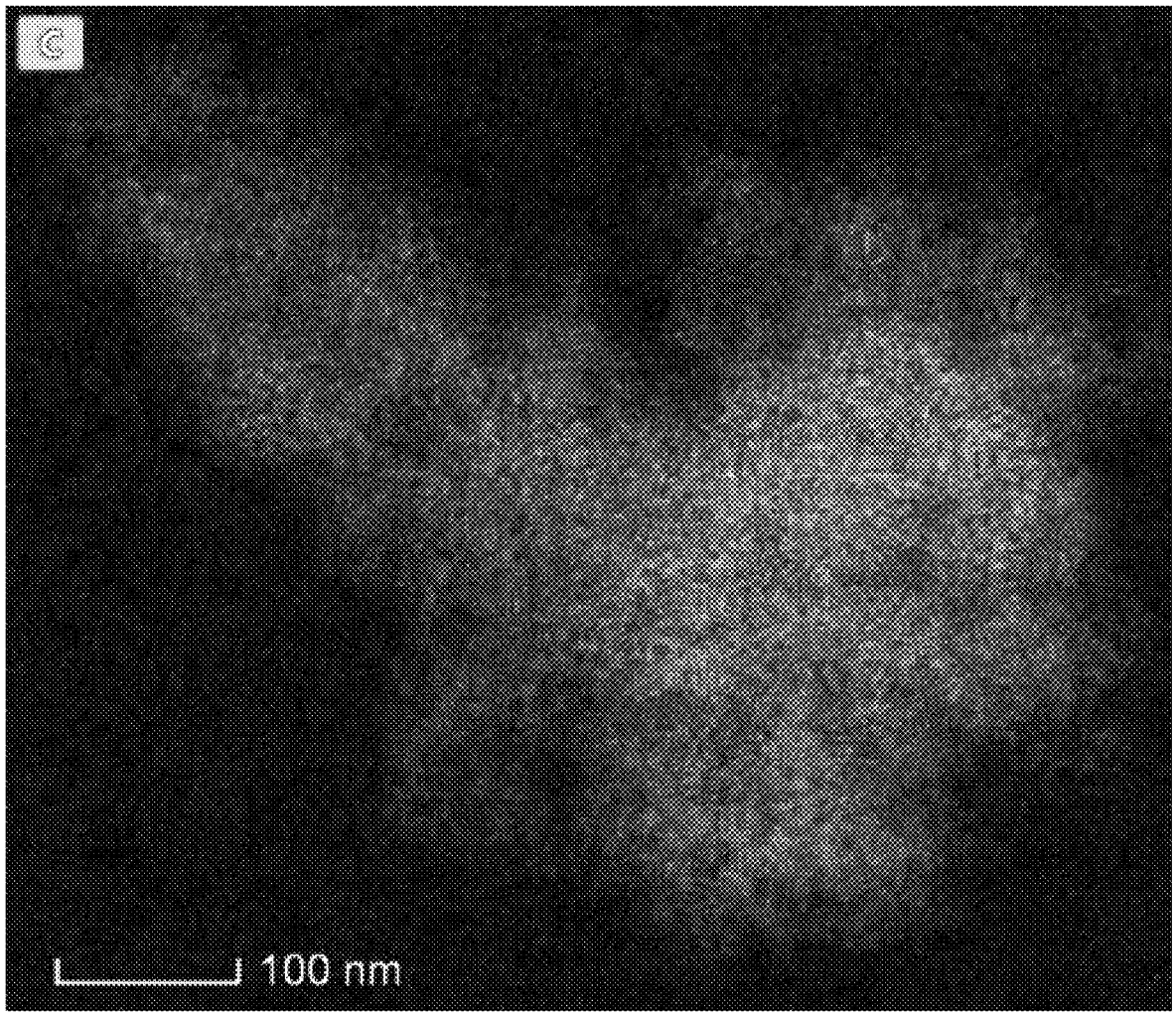
FIG. 24 is an EDX elemental mapping for carbon (C) of the HAADF-STEM image of FIG. 23.
Figure 25:
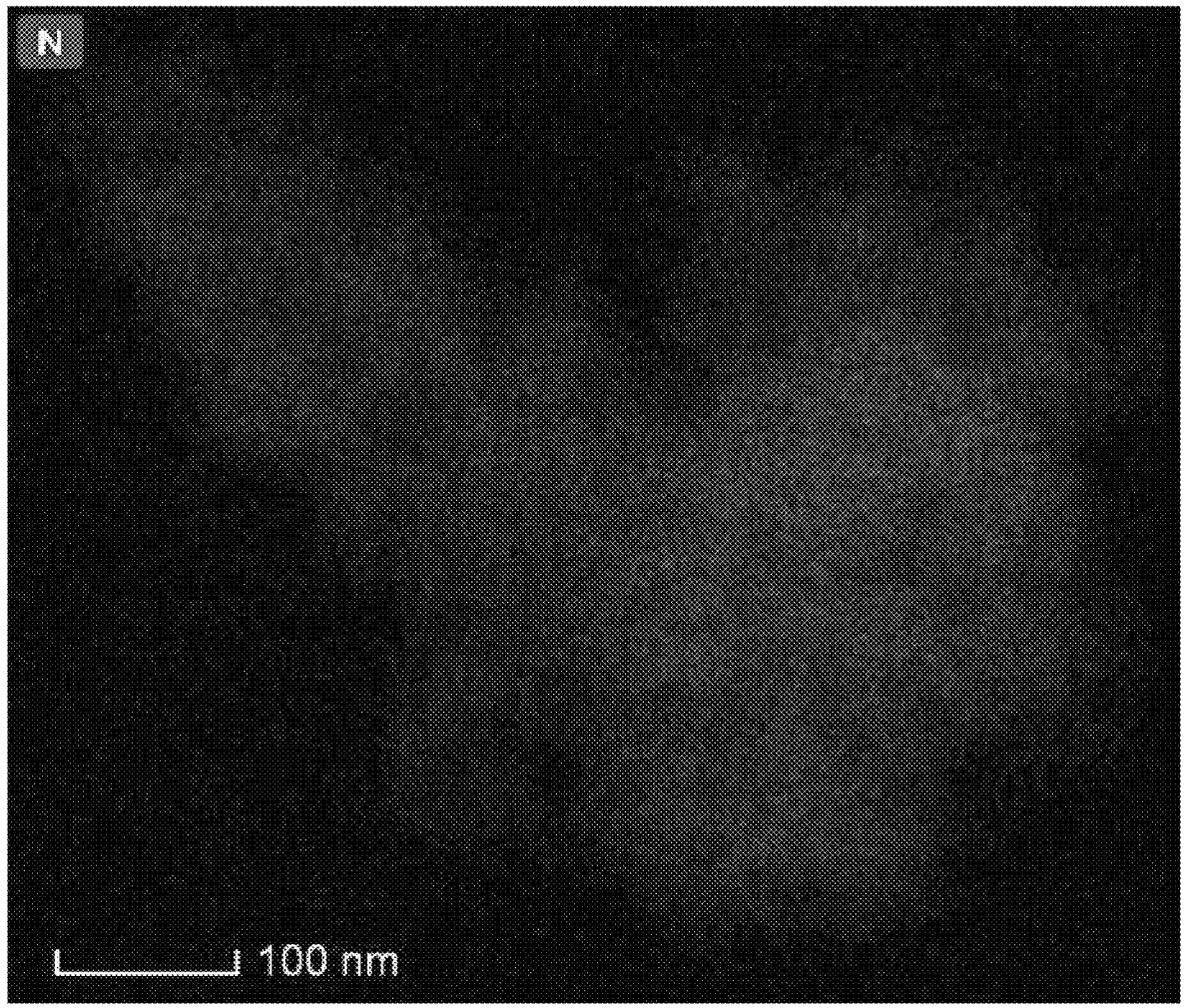
FIG. 25 is an EDX elemental mapping for nitrogen (N) of the HAADF-STEM image of FIG. 23.
Figure 26:
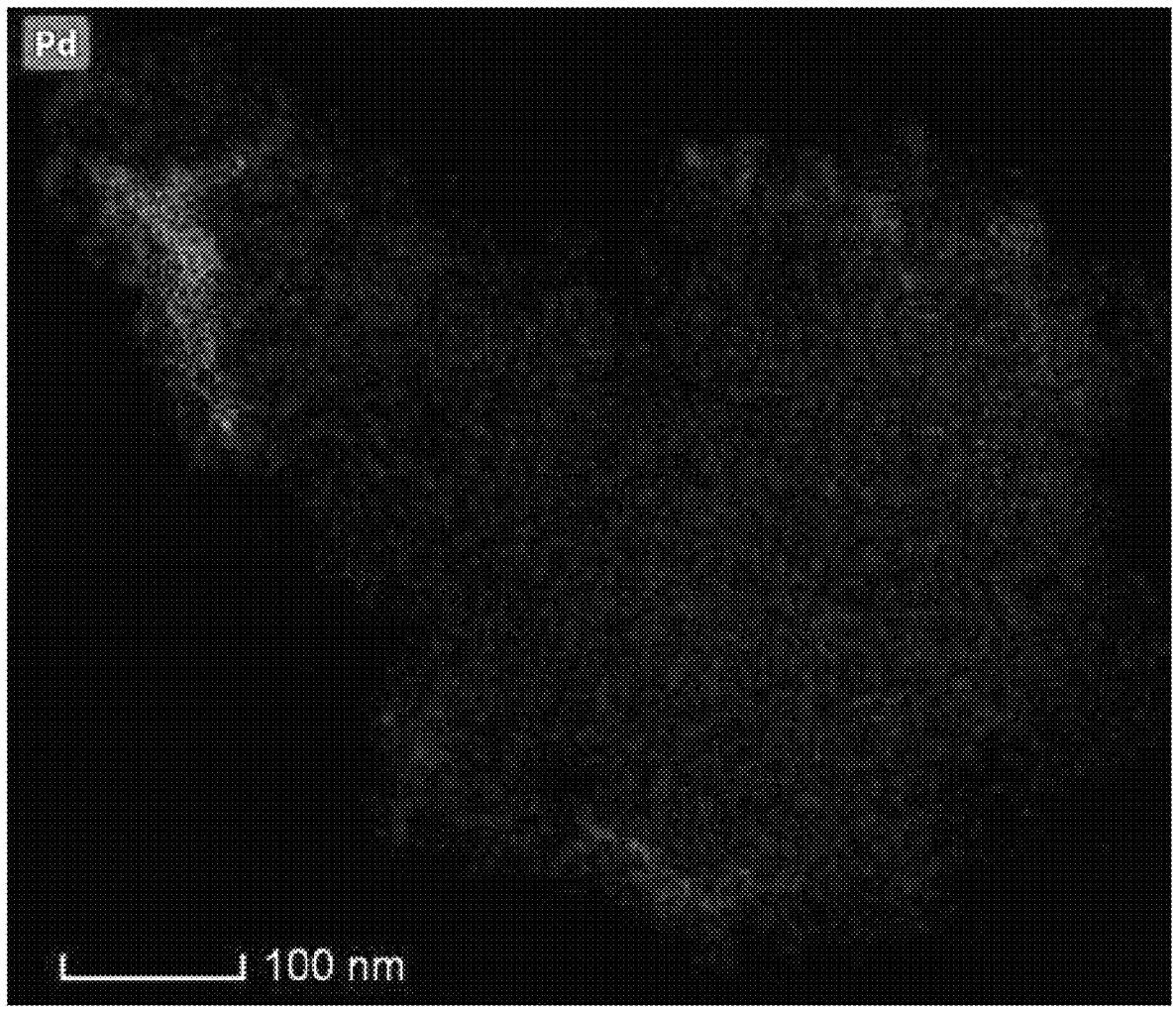
FIG. 26 is an EDX elemental mapping for palladium (Pd) of the HAADF-STEM image of FIG. 23.
Figure 27:
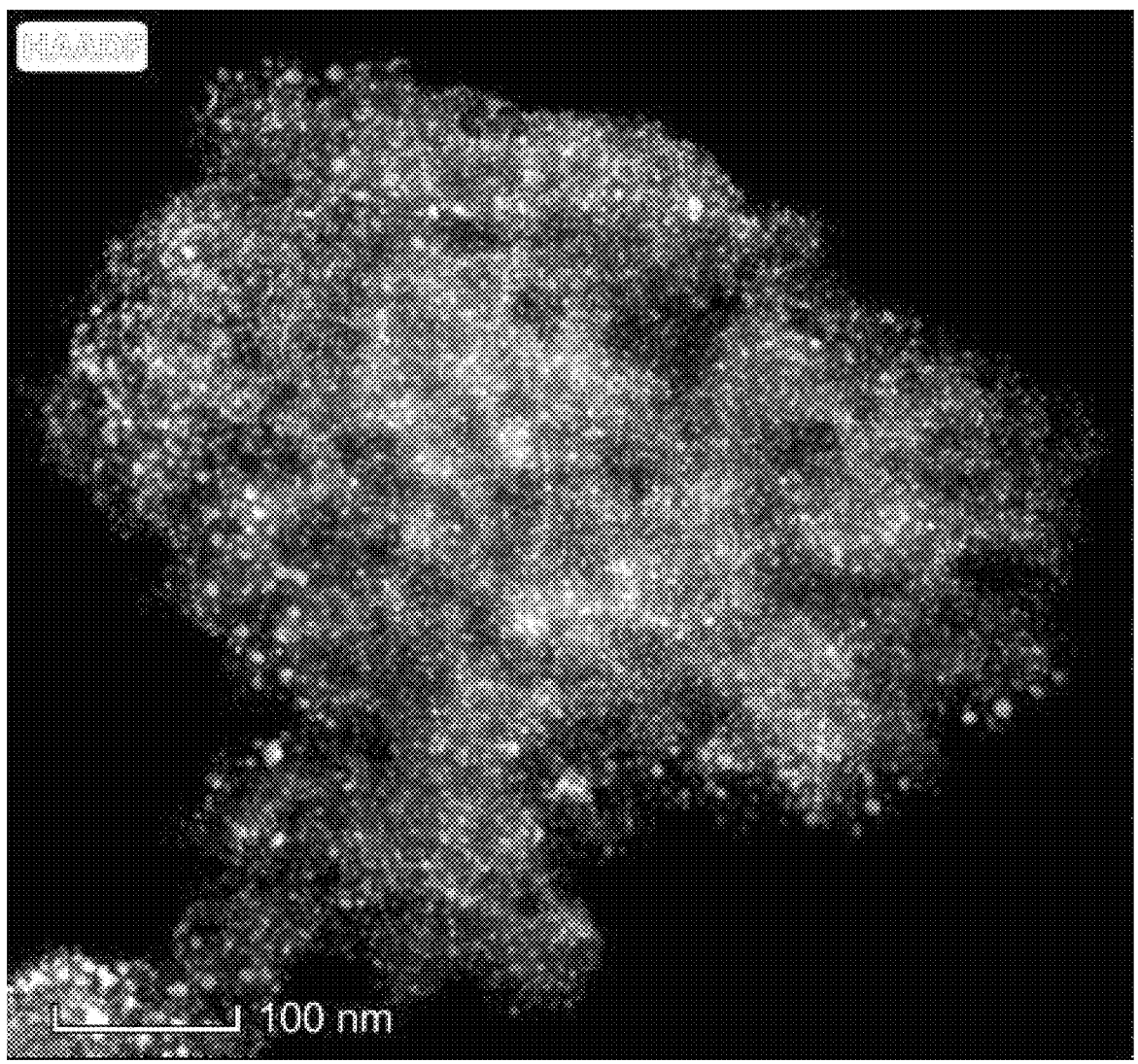
FIG. 27 is an HAADF-STEM image of a Pd/NOAC sample produced in accordance with various aspects of the disclosure.
Figure 28:
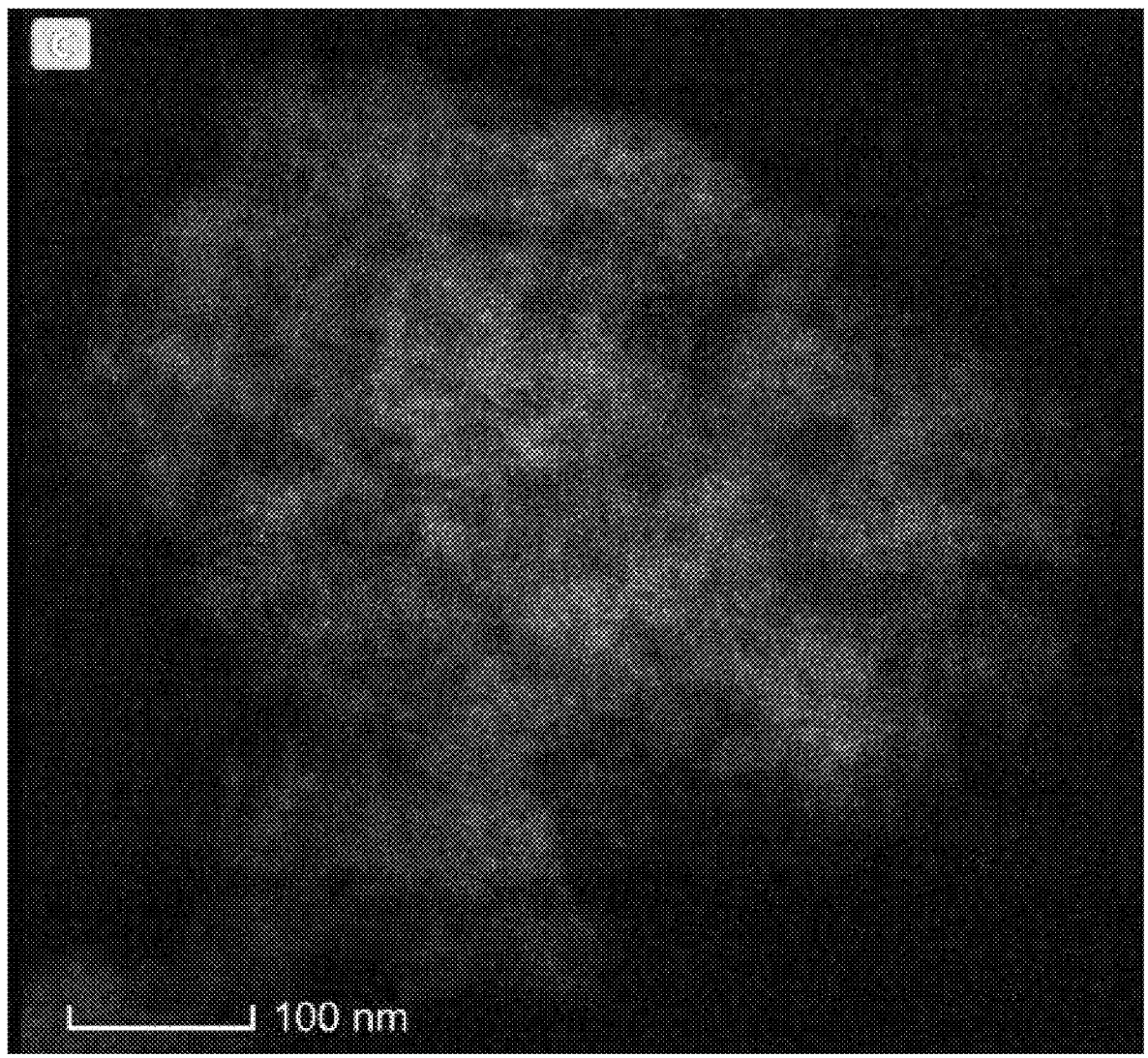
FIG. 28 is an EDX elemental mapping for carbon (C) of the HAADF-STEM image of FIG. 27.
Figure 29:
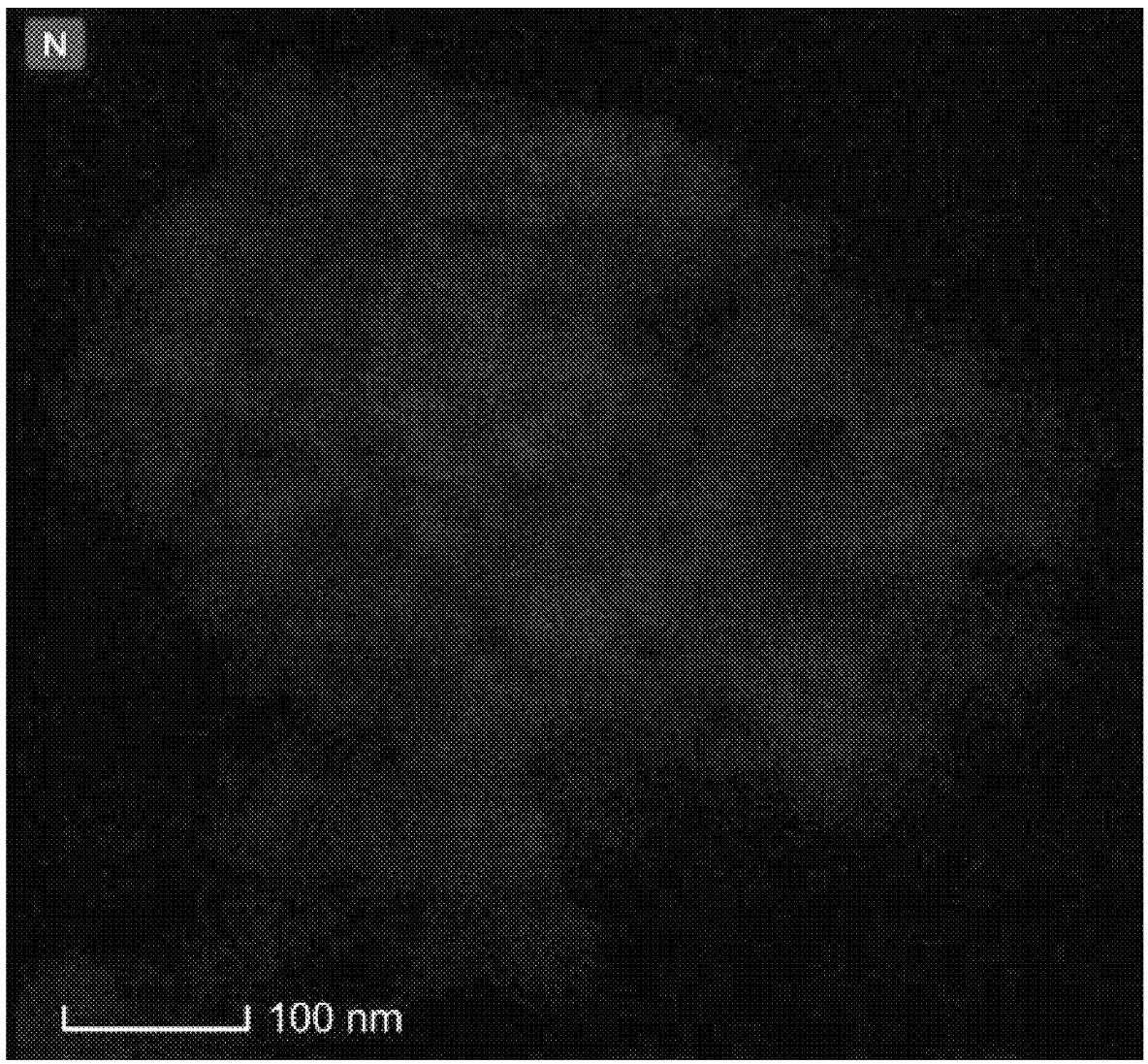
FIG. 29 is an EDX elemental mapping for nitrogen (N) of the HAADF-STEM image of FIG. 27.
Figure 30:
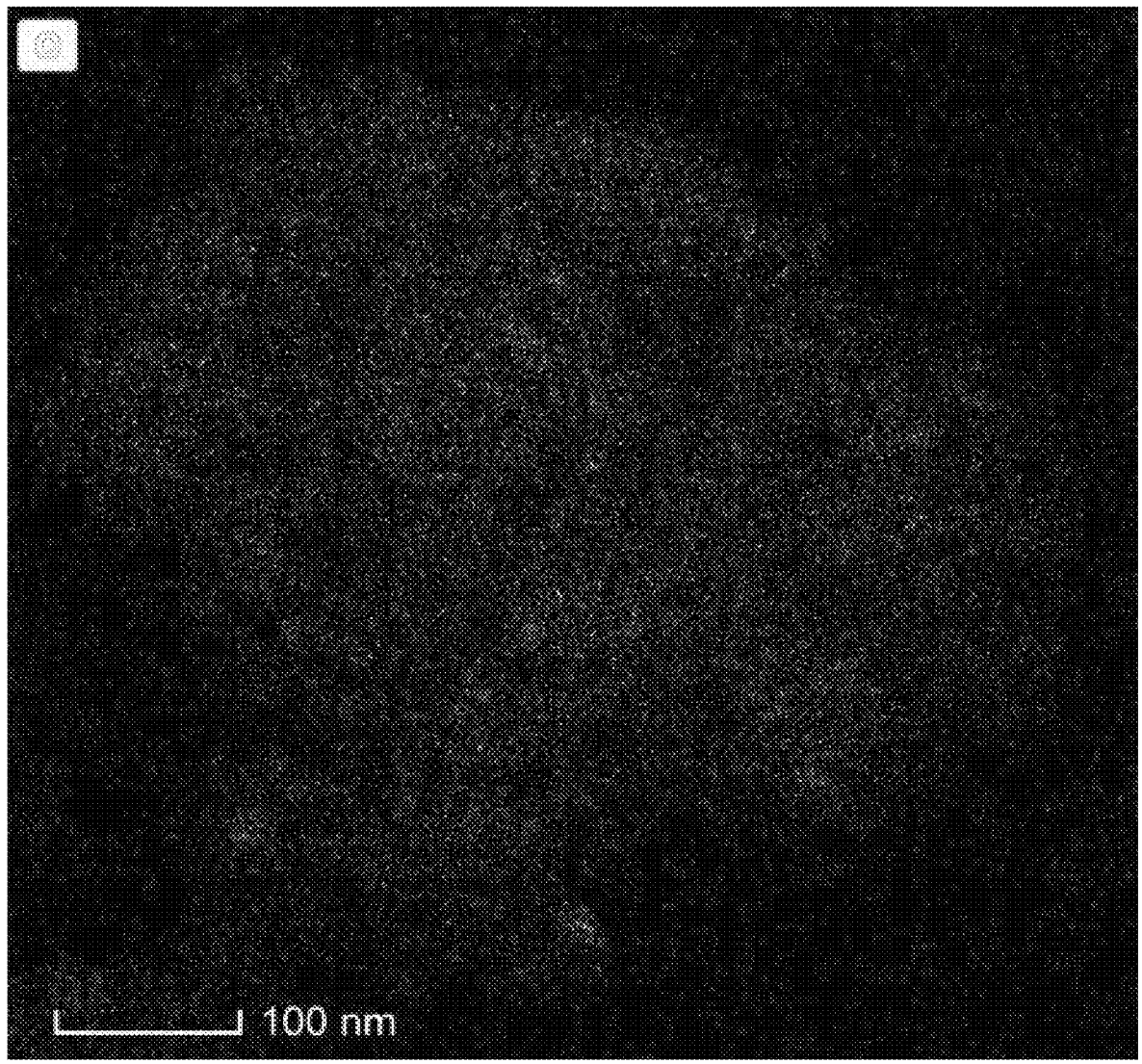
FIG. 30 is an EDX elemental mapping for oxygen (O) of the HAADF-STEM image of FIG. 27.
Figure 31:
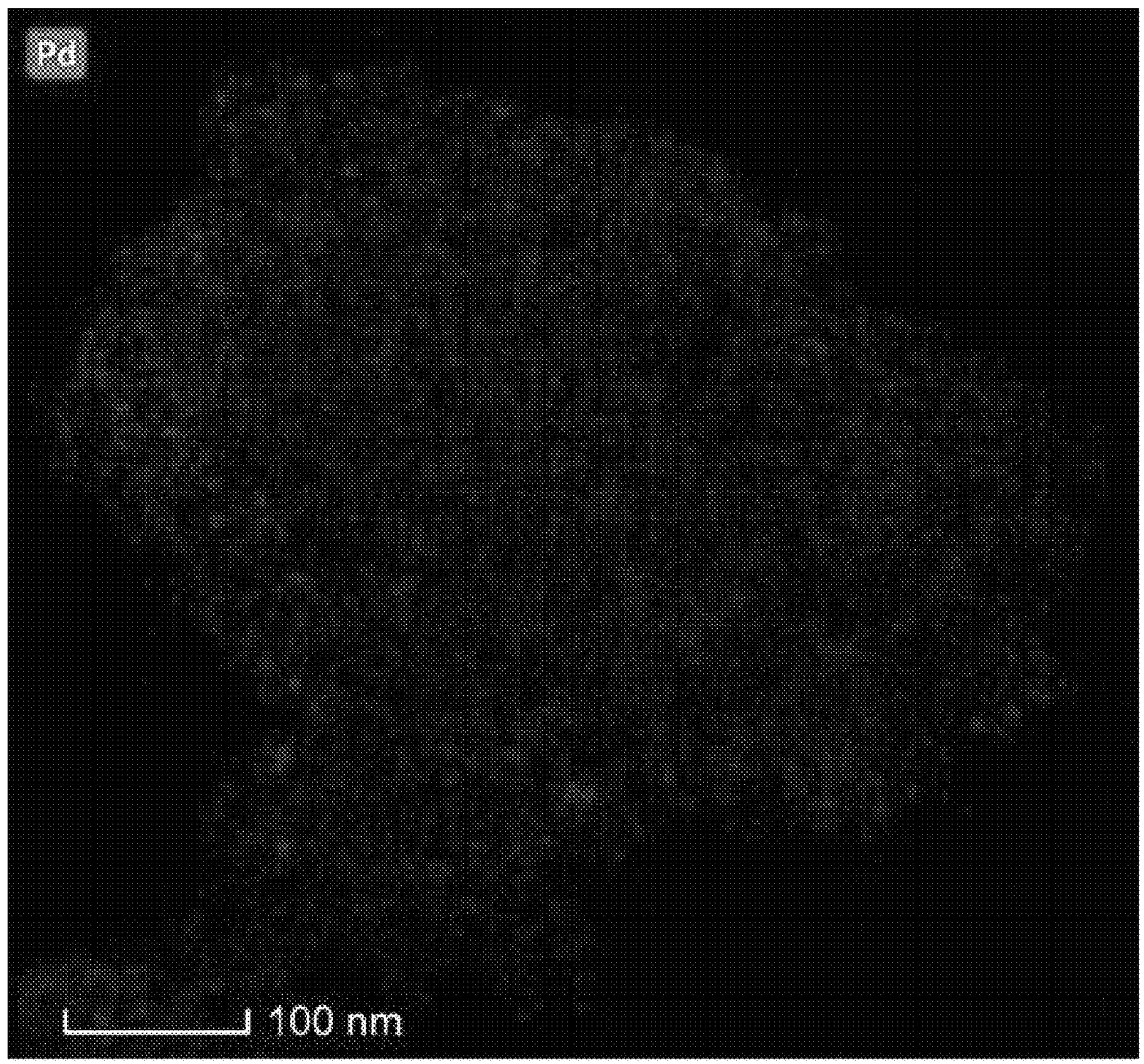
FIG. 31 is an EDX elemental mapping for palladium (Pd) of the HAADF-STEM image of FIG. 27.

The hydrogen content was negligible based on the CHN analysis (See Table 1). The oxidation state and bonding environment of the supports and catalysts were characterized by XPS (FIGS. 2-3). It is not clear from the XPS data what type of new product was present (if any) on the catalyst support surface after calcination, with respect to N and O species. For $NAC_{1.5}$ and $NOAC_{1.5}$, there was measurably high amounts of 0 (8.9-9.8 at %) that had a slightly sharper oxygen peak centered around 532.1 eV (most likely organic C—O species or C═O species), as well as high N (19.6-23.0 at %) centered around 400.0 eV (most likely products from the urea treatment). These results most likely indicate decomposition products from urea occupied the surface of

TABLE 1

| Sample | Bulk Elemental Content | | | | Surface Elemental Content | | | | Dispersion |
|---|---|---|---|---|---|---|---|---|---|
| | C | H | N | Pd | C | O | N | Pd | Pd |
| AC | 89.0 | 0.2 | 0.3 | — | 96.5 | 3.5 | 0.0 | — | — |
| OAC | 85.7 | 0.1 | 0.3 | — | 91.3 | 8.4 | 0.3 | — | — |
| $NAC_{1.5}$ | 71.0 | 0.9 | 13.6 | — | 71.5 | 8.9 | 19.6 | — | — |
| $NOAC_{1.5}$ | 70.0 | 1.0 | 13.9 | — | 67.3 | 9.8 | 23.0 | — | — |
| Pd/AC | 85.3 | 0.2 | 0.5 | 4.1 | 86.1 | 9.8 | 1.0 | 3.1 | 7.3 |
| Pd/OAC | 83.6 | 0.1 | 0.5 | 3.9 | 86.5 | 10.4 | 1.0 | 2.0 | 16.9 |
| Pd/$NAC_{1.5}$ | 81.4 | 0.1 | 3.0 | 4.9 | 72.5 | 18.7 | 2.8 | 6.1 | 12.1 |
| Pd/$NOAC_{1.5}$ | 79.6 | 0.1 | 3.1 | 4.9 | 75.2 | 16.3 | 3.5 | 5.0 | 24.6 |

TABLE 2

| Sample | Bulk N/C Molar Ratio (from CHN data; Table 1) | Bulk N/C Molar Ratio (from XPS data; Table 1) |
|---|---|---|
| $NAC_{1.5}$ | 0.16 | 0.27 |
| $NOAC_{1.5}$ | 0.17 | 0.34 |

Table 3 summarizes the surface area and pore volume of the supports and Pd catalysts according to the present disclosure. The conclusion was also supported by the BET analysis that a substantial increase in the surface area and pore volume was observed after Pd loading ($NAC_{1.5}$ vs Pd/$NAC_{1.5}$, Table 3). Interestingly, a slight increase of the bulk and surface nitrogen content was also observed for AC and OAC after Pd loading (Table 1), possibly due to the precursor Pd($NO_3)_2$ introducing nitrogen during catalyst preparation. Surface oxygen content was similar for Pd/AC and Pd/OAC (9.8 vs 10.4 at %), but much higher for Pd/$NAC_{1.5}$ and Pd/$NOAC_{1.5}$ (18.7 vs 16.3 at %), as indicated by XPS.

TABLE 3

| Sample | BET Surface Area (m²/g) | Pore Volume (cm³/g) | | |
|---|---|---|---|---|
| | | Micropores | Mesopores | Total |
| AC | 868.9 | 0.248 | 0.437 | 0.685 |
| OAC | 776.1 | 0.210 | 0.423 | 0.633 |
| $NAC_{1.5}$ | 95.9 | 0.011 | 0.162 | 0.173 |
| $NAC_3$ | 91.2 | 0.004 | 0.189 | 0.193 |
| $NAC_{1.5-2}$ | 183.8 | 0.019 | 0.284 | 0.303 |
| Pd/AC | 743.2 | 0.219 | 0.303 | 0.522 |
| Pd/OAC | 801.6 | 0.222 | 0.351 | 0.573 |
| Pd/$NAC_{1.5}$ | 603.6 | 0.162 | 0.304 | 0.466 |
| Pd/$NOAC_{1.5}$ | 688.1 | 0.184 | 0.334 | 0.518 |

Table 4 summarizes the calculation of surface Pd loading and comparison with bulk Pd loading. Surface Pd mass percentage was calculated from at % in the XPS analysis without considering hydrogen content in the Pd-catalyst.

the support, which could also be confirmed by the fact that $NAC_{1.5}$ showed a significant lower surface area compared with AC (Table 3). Every other sample analyzed (AC, OAC, Pd/AC, Pd/OAC, Pd/$NAC_{1.5}$, and Pd/$NOAC_{1.5}$) showed similarly shaped, broad oxygen peaks, with little definition, and centered around 532.5 eV. This is likely some 0 bonded to the AC support. However, inspection of the carbon region for all of the catalysts containing Pd (i.e., C 1s of each sample reduced under $H_2$) clearly showed that each catalyst support was almost complete graphitic (i.e., C 1s region ~284.5 eV). Although there was additional O (at %) measured on these catalyst samples, because the nature of the C 1s did not change significantly, we conclude this oxygen could be the result of the unreacted precursor, and/or decomposed carbonaceous species from the urea co-additive used to treat the AC support. Regarding the nitrogen that was bonded to each of the catalyst supports, the two AC catalyst samples not treated with N-containing precursor (i.e., Pd/AC and Pd/OAC) had 1.0 at % N. The other two samples (i.e., Pd/$NAC_{1.5}$ and Pd/$NOAC_{1.5}$) had 2.8 and 3.5 at % N, respectively. While this very slight increase in N content on the catalyst support surface (1.8-2.5 at % increase) could be due to a new N species bonded to the AC surface, however the XPS was not able to discern what that species might be. The C 1s regions of these samples appear no different than the other catalysts (they all appeared graphitic). The main conclusion we could make is that both treatments (O- or N-functionalization) altered the intermediate surface of the AC support in some manner to facilitate some improved ability for the support to receive Pd and bind more strongly. Higher surface Pd content on these samples for Pd/$NAC_{1.5}$ and Pd/$NOA_{1.5}$ could potentially lead to higher reactivity, in contrast to Pd/AC and Pd/OAC. It is a stretch to suppose but perhaps the decomposition products themselves were the primary catalyst support, and they somehow incorporated themselves into the AC upon reduction of the Pd.

Both $NOAC_{1.5}$ and $NAC_{1.5}$ showed significantly different peak shapes for the C1s region, which could not be identified but most likely represented either (1) intermediate decomposition products of the urea-AC reaction or (2) modification of the AC surface. These other features were a peak at ~289.0 eV (indicating C in a higher oxidation state, that is, C=O), and a slight shoulder on the lower binding energy side (indicating some of the reduced form of C on the surface). Since these features were present in the sample not treated with an oxidizing agent ($NAC_{1.5}$), as well as the sample treated with oxidizing agent ($NOAC_{1.5}$), it seems more likely that the reason for these features were from intermediate decomposition products of the urea-AC reaction, which were eventually reduced and departed from the AC surface after loading Pd during the incipient wetness and subsequent thermal treatment in $N_2$ and $H_2$ (these spectral featured disappeared in each of the samples containing Pd).

blockage by urea decomposition intermediates in "soft nitriding" that prevents Pd precursor infiltration or an increased N content on the support surface that facilitates Pd coordination and binding.

Figure 32:
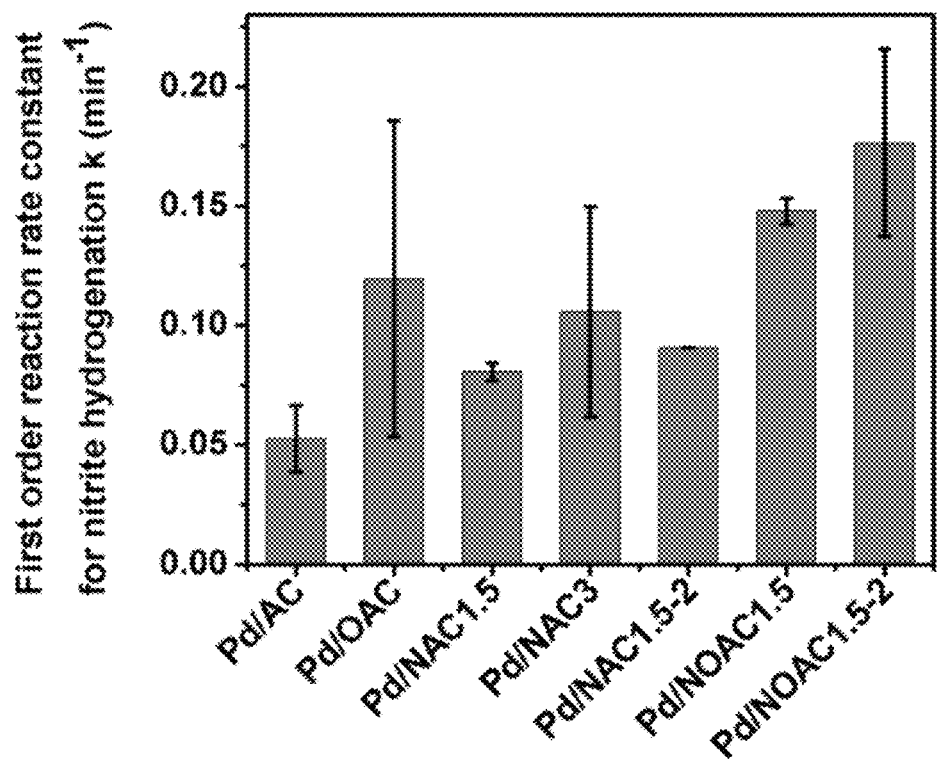
FIG. 32 is a graph showing nitrite reaction rate constants (k) of Pd catalysts prepared with $Na_2PdCl_4$ by wet impregnation in accordance with various aspects of the disclosure (error bars represent standard deviation of replicates)
Figure 33:
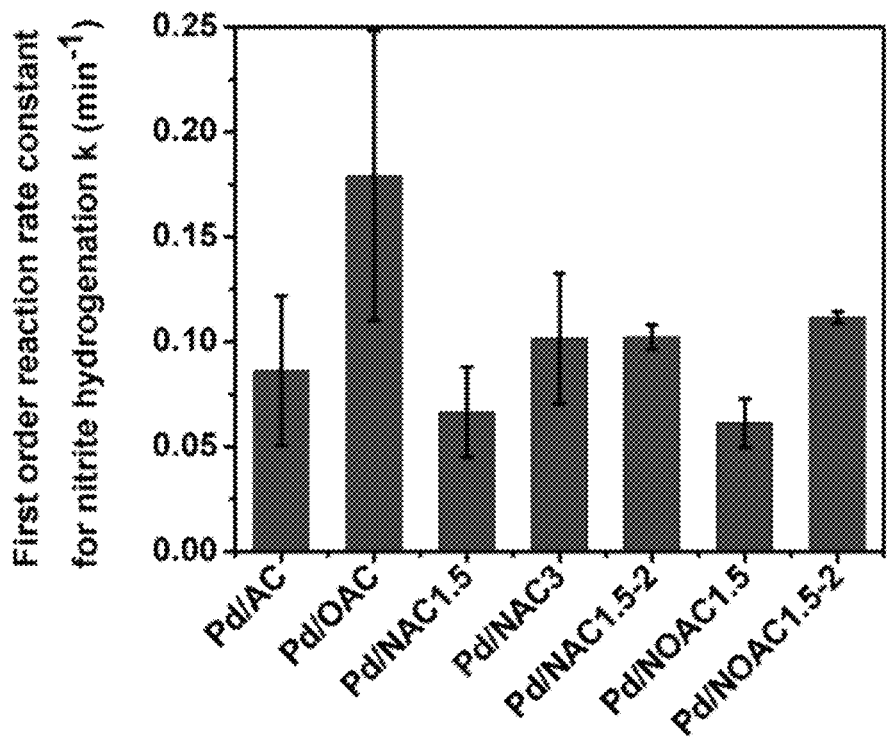
FIG. 33 is a graph showing nitrite reaction rate constants (k) of Pd catalysts prepared with $Pd(NO_3)_2$ by wet impregnation in accordance with various aspects of the disclosure (error bars represent standard deviation of replicates)

In preliminary experiments, a series of catalysts were prepared using different synthesis methods (that is, wet impregnation, ethylene glycol (EG) reduction, and incipient wetness) (FIGS. 32-35) and catalytic performance for nitrite hydrogenation was evaluated. In contrast to previous studies, wet impregnation of both cationic and anionic Pd precursors (i.e., $Pd(NO_3)_2$ and $Na_2PdCl_4$) on functionalized AC did not generate Pd catalysts with significantly improved reactivity, compared with the Pd catalysts on native AC (FIGS. 32-33). In our own work, EG reduction was proven

TABLE 4

| Sample | Surface elemental content by XPS analysis (at %, ~<10 nm) | | | | Surface Pd (wt %, ~<10 nm) | Bulk Pd by ICP-MS (wt %) | Surface Pd:Bulk |
| --- | --- | --- | --- | --- | --- | --- | --- |
| | C | O | N | Pd | Pd | Pd | Pd ratio |
| Pd/AC | 86.1 | 9.8 | 1.0 | 3.1 | 21.5 | 4.1 | 5.2 |
| Pd/OAC | 86.5 | 10.4 | 1.0 | 2.0 | 14.9 | 3.9 | 3.8 |
| Pd/$NAC_{1.5}$ | 72.5 | 18.7 | 2.8 | 6.1 | 34.9 | 4.9 | 7.1 |
| Pd/$NOAC_{1.5}$ | 75.2 | 16.3 | 3.5 | 5.0 | 30.5 | 4.9 | 6.2 |

Figure 34:
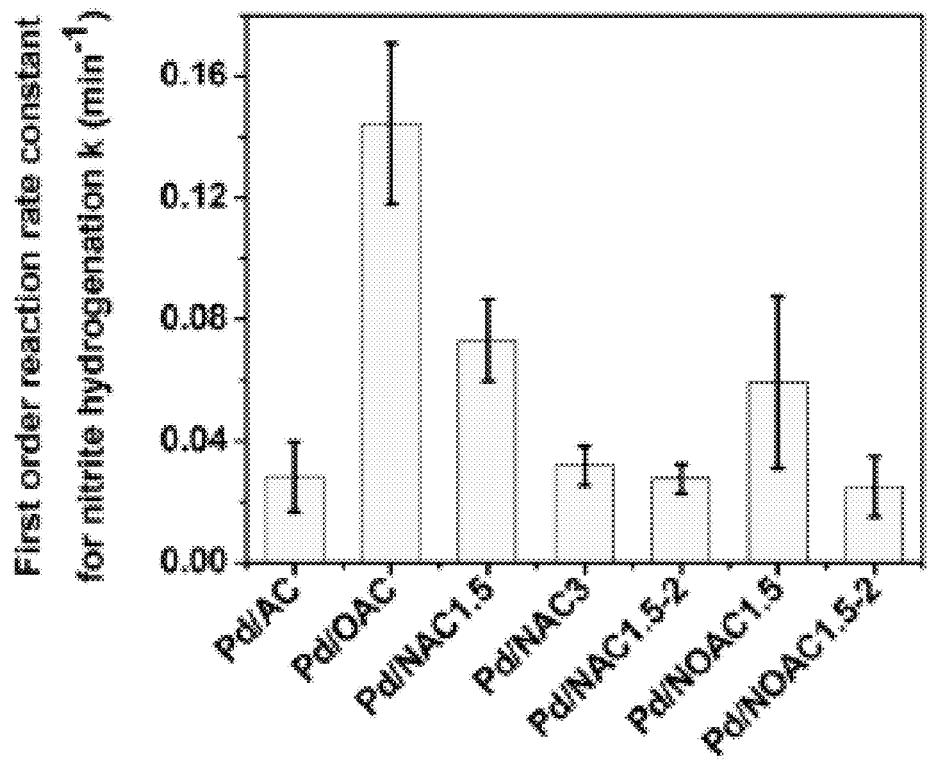
FIG. 34 is a graph showing nitrite reaction rate constants (k) of Pd catalysts prepared by ethylene glycol (EG) reduction in accordance with various aspects of the disclosure (error bars represent standard deviation of replicates)
Figure 35:
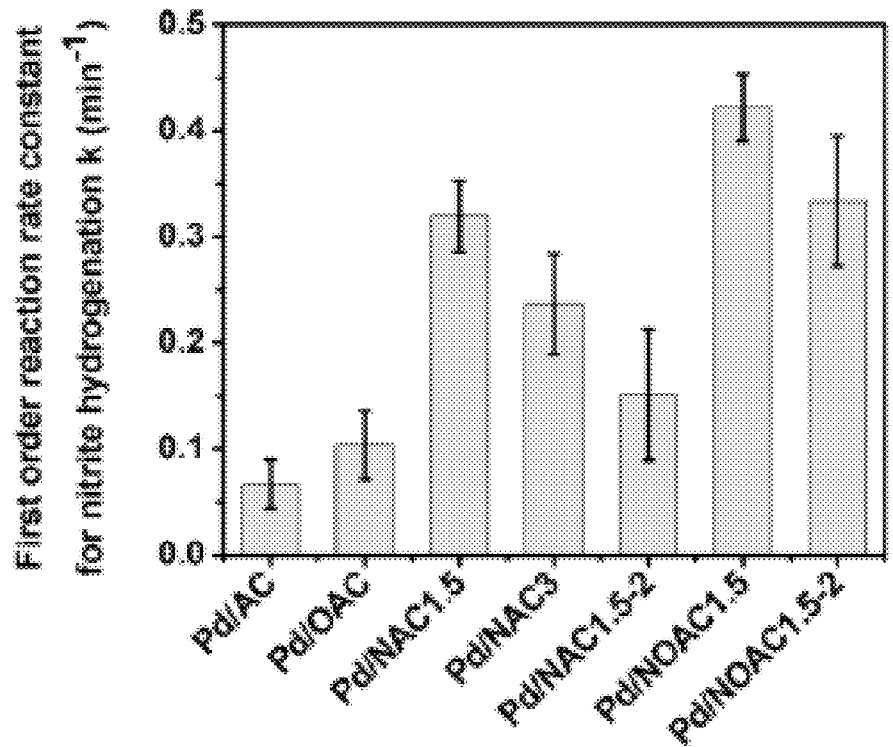
FIG. 35 is a graph showing nitrite reaction rate constants (k) of Pd catalysts prepared by incipient wetness in accordance with various aspects of the disclosure (error bars represent standard deviation of replicates)

Pd nanoparticles were uniformly distributed across $NAC_{1.5}$ and $NOAC_{1.5}$, with an average diameter of 4.0±1.2 and 2.9±0.9 nm, respectively, and only small agglomerations were occasionally observed (FIGS. 4, 5, 7, 8, 10, 11, 13 and 14). The average Pd nanoparticle size of Pd/AC (5.6±2.3 nm) and Pd/OAC (4.7±2.4 nm) was slightly larger and agglomerates of Pd particles were present (FIGS. 4, 5, 7, 8, 10, 11, 13 and 14), as indicated in Pd nanoparticle size histograms. AC itself has a high surface area, however, it decreased significantly after loading Pd (Pd/AC in Table 3), which might indicate that Pd nanoparticles have been successfully loaded inside the pores of the AC, accompanying by a noticeable decrease in pore volume (Table 3). In addition, Pd dispersion of Pd/$NOAC_{1.5}$ was about 3.4-fold higher than that of Pd/AC (7.3% vs 24.6% in Table 1), which also supports the presence of smaller Pd nanoparticles and more uniform Pd distribution on Pd/$NOAC_{1.5}$. N-functional groups can act as basic coordination sites and facilitate anchoring small Pd nanoparticles via electrostatic interactions. Our results further confirm that N-functionalization is helpful to stabilize small Pd nanoparticles on carbon supports and thus promotes Pd dispersion. The high-resolution transmission electron microscopy (HRTEM) (FIGS. 6, 9, 12 and 15) confirmed the presence of Pd(0) metal nanoparticles, with the Pd (111) lattice spacing of ~0.22 nm, consistent with XPS results (the presence of Pd($3d_{5/2}$/$3d_{3/2}$) doublet and the Pd($3d_{5/2}$) binding energy of 335.2±0.1 eV, FIG. 3). The elemental distribution of all catalysts was also characterized by high angle annular dark field-scanning transmission electron microscopy (HAADF-STEM) and energy-dispersive X-ray spectroscopy (EDX) (FIGS. 16-31). Pd nanoparticle distribution was more uniform on N-functionalized and $H_2O_2$ treated AC supports, in contrast to the native AC support. Uniform N distribution on Pd/$NAC_{1.5}$ and Pd/$NOAC_{1.5}$ was also observed, which further confirms the effectiveness of N-functionalization of AC by "soft nitriding" (FIGS. 23-31). Pd was observed to accumulate more on the support surface than in the bulk (Table 4). N-functionalization further promotes the accumulation of Pd on the support surface (Table 4), likely due to AC pore to be an excellent method for preparing high reactivity Pd-based catalysts supported on graphitic carbon nitrides. Nevertheless, EG reduction did not work for most of the functionalized AC, except for the Pd on OAC (FIG. 34). Compared to the other synthesis procedures, incipient wetness is promising because it significantly improved catalytic activity for nitrite hydrogenation: the pseudo-first-order reaction rate constant enhanced by 1.6, 4.8, and 6.3 fold on Pd/OAC, Pd/$NAC_{1.5}$, and Pd/$NOAC_{1.5}$ when compared to Pd/AC (FIG. 35). Compared with Pd/$NAC_{1.5}$, an increased mass ratio of urea to AC in "soft nitriding" or tandem treatment of AC with urea did not promote reactivity (Pd/$NAC_3$, Pd/$NAC_{1.5-2}$, and Pd/$NOAC_{1.5-2}$), because the incomplete thermal decomposition of excess urea possibly blocked AC pores and thus lowered the accessibility of Pd nanoparticles to the support. Therefore, our study focuses on the Pd catalysts (that is, Pd/AC, Pd/OAC, Pd/$NAC_{1.5}$, and Pd/$NOAC_{1.5}$) synthesized by incipient wetness and subsequent thermal treatment in $N_2$ and $H_2$ because of their optimum catalytic performance.

Four common oxyanion contaminants were selected to evaluate the catalytic performance in hydrogenation. Nitrite is a reduction intermediate of nitrate, which comes from extensive agricultural practices and fertilizer applications, whereas bromate, chlorite, and chlorate are disinfection byproducts. U.S. EPA has regulated the maximum contaminant level for nitrite, bromate, and chlorite in the drinking water as 1, 0.01, and 1 mg/L, respectively. Here, we report the hydrogenation rate constants for these oxyanions on native and functionalized AC supported Pd catalysts, that is, pseudo-first-order reaction rate constants normalized to the bulk mass loading of Pd.

Figure 36:
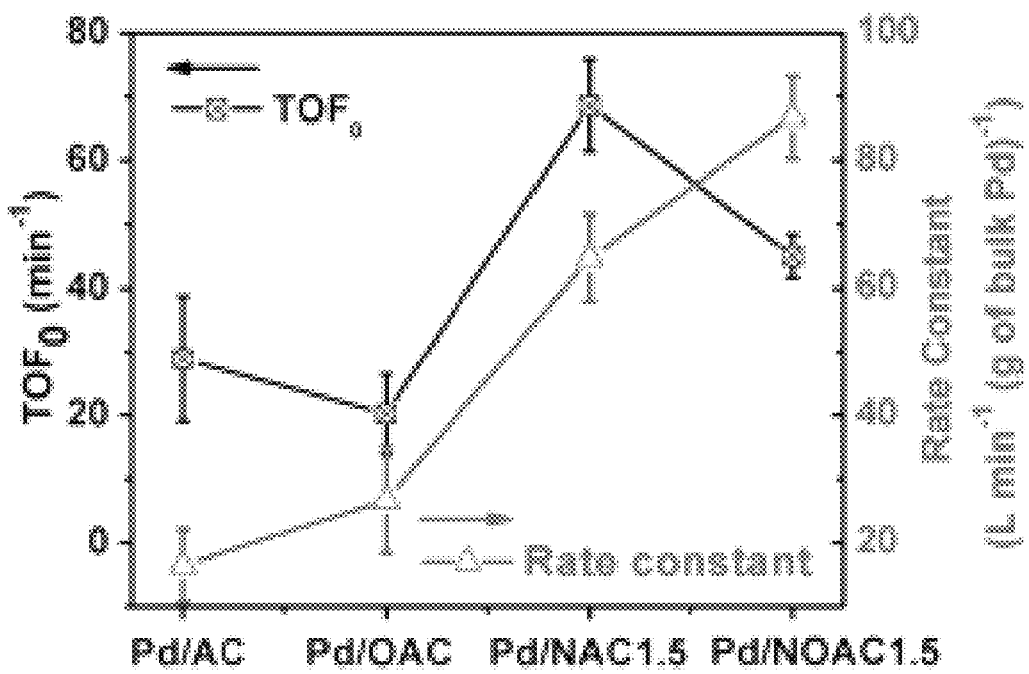
FIG. 36 is a graph showing initial turnover frequency ($TOF_0$; $min^{-1}$) and reaction rate constants ($L \cdot min^{-1} \cdot (g$ of bulk $Pd)^{-1}$) for the hydrogenation of nitrate using Pd catalysts according to various aspects of the present disclosure (error bars represent standard deviation of replicates)

For nitrite hydrogenation, the hydrogenation rate constant was enhanced significantly from 16.5±5.6, to 26.7±8.3, to 64.7±6.8, and to 86.7±6.5 $L \cdot min^{-1}$. (g of bulk Pd)$^{-1}$ for Pd/AC, Pd/OAC, Pd/$NAC_{1.5}$, and Pd/$NOAC_{1.5}$, respectively (FIG. 36). This enhanced catalytic activity could be ascribed to the small Pd nanoparticle sizes (FIGS. 4, 7, 10 and 13) and high Pd dispersion (Table 1) resulting from N-functionalization of the carbon support. In addition to the overall reactivity represented by the hydrogenation rate constant, we also report the intrinsic reactivity that is characterized by the initial turnover frequency ($TOF_0$). $TOF_0$ evaluates the number of contaminant molecules reduced per exposed Pd site per minute at the beginning of a reaction, and the details of calculation are described above. N-functionalization also improved the $TOF_0$ for nitrite hydrogenation (28.9±9.9 $min^{-1}$ for Pd/AC and 20.2±6.3 $min^{-1}$ for Pd/OAC vs 68.6±7.2 $min^{-1}$ for Pd/$NAC_{1.5}$ and 45.1±3.4 $min^{-1}$ for Pd/$NOAC_{1.5}$). These results are in contrast with previous studies showing that the $TOF_0$ for nitrite hydrogenation by carbon nanofiber (CNF) supported Pd catalysts was constant, despite different Pd nanoparticle sizes and Pd dispersion, suggesting factors other than Pd dispersion or nanoparticle size determine the intrinsic catalytic activity for nitrite hydrogenation. N-functionalization could enhance the accessibility of oxyanions to Pd sites due to increased hydrophilicity and basicity of the supports, strengthen metal-support interactions by altering catalyst electronic properties, and improve the adsorption of reactants and intermediates on the catalysts. $TOF_0$ for nitrite hydrogenation on native and functionalized AC supported catalysts could be positively correlated with surface Pd loading compared to the bulk (Table 4), which might indicate mass transfer limited reaction kinetics. Pd closer to the AC surface does not need extensive diffusion of reactants for the reaction. External and intraparticle mass transfer rates in nitrite hydrogenation are evaluated herein; both mass transfer processes could limit reaction kinetics. It is not surprising because AC has a highly porous and tortuous structure with abundant micropores and is relatively large in the particle size (100 mesh, corresponding to ~149 μm).

The zeta potential of Pd/OAC was more negative compared to the other catalysts (FIG. 40), which was measured under the same ionic strength and pH as the reaction solution (1 mM of electrolyte, pH 5.0), and the electrostatic repulsion between anionic nitrite and the negatively charged support could partially explain the observed $TOF_0$. Without being bound to any particular theory, it is possible that the increased intrinsic reactivity for Pd/$NAC_{1.5}$ and Pd/$NOAC_{1.5}$ may also result from the increase of spillover of reactive atomic hydrogen ($H_{ads}$) because of N-functionalization. Hydrogen spillover is defined as the dissociative chemisorption of hydrogen on metal nanoparticles and subsequent migration of the $H_{ads}$ to adjacent surfaces of the support. Hydrogen spillover has been observed in Ru-catalysts supported on N-doped carbon and in hydrogenation reactions. Therefore, hydrogen spillover could also occur on these N-functionalized AC-supported Pd catalysts, and it could promote nitrite hydrogenation kinetics.

Figure 37:
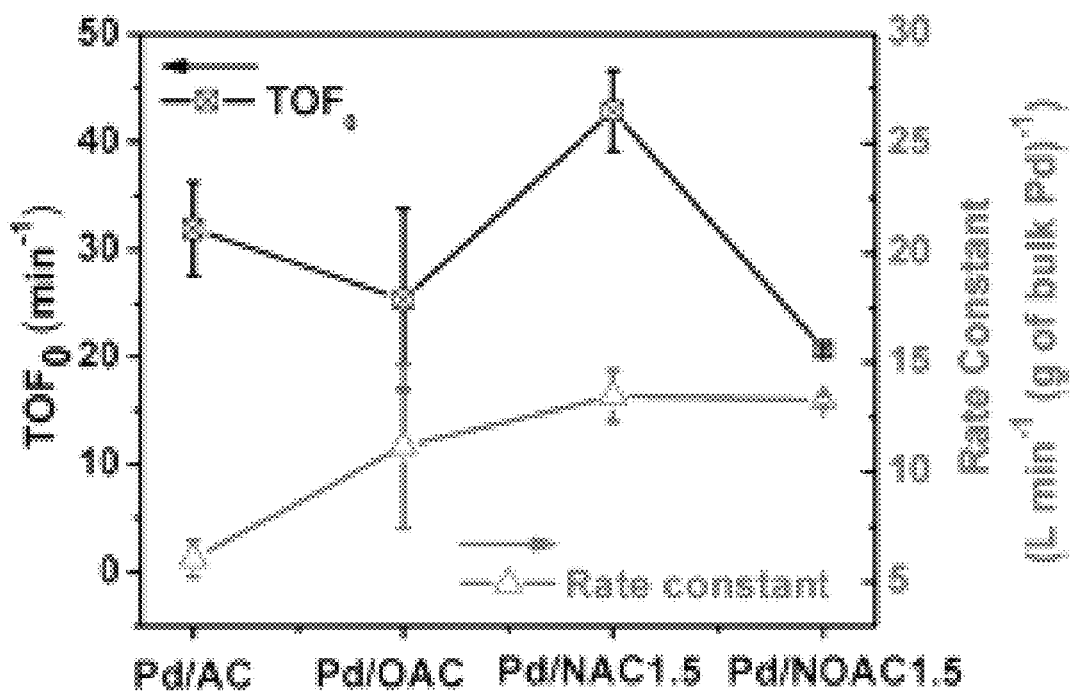
FIG. 37 is a graph showing initial turnover frequency ($TOF_0$; $min^{-1}$) and reaction rate constants ($L \cdot min^{-1} \cdot (g$ of bulk $Pd)^{-1}$) for the hydrogenation of bromate using Pd catalysts according to various aspects of the present disclosure (error bars represent standard deviation of replicates)

The reaction rate constant for bromate hydrogenation was also enhanced for N-functionalized and $H_2O_2$ treated AC compared to native AC, similar to nitrite hydrogenation, which could also be attributed to improved Pd dispersion for Pd/OAC, Pd/$NAC_{1.5}$, and Pd/$NOAC_{1.5}$. However, only $TOF_0$ of Pd/$NAC_{1.5}$ was statistically larger than that of Pd/AC, and the result did not provide a strong argument that N-functionalization enhanced intrinsic reactivity for bromate hydrogenation. Moreover, $TOF_0$ of Pd/$NOAC_{1.5}$ is even lower than that of Pd/AC for bromate hydrogenation. Comparing Pd/$NAC_{1.5}$ with Pd/$NOAC_{1.5}$ and Pd/AC with Pd/OAC, it seems that O-functionalization of the support inhibited the $TOF_0$ for both nitrite and bromate hydrogenation (FIGS. 36-37), though Pd dispersion, surface area, and pore volume (Tables 1 and 3) of Pd/$NAC_{1.5}$ and Pd/AC were comparably lower than those of Pd/$NOAC_{1.5}$ and Pd/OAC, respectively. Without being bound to any particular theory, it is possible that O-functionalization could influence electronic properties of Pd nanoparticles, as well as consequent binding of contaminants to Pd and reactivity of the contaminants on Pd.

Figure 38:
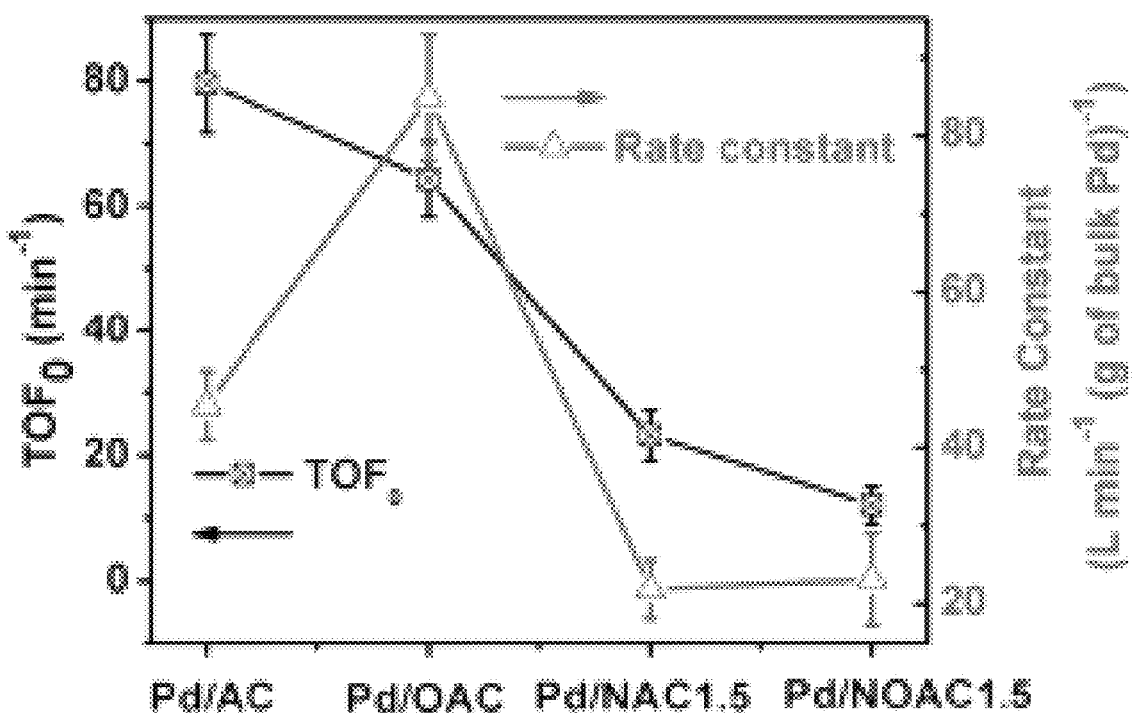
FIG. 38 is a graph showing initial turnover frequency ($TOF_0$; $min^{-1}$) and reaction rate constants ($L \cdot min^{-1} \cdot (g$ of bulk $Pd)^{-1}$) for the hydrogenation of chlorite using Pd catalysts according to various aspects of the present disclosure (error bars represent standard deviation of replicates)
Figure 39:
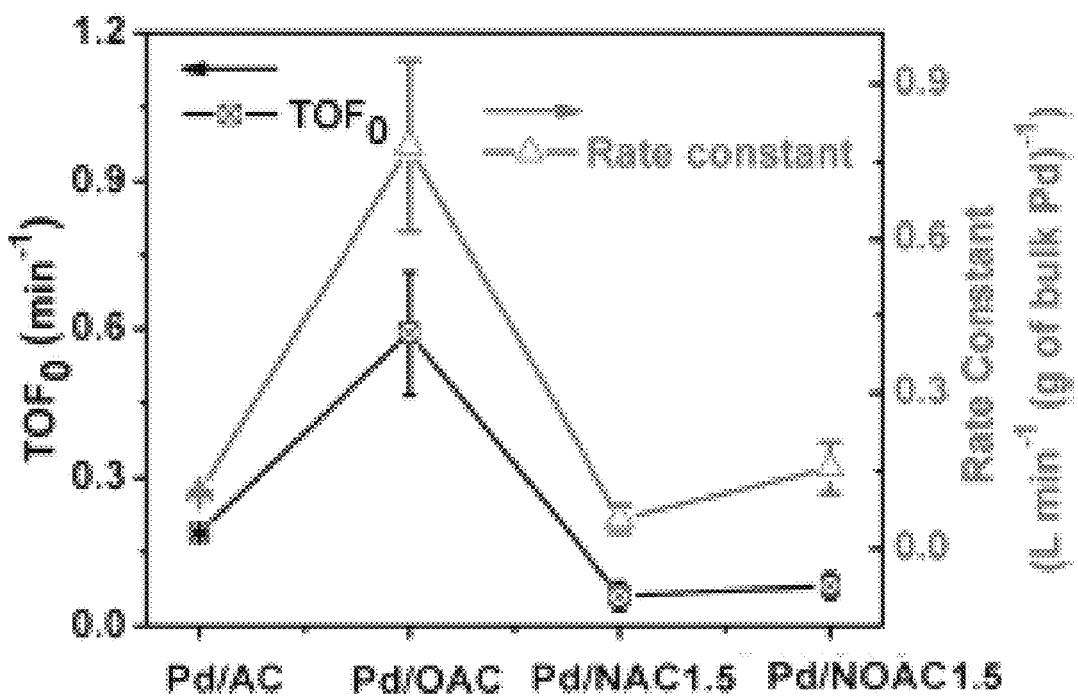
FIG. 39 is a graph showing initial turnover frequency ($TOF_0$; $min^{-1}$) and reaction rate constants ($L \cdot min^{-1} \cdot (g$ of bulk $Pd)^{-1}$) for the hydrogenation of chlorate using Pd catalysts according to various aspects of the present disclosure (error bars represent standard deviation of replicates)
Figure 40:
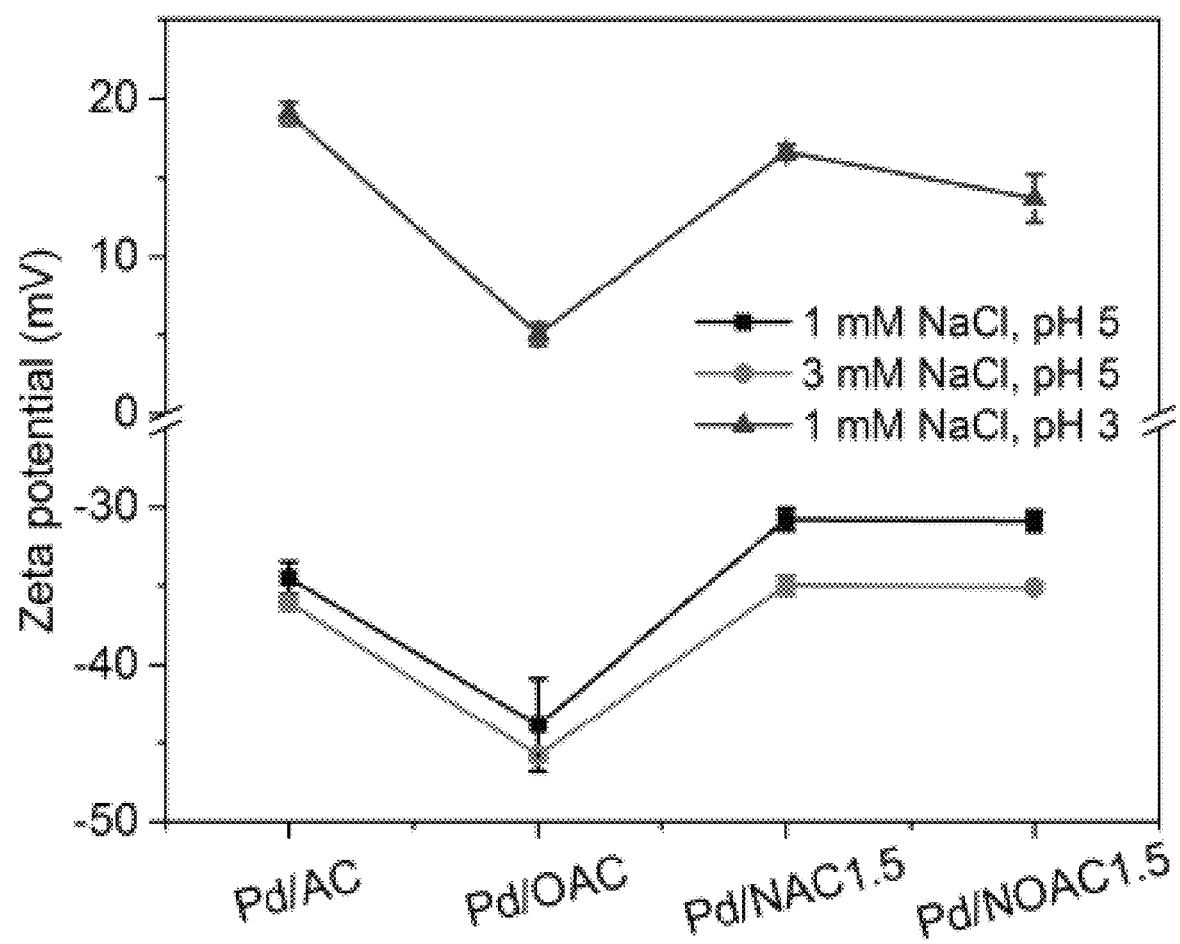
FIG. 40 is a graph showing zeta potentials of Pd/AC, Pd/OAC, Pd/$NAC_{1.5}$, and Pd/$NOAC_{1.5}$ under different experimental conditions. The condition of 1 mM NaCl and pH=5 simulated that for nitrite and chlorite reduction (1 mM initial contaminant concentration, pH=5). The condition of 3 mM and pH=5 simulated that for bromate reduction (3 mM initial contaminant concentration, pH=5). The condition of 1 mM NaCl and pH=3 simulated that for chlorate reduction (1 mM initial contaminant concentration, pH=3).

Surprisingly, the hydrogenation kinetics of chlorite and chlorate on Pd catalysts showed significantly different trends compared to nitrite and bromate hydrogenation (FIGS. 38-39). N-functionalization significantly lowered chlorite hydrogenation rate constants but did not change chlorate hydrogenation rate constants compared to Pd/AC, though far more Pd sites were exposed for contaminant hydrogenation (Table 1). Moreover, Pd residing closer to the support surface for N-functionalized AC catalysts that was believed to increase the mass transfer rate did not promote the overall reactivity. In addition, the zeta potential of the catalysts cannot explain the trend for both chlorite and chlorate hydrogenation (FIG. 40). In terms of $TOF_0$, Pd/AC and Pd/OAC outperformed other catalysts for chlorite and chlorate hydrogenation, respectively. Catalysts with N-functionalized supports showed notably lower intrinsic reactivity (in $TOF_0$) for both chlorite and chlorate hydrogenation, suggesting that N-functionalization could poison Pd catalysts in contaminant hydrogenation, possibly due to the strong binding of Pd by N-containing species, which block active sites for chlorite and chlorate hydrogenation. Chlorate hydrogenation was conducted at pH 3.0 in contrast to the hydrogenation of nitrite, bromate, and chlorite at pH 5.0, because negligible reactivity was observed at higher pH for chlorate hydrogenation. These results suggest different mechanisms determine oxyanion hydrogenation kinetics on Pd catalysts, though all oxyanions seem to share similar properties and behaviors (for example, same negative charge).

Very limited study has focused on chlorite and chlorate on Pd catalysts to date, and further exploration is needed. Without being bound to any particular theory, a possible explanation is that reduced availability of $H^+$ limits chlorite and chlorate hydrogenation kinetics in Pd catalysis. Et might bind to N-functional groups (for example, amine protonation), and it cannot be used for oxygen atom transfer to facilitate deoxygenation of chlorite or chlorate (a similar mechanism highlighted the important role of $H^+$ for perchlorate hydrogenation). Also, the active sites responsible for catalytic hydrogenation may differ among these oxyanions tested in this study.

Our study provides an efficient, sustainable, low-cost, and potentially scalable method to tailor AC supports for Pd-based catalysis with improved performance for water purification. Compared to other conventional and emerging catalyst supports, AC is the still most widely accepted and used in industrial practice. "Soft nitriding" with urea at low temperature was used to functionalize AC with N-containing groups, and catalysts prepared via incipient wetness on these tailored AC supports showed a significantly enhanced reactivity for nitrite and bromate hydrogenation by hydrogen gas. Without being bound to any particular theory, the enhanced reactivity could be attributed to an increased number of surface Pd(0) sites, improved accessibility of oxyanions to Pd sites (for example, higher hydrophilicity and basicity of the supports, promoted adsorption and mass transfer of oxyanions), altered catalyst electronic properties, and hydrogen spillover. As can be appreciated, one major technical barrier for implementing Pd-based catalysis for oxyanion hydrogenation in engineering practices is the low catalytic activity and associated high cost of Pd. Life cycle assessment for Pd-based catalysis also suggests that increasing the catalytic activity would significantly lower adverse environmental impacts of oxyanion hydrogenation.

STATEMENT OF THE DISCLOSURE

Statements of the Disclosure include:

Statement 1: A method of making a solid-supported metal-catalyst, the method comprising providing a solution comprising one or more metal salts and a solvent; combining the solution with a carbonaceous support having one or both of nitrogen-containing functional groups and oxygen-containing functional groups to form a slurry; drying the slurry; and calcining the dried slurry at elevated temperature in a $H_2(g)$ atmosphere to form metal nanoparticles from metal ions in the one or more metal salts.

Statement 2: A method according to Statement 1, wherein the carbonaceous support is selected from the group consisting of activated carbon, graphite, graphite intercalation compounds, graphene, carbon black, charcoal, bone char, activated carbon fibers, single- or multi-walled carbon nanotubes, carbon-covered alumina, glassy carbon, pyrolytic carbon, polymer-derived carbon, fullerenes, amorphous carbon, carbon nanospheres, carbon microspheres, and cellulosic carbon.

Statement 3: A method according to Statement 1 or 2, wherein the one or more metal salts comprise one or more of Au, Ag, Cu, Co, Fe, Ir, In, Ni, Pd, Pt, Sn, Ru, Rh and Zn.

Statement 4: A method according to any one of Statements 1-3, wherein the solution and the carbonaceous support are combined such that the resulting slurry has a metal ion to carbonaceous support, weight to weight, ratio ranging from about 0.1:100 to about 20:100.

Statement 5: A method according to any one of Statements 1-4, wherein calcining comprises raising the temperature of the dried slurry from a first temperature to a second temperature over a first period of time; and maintaining the dried slurry at the second temperature in the $H_2(g)$ atmosphere for a second period of time.

Statement 6: A method according to any one of Statements 1-5, wherein the metal nanoparticles are selected from the group consisting of monometallic nanoparticles, bimetallic nanoparticles, and any combination thereof.

Statement 7: A solid-supported metal-catalyst prepared by a method according to any one of Statements 1-6.

Statement 8: A method of making a solid-supported metal-catalyst, the method comprising dispersing a carbonaceous support in water to form a suspension, the carbonaceous support having one or both of nitrogen-containing functional groups and oxygen-containing functional groups; mixing the suspension with one or more metal salts to form a metal salt-containing suspension; adding a solution comprising a reducing agent to the metal salt-containing suspension; and reducing, with the reducing agent, metal ions from the one or more metal salts to form metal nanoparticles.

Statement 9: A method according to Statement 8, wherein the carbonaceous support is selected from the group consisting of activated carbon, graphite, graphite intercalation compounds, graphene, carbon black, charcoal, bone char, activated carbon fibers, single- or multi-walled carbon nanotubes, carbon-covered alumina, glassy carbon, pyrolytic carbon, polymer-derived carbon, fullerenes, amorphous carbon, carbon nanospheres, carbon microspheres, and cellulosic carbon.

Statement 10: A method according to Statement 8 or 9, wherein the one or more metal salts comprise one or more of Au, Ag, Cu, Co, Fe, Ir, In, Ni, Pd, Pt, Sn, Ru, Rh and Zn.

Statement 11: A method according to any one of Statements 8-10, wherein the suspension and the one or more metal salts are combined in relative amounts that result in a metal ion to carbonaceous support, weight to weight, ratio ranging from about 0.1:100 to about 20:100.

Statement 12: A method according to any one of Statements 8-11, wherein the metal nanoparticles are selected from the group consisting of monometallic nanoparticles, bimetallic nanoparticles, and any combination thereof.

Statement 13: A solid-supported metal-catalyst prepared by a method according to any one of Statements 8-12.

Statement 14: A method of making a solid-supported metal-catalyst, the method comprising dispersing a carbonaceous support in ethylene glycol to form a dispersion for a first period of time, the carbonaceous support having one or both of nitrogen-containing functional groups and oxygen-containing functional groups; mixing the dispersion for a second period of time to form a suspension, the second period of time being longer than the first period of time; adding a solution to the suspension, the solution comprising one or more metal salts and a solvent, to form a metal salt-containing suspension; mixing the metal salt-containing suspension for a third period of time; adding a strong base to the metal salt-containing suspension to increase the basicity of the metal salt-containing suspension; and mixing the metal salt-containing suspension for a fourth period of time under reflux conditions to form metal nanoparticles from metal ions in the one or more metal salts.

Statement 15: A method according to Statement 14, wherein the carbonaceous support is selected from the group consisting of activated carbon, graphite, graphite intercalation compounds, graphene, carbon black, charcoal, bone char, activated carbon fibers, single- or multi-walled carbon nanotubes, carbon-covered alumina, glassy carbon, pyrolytic carbon, polymer-derived carbon, fullerenes, amorphous carbon, carbon nanospheres, carbon microspheres, and cellulosic carbon.

Statement 16: A method according to Statement 14 or 15, wherein the one or more metal salts comprise one or more of Au, Ag, Cu, Co, Fe, Ir, In, Ni, Pd, Pt, Sn, Ru, Rh and Zn.

Statement 17: A method according to any one of Statements 14-16, wherein the pH is adjusted to about 11.

Statement 18: A method according to any one of Statements 14-17, wherein the suspension and solution comprising the one or more metal salts are combined in relative amounts that result in a metal ion to carbonaceous support, weight to weight, ratio ranging from about 0.1:100 to about 20:100.

Statement 19: A method according to any one of Statements 14-18, wherein the metal nanoparticles are selected from the group consisting of monometallic nanoparticles, bimetallic nanoparticles, and any combination thereof.

Statement 20: A solid-supported metal-catalyst prepared by a method according to any one of Statements 14-19.

Although the present invention and its objects, features and advantages have been described in detail, other embodiments are encompassed by the invention. All references cited herein are incorporate by reference in their entireties. Finally, those skilled in the art should appreciate that they can readily use the disclosed conception and specific embodiments as a basis for designing or modifying other structures for carrying out the same purposes of the present invention without departing from the scope of the invention as defined by the appended claims.

What is claimed is:

1. A method of making a solid-supported metal-catalyst, the method comprising:
preparing a carbonaceous support having nitrogen-containing functional groups and oxygen-containing functional groups by:

forming a carbonaceous support having oxygen-functional groups by reacting a carbonaceous support with a 20 wt % to 60 wt % aqueous $H_2O_2$ solution, wherein the carbonaceous support and $H_2O_2$ are reacted in a weight to weight ratio ranging from 0.01:1 to 1:1; and forming a carbonaceous support having oxygen-functional groups and nitrogen-functional groups by forming a mixture of the carbonaceous support having oxygen-functional groups and urea, where the weight to weight ratio of the carbonaceous support having oxygen functional groups to urea in the mixture ranges from 4:1 to 1:1, and annealing the mixture;

providing a solution comprising one or more metal salts and a solvent;

combining the solution with the carbonaceous support having oxygen-containing functional groups and nitrogen-containing functional groups to form a slurry;

drying the slurry to form a dried sample; and calcining the dried sample at elevated temperature in a $H_2(g)$ atmosphere to form metal nanoparticles from metal ions in the one or more metal salts, wherein the metal nanoparticles bind to the carbonaceous support to form a solid-supported metal-catalyst.

2. The method of claim 1, wherein the carbonaceous support is selected from the group consisting of activated carbon, graphite, graphite intercalation compounds, graphene, carbon black, charcoal, bone char, activated carbon fibers, single- or multi-walled carbon nanotubes, carbon-covered alumina, glassy carbon, pyrolytic carbon, polymer-derived carbon, fullerenes, amorphous carbon, carbon nanospheres, carbon microspheres, and cellulosic carbon.

3. The method of claim 1, wherein the one or more metal salts comprise one or more of Au, Ag, Cu, Co, Fe, Ir, In, Ni, Pd, Pt, Sn, Ru, Rh and Zn.

4. The method of claim 1, wherein the metal nanoparticles comprise bimetallic nanoparticles.

5. The method of claim 1, wherein the solution and the carbonaceous support are combined such that the resulting slurry has a metal ion to carbonaceous support, weight to weight, ratio ranging from about 0.1:100 to about 20:100.

6. The method of claim 1, wherein calcining comprises:
raising the temperature of the dried sample from a first temperature to a second temperature over a first period of time; and
maintaining the dried sample at the second temperature in the $H_2(g)$ atmosphere for a second period of time.

7. A solid-supported metal-catalyst prepared by a method according to claim 1.

8. The solid-supported metal-catalyst of claim 7, wherein the metal nanoparticles include a metal selected from the group consisting of Au, Ag, Cu, Co, Fe, Ir, In, Ni, Pd, Pt, Sn, Ru, Rh and Zn.

9. The solid-supported metal-catalyst of claim 7, wherein the carbonaceous support is selected from the group consisting of activated carbon, graphite, graphite intercalation compounds, graphene, carbon black, charcoal, bone char, activated carbon fibers, single- or multi-walled carbon nanotubes, carbon-covered alumina, glassy carbon, pyrolytic carbon, polymer-derived carbon, fullerenes, amorphous carbon, carbon nanospheres, carbon microspheres, and cellulosic carbon.

10. The solid-supported metal-catalyst of claim 7, wherein the metal nanoparticles comprise bimetallic nanoparticles.

11. A method of making a solid-supported metal-catalyst, the method comprising:
preparing a carbonaceous support having nitrogen-containing functional groups and oxygen-containing functional groups by:
forming a carbonaceous support having oxygen-functional groups by reacting a carbonaceous support with a 20 wt % to 60 wt % aqueous $H_2O_2$ solution, wherein the carbonaceous support and $H_2O_2$ are reacted in a weight to weight ratio ranging from 0.01:1 to 1:1; and
forming a carbonaceous support having oxygen-functional groups and nitrogen-functional groups by forming a mixture of the carbonaceous support having oxygen-functional groups and urea, where the weight to weight ratio of the carbonaceous support having oxygen functional groups to urea in the mixture ranges from 4:1 to 1:1, and annealing the mixture;
dispersing the carbonaceous support having oxygen-functional groups and nitrogen-functional groups in water to form a suspension;
mixing the suspension with one or more metal salts to form a metal salt-containing suspension;
adding a solution comprising a reducing agent to the metal salt-containing suspension; and
reducing, with the reducing agent, metal ions from the one or more metal salts to form metal nanoparticles,
wherein the metal nanoparticles bind to the carbonaceous support to form a solid-supported metal-catalyst.

12. The method of claim 11, wherein the carbonaceous support is selected from the group consisting of activated carbon, graphite, graphite intercalation compounds, graphene, carbon black, charcoal, bone char, activated carbon fibers, single- or multi-walled carbon nanotubes, carbon-covered alumina, glassy carbon, pyrolytic carbon, polymer-derived carbon, fullerenes, amorphous carbon, carbon nanospheres, carbon microspheres, and cellulosic carbon.

13. The method of claim 11, wherein the one or more metal salts comprise one or more of Au, Ag, Cu, Co, Fe, Ir, In, Ni, Pd, Pt, Sn, Ru, Rh and Zn.

14. The method of claim 11, wherein the metal nanoparticles comprise bimetallic nanoparticles.

15. The method of claim 11, wherein the suspension and the one or more metal salts are combined in relative amounts that result in a metal ion to carbonaceous support, weight to weight, ratio ranging from about 0.1:100 to about 20:100.

16. A solid-supported metal-catalyst prepared by a method according to claim 11.

17. The solid-supported metal-catalyst of claim 16, wherein the metal nanoparticles include a metal selected from the group consisting of Au, Ag, Cu, Co, Fe, Ir, In, Ni, Pd, Pt, Sn, Ru, Rh and Zn.

18. The solid-supported metal-catalyst of claim 16, wherein the carbonaceous support is selected from the group consisting of activated carbon, graphite, graphite intercalation compounds, graphene, carbon black, charcoal, bone char, activated carbon fibers, single- or multi-walled carbon nanotubes, carbon-covered alumina, glassy carbon, pyrolytic carbon, polymer-derived carbon, fullerenes, amorphous carbon, carbon nanospheres, carbon microspheres, and cellulosic carbon.

19. The solid-supported metal-catalyst of claim 16, wherein the metal nanoparticles comprise bimetallic nanoparticles.

* * * * *